United States Patent [19]

Endo et al.

[11] Patent Number: 5,132,986
[45] Date of Patent: Jul. 21, 1992

[54] CSK COMMUNICATION SYSTEM

[75] Inventors: Kaoru Endo; Naomichi Takahashi; Soichi Tsumura, all of Osaka, Japan

[73] Assignee: NEC Home Electronics Ltd., Osaka, Japan

[21] Appl. No.: 631,921

[22] Filed: Dec. 21, 1990

[30] Foreign Application Priority Data

| Dec. 22, 1989 | [JP] | Japan | 1-331070 |
| Jan. 10, 1990 | [JP] | Japan | 2-1522 |
| Feb. 16, 1990 | [JP] | Japan | 2-33642 |
| Mar. 16, 1990 | [JP] | Japan | 2-33643 |

[51] Int. Cl.$^5$ ............................ H04L 27/30
[52] U.S. Cl. ............................ 375/1; 375/90; 380/46; 380/47; 370/18
[58] Field of Search ............... 375/1, 64, 66–68, 375/84, 87, 90, 91; 380/34, 46, 47; 370/18

[56] References Cited

U.S. PATENT DOCUMENTS

| 3,244,986 | 4/1966 | Rumble | 375/84 X |
| 3,665,474 | 5/1972 | Thayer | 370/18 X |
| 4,707,839 | 11/1987 | Andren et al. | 375/1 |

*Primary Examiner*—Bernarr E. Gregory
*Attorney, Agent, or Firm*—Cushman, Darby & Cushman

[57] ABSTRACT

The present invention provides new arrangements for various components of a CSK communication system: modulator, correlators, demodulator, carrier detection circuit, and synchronization control circuit. The various improvements provide more accurate demodulation of data from the received signal in the presence of noise and signal deterioration. A modulator configuration permits the CSK system to use two M series codes in which the second code is simply a phase shifted version of the first code. The PN correlators, via shift-registers, efficiently output two correlation signals. The demodulator accepts two correlation signals from the correlators, detects auto-correlation peaks in the correlation signals, and uses the peaks to accurately determine whether the received bit has a value of "1" or "0". The carrier detecting circuit detects the presence of data in the received signal. A carrier detecting circuit conveniently allows demodulation of data without exact synchronization of the center of demodulator's monitoring window to auto-correlation peaks. The synchronization control circuit generates accurate timing pulses that mark the start and end of each data bit. If auto-correlation peaks appear consistently in one location for the duration of N consecutive data bits, subsequent timing pulses are delayed in accordance with weighted averages of the stored locations of auto-correlation peaks. In one embodiment, separate correlation signal monitoring windows for demodulation and synchronization tracking may be set independently of each other, enabling the demodulator to clearly distinguish between an actual auto-correlation peaks and an inter-correlation peak, and the synchronization control circuit to attain stability by "averaging" out temporal effects of noise.

43 Claims, 45 Drawing Sheets

CSK COMMUNICATION SYSTEM

BACKGROUND OF THE INVENTION

1. Field of the Invention

The invention relates to Code Shift Keying (CSK) Spread Spectrum (SS) communication systems. Uses of SS communication systems include power line communications, satellite communications, mobile communications, and others.

2. Description of Related Art

A block diagram of one conventional SS communication system is shown in FIG. 1(a). Timing of the signals associated with FIG. 1(a) is shown by FIG. 1(b). The PN code T10 from a pseudo noise (PN) code generator 10 and data stream 20 are processed by the EX-OR gate 20. Its output signal T20 is amplified by amplifier 30, and then processed for transmission. After the transmitted signal T30 is received, it is amplified by an amplifier 40, whose output is applied to a correlator 50. The signal T50 from the correlator 50 is compared to a threshold value TH1 by a comparator 70, which produces demodulated data T70.

In order to recover the transmitted bits, the PN code generated by correlator 50 at the receiver must be synchronized to the PN code T10 modulated on the transmitted signal T30. However, if the transmitted signal T30 experiences progressive deterioration, the output of the correlator 50 will lose its synchronization (loss of lock).

In an effort to overcome deficiencies of conventional PN communication systems, the present inventors proposed a Code Shift Keying communication system, described as in "Highly Efficient Power Line SS Modem,"*Symposium on Spread Spectrum Technology and Its Applications*, IEICE, Mar. 22, 1989. FIG. 2 illustrates a general block diagram of such CSK spread spectrum communication system consisting of a transmitter 200 and a receiver 270.

The transmitter includes a modulator 280, which in turn comprises the following elements.

1) Two PN code generators 210 and 220 for producing two pseudo-noise (PN) codes M00 and M01.
2) Selector 230 for choosing one of two codes M00 and M01, depending on its input data i230. If the value of an incoming bit is "1," the circuit 230 will select code M00; otherwise, the circuit 230 will select M01.

The output from the modulator 280 is further processed and transmitted at the signal transmitting interface 240. The transmitted signal T240, is then later recaptured at a signal receiving interface 250, where PN modulated signal T250 is recovered from the received signal T240. The recovered signal T250 is input to the demodulator/correlator 260, where T250 is correlated with local copies of the PN codes and demodulated to recover the transmitted bits i230.

A conventional PN communication system is likely to lose lock in cases where the communication "channel" (transmission path) introduces significant amount of signal degradation. Implementations of the CSK system as originally proposed by the inventors overcomes the difficulty suffered by the conventional spread spectrum systems. However, the previously proposed implementation of the CSK system is still not perfect.

The signal receiving interface 250 in the CSK system above transfers its output to a pair of correlators (not shown). One of two correlators multiplies the incoming signal by a local copy of M00. The other correlator, by M01. For each received bit, one of two correlation signals at the output of correlators will have an auto-correlation peak, and the other will contain only cross-correlation peaks. Because signal demodulation depends on the detection of auto-correlation peaks, large cross-correlation peaks may cause undesired errors. The system demodulator may confuse an excessively large cross-correlation peak with an actual auto-correlation peak. Low cross-correlation values at the outputs of correlators can be ensured by using two PN codes M00 and M01 that have low cross-correlation values. However, the number of existing pair of codes which have low cross-correlation values decreases with decreasing length of codes. For example, for codes of length 7, there exists only one M-series code. Therefore, correlators in which short codes are used are likely to exhibit high cross-correlation peaks.

In the system above, in order to demodulate data and to produce timing signals (indicating the start and the end of each data bit), accurate monitoring, or windowing, of correlation signals is desired. Because demodulation depends on comparing relative signal peak sizes of two correlation signals, and because a short monitoring window yields a better contrast between two monitored correlation peaks, the length of the monitoring window for demodulation needs to be relatively short. On the other hand, the monitoring window for a timing signal generator, or a synchronization control circuit, needs to be long in order to provide stability. The provision of a long window enables the synchronization control circuit to "average" out temporal effects of noise. Therefore, for a CSK system with a single window monitoring scheme, optimum operation of the demodulator will introduce instability to the synchronization control circuit.

If a propagation path adds interferences and noise to the transmitted signal, amplitudes of the received signal will fluctuate. Signals that are synchronized to auto-correlation peaks are sensitive to the fluctuations. The carrier detection circuit, which in turn depends on synchronization condition of such signals, may generate undesirable outputs Finally, in order to synchronize its monitoring windows to auto-correlation peaks, a synchronization control circuit needs to: 1) center the placement of the monitoring window about auto-correlation peaks; and 2) maintain the current position of monitoring window about auto-correlation peaks once the monitoring windows are centered. The former of the two operations is related to synchronization, and the latter, to maintaining the synchronization, otherwise called tracking.

SUMMARY OF THE INVENTION

It is an object of the present invention to improve upon various features of the CSK transmitter and the receiver as shown in FIG. 2.

A further object of the present invention is to allow a single code to be used as well as two PN codes to modulate data bits. If a single code is used, when a "0" needs to be transmitted, generated code M00 will be modulated onto the data. However, if "1" needs to be transmitted, a phase-shifted version of the code will be modulated.

It is another object of the present invention to provide a mechanism by which the demodulator and the synchronization control circuit can both monitor correlation signals independently of each other.

It is yet another object of the present invention to provide a carrier detection circuit in which exact synchronization between the auto-correlation peaks and the monitoring window is unnecessary. One such carrier detection circuit according to the invention operates as follows.

1) It divides a period of time spanning one bit into several subintervals.
2) It counts the number of arrivals of auto-correlation peaks (output by a correlator) in each subinterval.
3) It declares that a "carrier" is detected if there are at least m arrivals in any one of the subintervals.

It is a further object of the invention to provide an improved synchronization circuit, placed within a synchronization control circuit, which generates timing pulses for other CSK components. Several algorithms are provided for positioning the timing pulses relative to auto-correlation peaks.

It is yet another object of the present invention to provide various embodiments of tracking circuits. Once synchronization has been achieved, the tracking circuit enables consistent production of the timing signals which accurately reflect the start and the end of each data bit.

The present invention provides novel arrangements for various components of CSK communication system: modulator, PN correlators, demodulator, carrier detection circuit, and synchronization control circuit.

The modulator according to one embodiment of the present invention generates two M-series codes, in which the second code is simply a phase shifted version of the first code. Depending on the value ("1" or "0") of each bit to be transmitted, the modulator selects one of the codes, and sends out the selected M series code.

The PN correlators at the receiver outputs two correlation signals after multiplying its input signal by local copies of the two M-series codes.

The demodulator accepts two correlation signals from the correlators. The demodulator then detects auto-correlation peaks in the correlated signals and uses them in determining whether the received bit has the value "1" or "0". If one correlation signal has an auto-correlation peak at a particular instance, the other has the cross-correlation peak as low as 1/(spread ratio). Clean detection of an actual auto-correlation peak is possible, and the detection allows the correct demodulation of the received signal.

When two identical phase-shifted pair of codes are used, inter-correlation peaks may become as large as the auto-correlation at certain points within correlation signals. However, by positioning the monitoring window (by using synchronization signal, or timing pulses, output from synchronization control circuit) of the demodulator such that large inter-correlation peaks are excluded from the window, it is possible to prevent the inter-correlation peaks from causing errors in demodulation.

The carrier detecting circuit according to one embodiment of the present invention accomplishes the following:

It determines the position of "peaks" (to be defined later).

It divides a given data time segment into subintervals, and then determines to which subinterval the peak belongs.

It counts the number of occurrences of peaks within each subinterval.

If an auto-correlation peak has been detected within a subinterval for more than a predetermined number of times within a durations of N data bits, it outputs a carrier detection signal, indicating the presence of incoming data stream within the received signal.

One particular embodiment, used without a synchronization control circuit, allows demodulation of data without exact synchronization of the center of the demodulator's monitoring window to auto-correlation peaks.

The synchronization control circuit mainly comprises the circuit for generating timing signals that mark the start and the end of each data bit. If the output from the carrier detecting circuit indicates that a synchronization has been established, timing pulses are produced so that auto-correlation peaks will be located exactly half-way between two consecutive timing pulses. Each timing pulse marks the start/end of each data bit in the received signal.

Generation of timing pulses (otherwise called data section end signal) depends on past locations of auto-correlation peaks. Consecutive locations of auto-correlation peaks (during the time when data is present) may be stored in a memory. If auto-correlation peaks consistently appear in one of the subintervals during monitoring of N consecutive data bits, the subsequent timing pulses are delayed in accordance with a weighted average of the stored locations of auto-correlation peaks.

Finally, a monitoring window for demodulation and that for synchronization tracking may be set independently from each other. This allows the demodulator to clearly distinguish between an actual auto-correlation peaks and an inter-correlation peak, while also allowing the synchronization control circuit to attain stability by "averaging" out temporal effects of noise The present invention provides the following advantages.

1) For those systems using short codes, demodulation need not incur excessively high error rates (an error meaning that when bit "1" is transmitted, demodulator outputs a corresponding bit with the value "0.").
2) Separate monitoring of signals for the demodulator and the synchronization control circuits effect accurate demodulation and stable synchronization/tracking.
3) The carrier detection circuit may correctly declare the presence of carrier during the absence of exact synchronization.
4) Implementation of algorithms for accurately positioning timing pulses effects a more stable synchronization and more accurate demodulation of data.
5) The inclusion of a stable synchronization tracking circuit enables the present CSK system to "lock" on auto-correlation peaks and allows a consistent demodulation of data, unlike the case when the location of peaks continuously drift within a monitoring window.
6) The provision of a short monitoring window for demodulation prevents large inter-correlation peaks, which are placed half way between two auto-correlation peaks, from interfering with demodulation.

DETAILED DESCRIPTION OF THE PREFERRED EMBODIMENTS

Overall CSK System

Figure 1A:
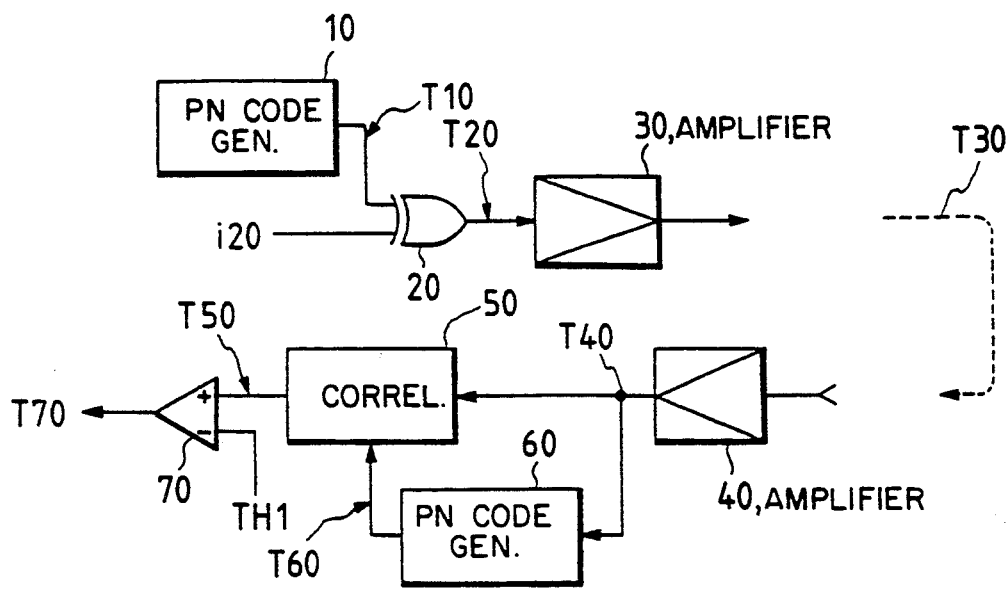
FIG. 1(a) (PRIOR ART) is a block diagram of a conventional SS communication system.
Figure 1B:
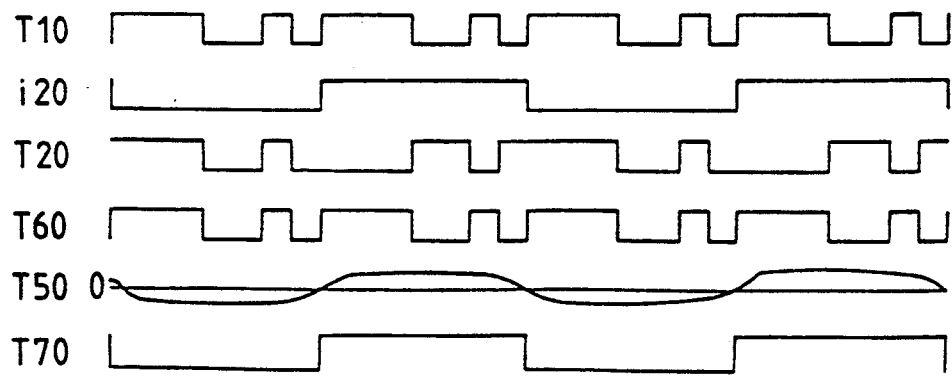
FIG. 1(b) shows waveforms of signals at various points in FIG. 1(a) system.
Figure 2:
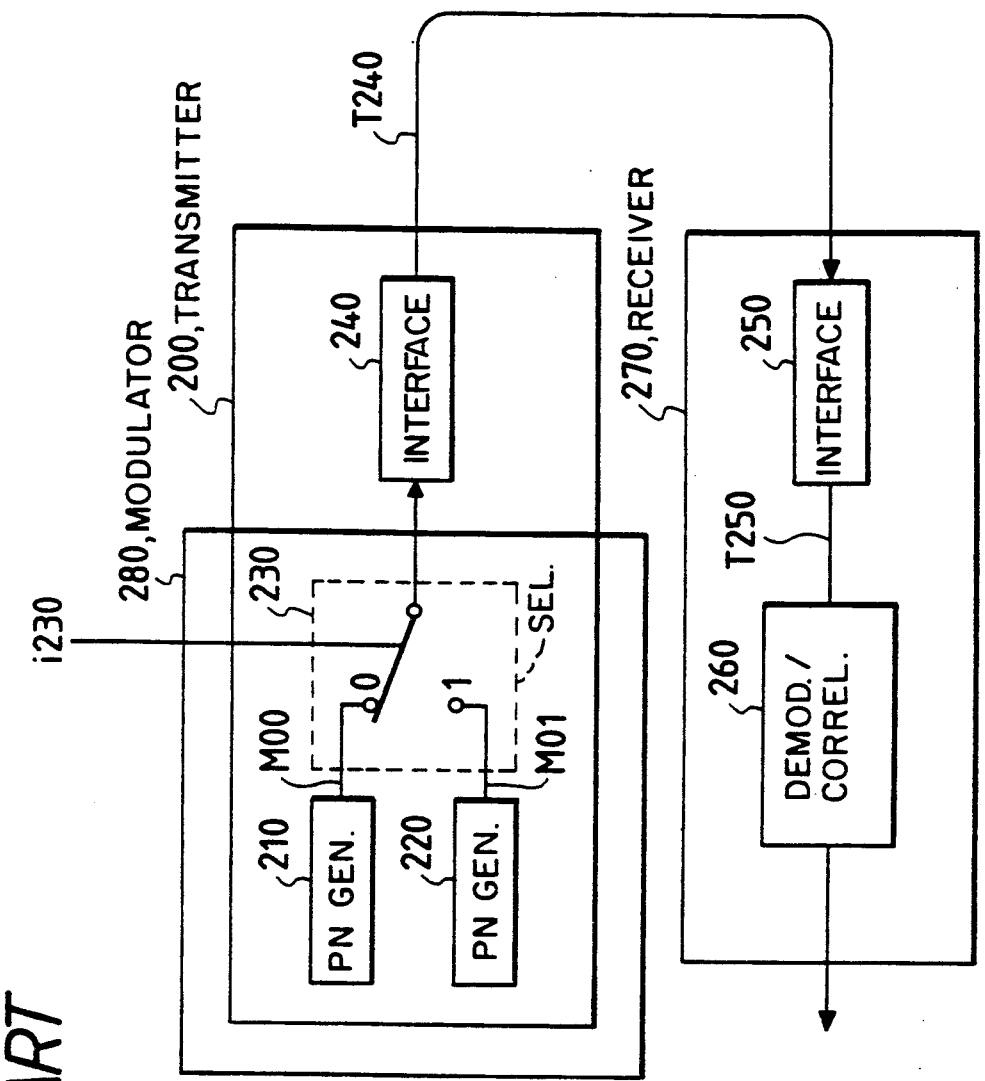
FIG. 2 (PRIOR ART) is a block diagram of a conventional CSK communication system.
Figure 3:
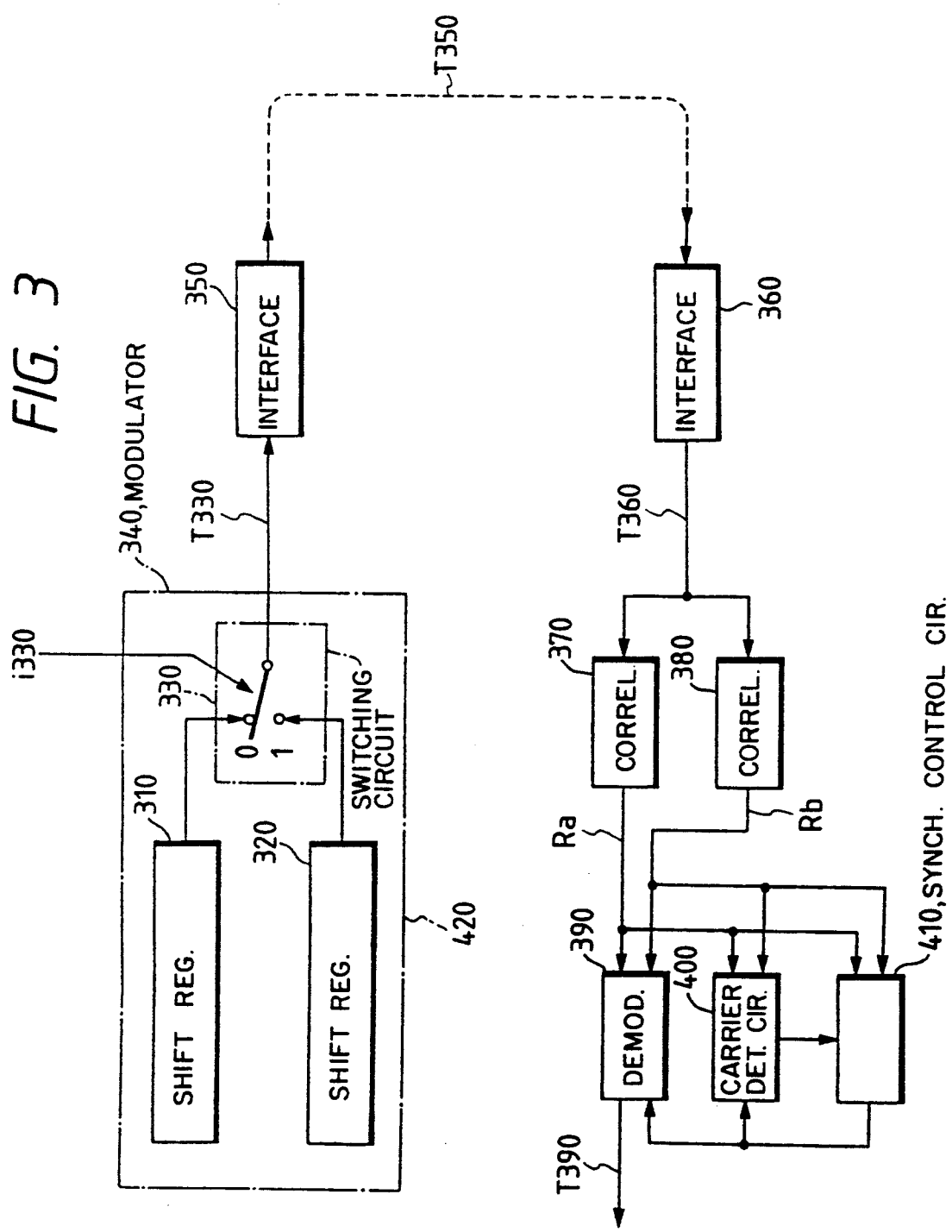
FIG. 3 is a block diagram showing the overall construction of a CSK spread spectrum communication system of the present invention.

FIG. 3 is a block diagram of the overall construction of a CSK spread spectrum communication system of the present invention. The system includes a transmitter, transmission media, and a receiver.

The transmitter includes a modulator 420 whose functional components include:

1) Two feed-back shift-registers 310 and 320 for generating two M-series pseudo-noise (PN) codes M00 and M01. Each code consists of a predetermined number of "chips" (1's and 0's).
2) A switching circuit 330. Circuit 330 selects one of two codes M00 and M01, depending on its input data i330. If the value of an incoming bit is "1," circuit 330 will select code M00; otherwise, the circuit 330 will select M01. Switching operation is performed synchronously with the periodic generation of M-series code.

The modulation system described above is referred to as a "Code Shift Keying" (CSK) system. In general, codes other than M-series codes may be used for the CSK system.

The transmitter further includes a signal transmitting interface 350, which operates on T330 to produce a signal T350 for transmission.

The receiver includes a signal receiving interface 360. The signal receiving interface 360 extracts digital data modulated onto a carrier from a received signal. The signal receiving interface outputs a signal to each of the correlators 370 and 380, which in turn, multiplies its input signal by a local replica of the M-series codes M00 and M01. Correlators 370 and 380 output the correlation signals Ra and Rb to the demodulator 390.

Under ideal operating conditions of the CSK system, signals Ra and Rb are characterized by the following.
1) When "1" is received, signal Ra from correlator 370 will show an auto-correlation peak Pa much larger than other instance when auto-correlation peak Pa appears in Ra, cross-correlation peaks in Rb will be much smaller than the auto-correlation peak Pa.
2) When "0" is received, signal Rb from correlator 380 will show an auto-correlation peak Pb much larger than other parts of signal Rb. In addition, at an instance when auto-correlation peak Pb appears in Rb, cross-correlation peaks in ion peak Pb.
3) Only one of two correlation signals Ra and Rb will always contain an auto-correlation peak when the incoming both signals Ra and Rb are synchronized within a demodulator 390 and a synchronization control circuit 410.

The demodulator 390 uses the preceding characteristics of Ra and Rb to demodulate digital data from its input signals Ra and Rb. Thus, if Ra shows an auto-correlation peak much larger than a peak in Rb, then the demodulator 390 will output "1"; otherwise, it will output "0."

Figure 4:
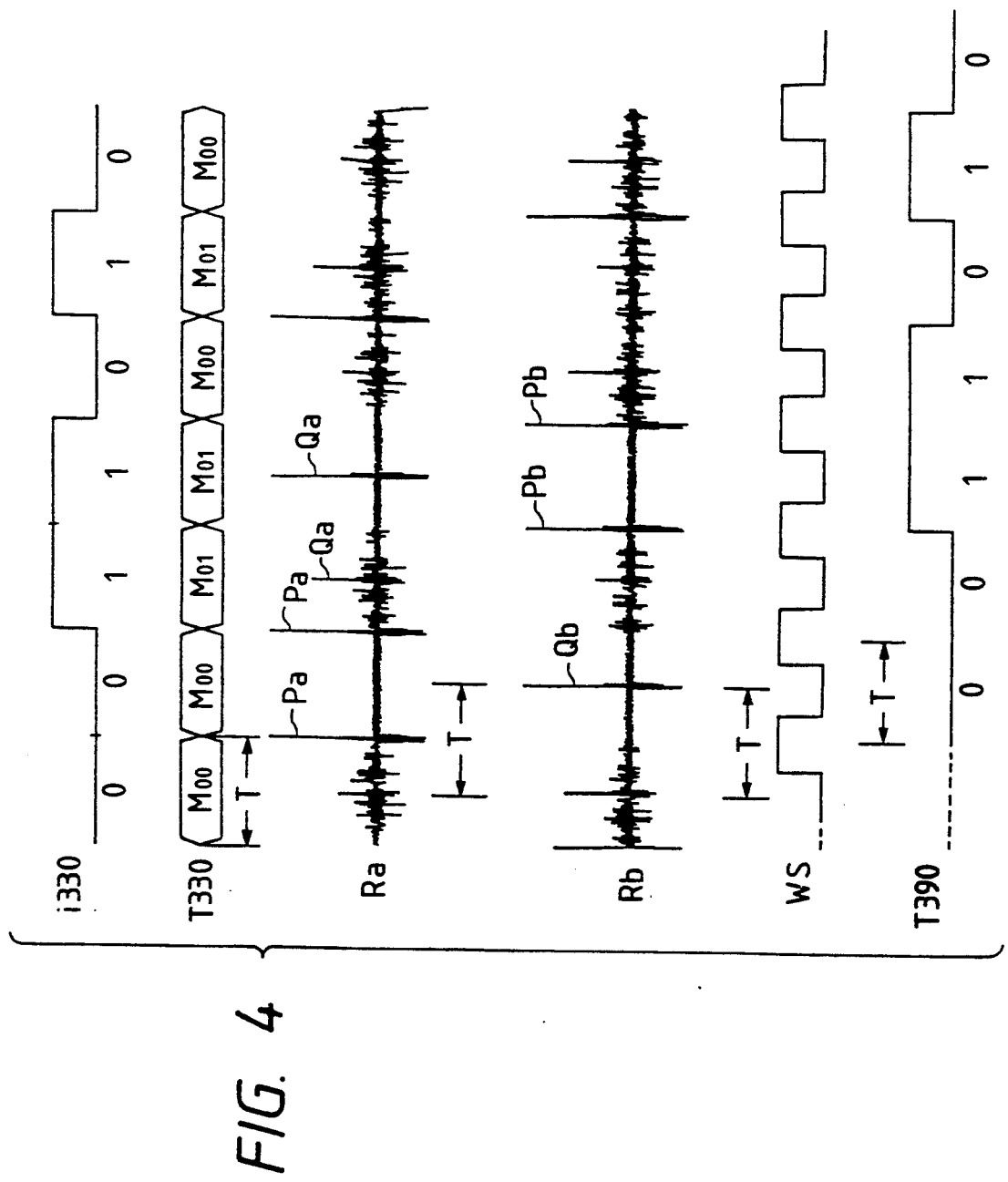
FIG. 4 shows waveforms at various points in the system shown in FIG. 3.

If transmitted signal T350 has been corrupted by noise, large cross-correlation peaks (not Qa or Qb, as shown in FIG. 4) may develop within Ra and Rb, as shown in FIG. 4. Large cross-correlation peaks may cause undesired demodulation of an incoming data stream if demodulator 390 confuses an actual auto-correlation peak with the cross-correlation peaks. For example, if a cross-correlation peak, whose size is much larger than auto-correlation peak Pa, were to appear in Rb at the same time as Pa, demodulator 390 may incorrectly decide that "0" has been received.

The demodulator 390 monitors segments of Ra and Rb in order to capture its incoming data stream. Duration of monitored segments, within aforementioned period T, is controlled by a window signal WS. Window signal WS may assume either "1" or "0". However, the demodulator 390 will monitor correlated signals Ra and Rb only when window signal WS is "1".

Signal WS is regulated by timing pulses generated by a synchronization control circuit 410. However, in general, timing of signal WS may be controlled by other circuit modules in the CSK communication system.

The correlated signals Ra and Rb are also input to the carrier detecting circuit 400 and the synchronization control circuit 410. Carrier detecting circuit 400 detects a presence of data based on the shape of correlated signals Ra and Rb. If the carrier detecting circuit senses the presence of transmitted data i330, then it will produce synchronization signals for the synchronization control circuit 410. Synchronization control circuit 410 will, in turn, generate timing pulses for demodulator 390 and for carrier detecting circuit 400. Both synchronization control circuit 410 and carrier detecting circuit 400 provide a support for demodulator 390 to properly demodulate incoming data.

Modulator

Figure 5A:
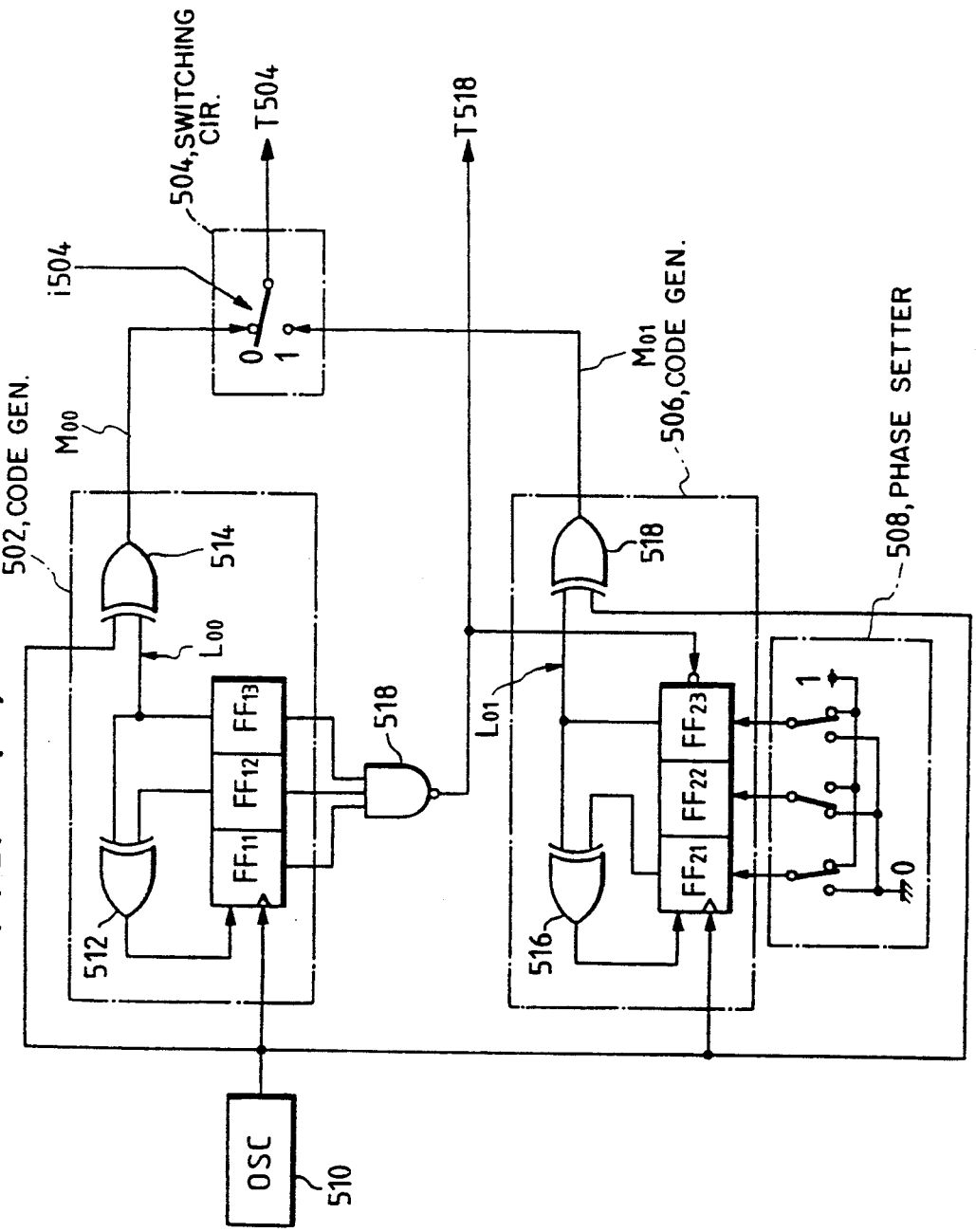
FIG. 5(a) is a block diagram of a modulator.
Figure 5B:
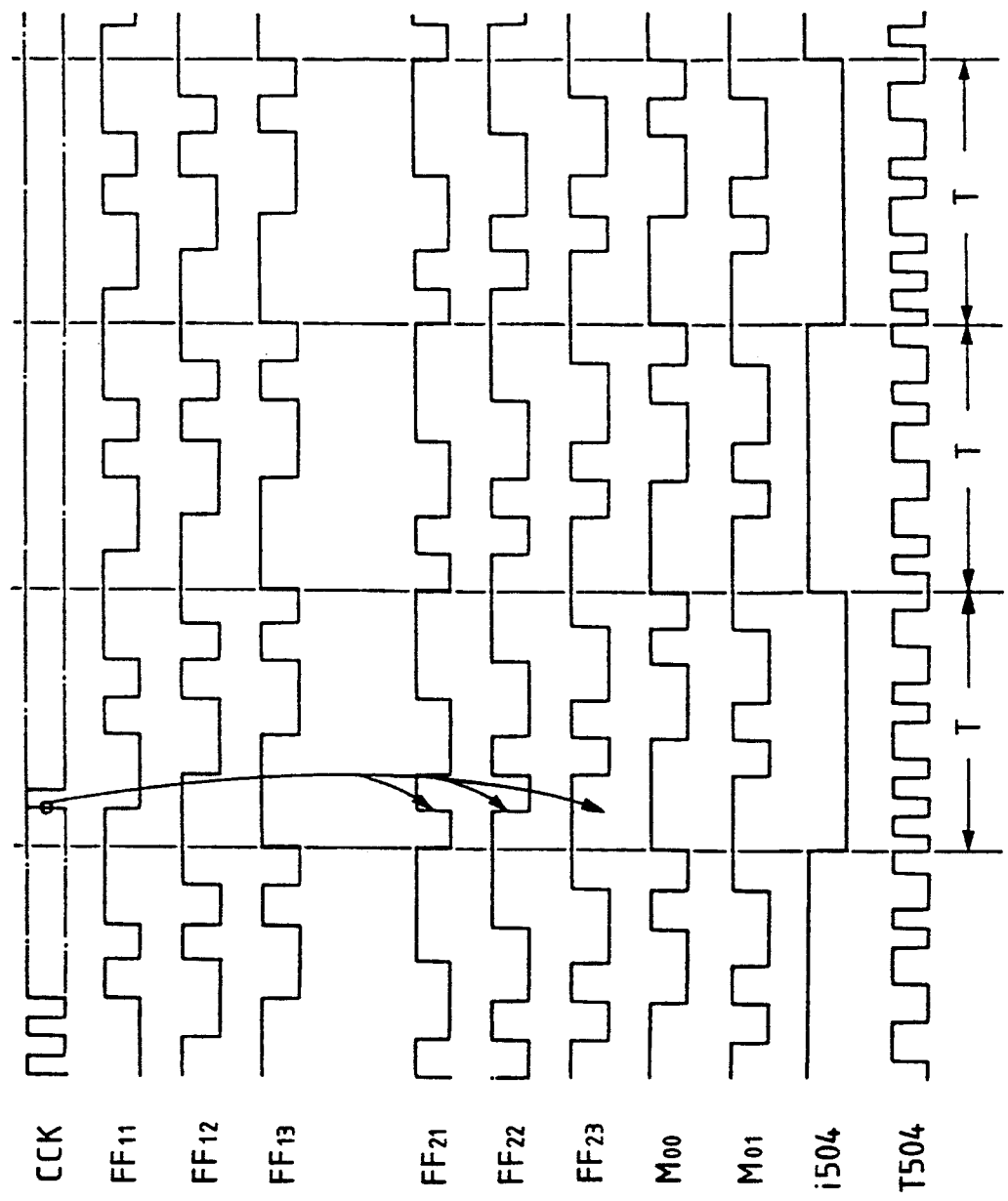
FIG. 5(b) shows signal waveforms at various points in the modulator shown in FIG. 5(a).

FIG. 5(a) is a block diagram of one embodiment of CSK modulator 340 (FIG. 3), which includes two M-series code generators 502 and 506. Signal waveforms from various parts of CSK modulator 390 (FIG. 3) are presented in FIG. 5(b).

Connecting three registers FF11–FF13 in series forms an M-series code generator 502, with outputs from FF12 and FF13 feeding into FF11 via an EX-CLUSIVE (EX-OR) gate 512 (equivalent to binary MODULO-2 adder).

Initially, each register F11–F13 contains a chip value of "1"; then, at each rising edge of the clock signal CLK, each register shifts its value to the right. Continuous generation of chips at register FF13 is guaranteed by a feedback structure with EX-OR gate 512 feeding a new chip value into register FF11. Finally, EX-OR "gating" the output from FF13 synchronously with clock signal CLK generates a Manchester M-series code. A second Manchester M-series generator 506 operates similarly to generator 502.

Code generators 502 and 506 satisfy the following conditions.

1) Two shift-registers in generators 502 and 506 produce two M-series codes L00 and L01 of equal lengths, each of which is EX-ORred to generate M00 and M01.

2) Each generator outputs its code M00 synchronously with the clock signal CLK.

3) All 1's condition of one shift-register determines the phase of other shift-register. As shown in FIG. 5(a), when FF11–FF13 all contain 1's, NAND gate 518 enables the bottom shift-register to load in a sequence of 1's and 0's in accordance with initial phase setting device 508.

4) Each of codes M00 and M01 is a Manchester code.

Switching circuit 504 selects one of two codes M00 and M01, depending on its input data i504. Input data consists of stream of bits, with each bit either "1" or "0." When an incoming bit is "1," circuit 504 chooses code M00; otherwise, circuit 504 chooses code M01. Each time circuit 504 transmits a code sequence, NAND gate 518 outputs a transmission request signal T518. In response, a transmitted data processing block [not shown in FIG. 5(a)] supplies switching circuit 504 with a single bit.

Figure 6:
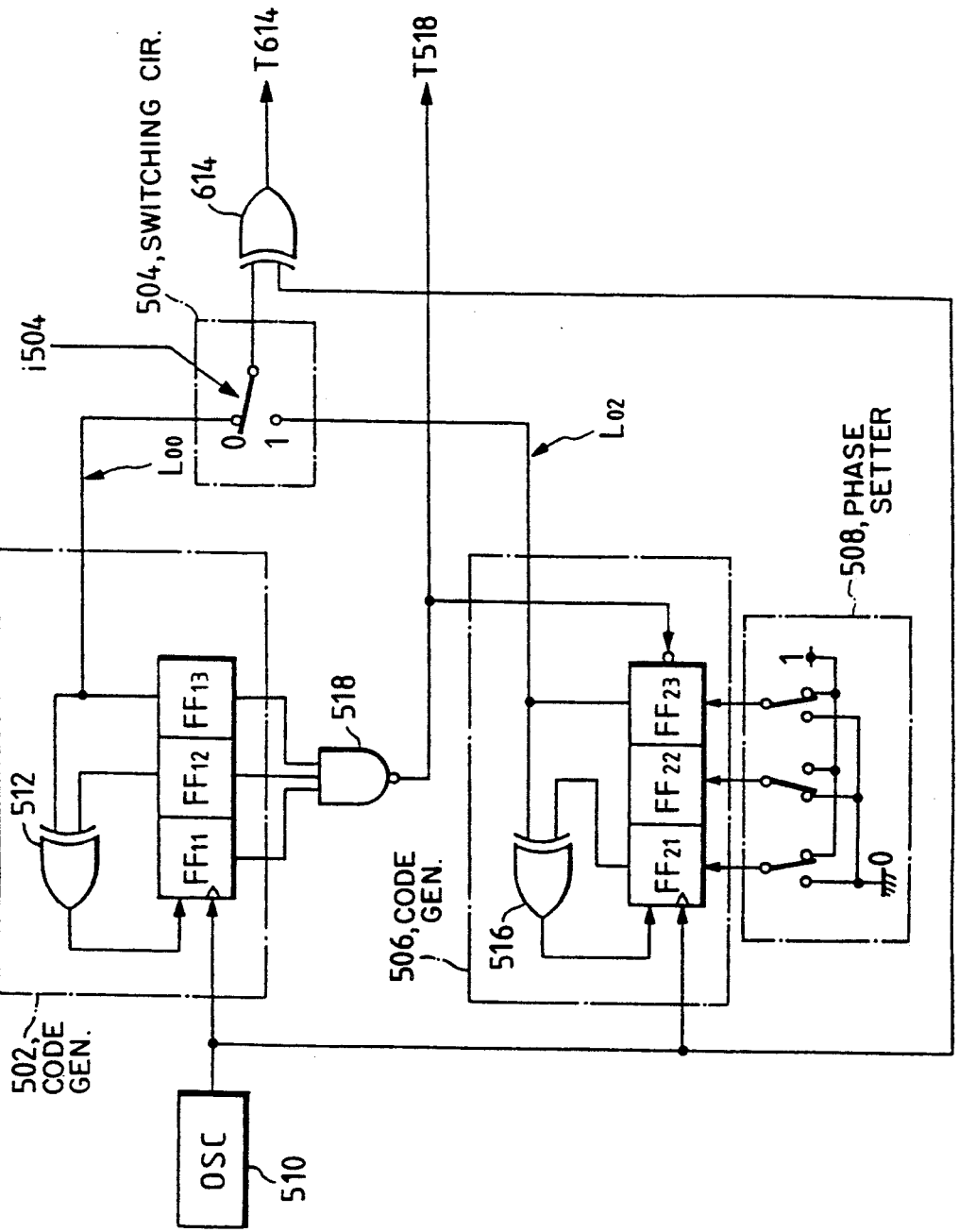
FIGS. 6, 7, and 8 show other embodiments of a modulator according to the present invention.

FIG. 6 is a block diagram of another embodiment of CSK modulator 340. Its structure is similar to that shown in FIG. 5(a); corresponding parts have been labelled with same numbers. EX-OR gates 514 and 518 as shown in FIG. 5(a) have been eliminated from generators 502 and 506. Instead, EX-OR gate 614, which receives outputs from switching circuit 504 and clock (or an oscillator) 510, has been placed at the output side of switching circuit 504. Modulator 340 of this particular construction requires one less number of EX-OR gates than that shown in FIG. 5(a).

Figure 7:
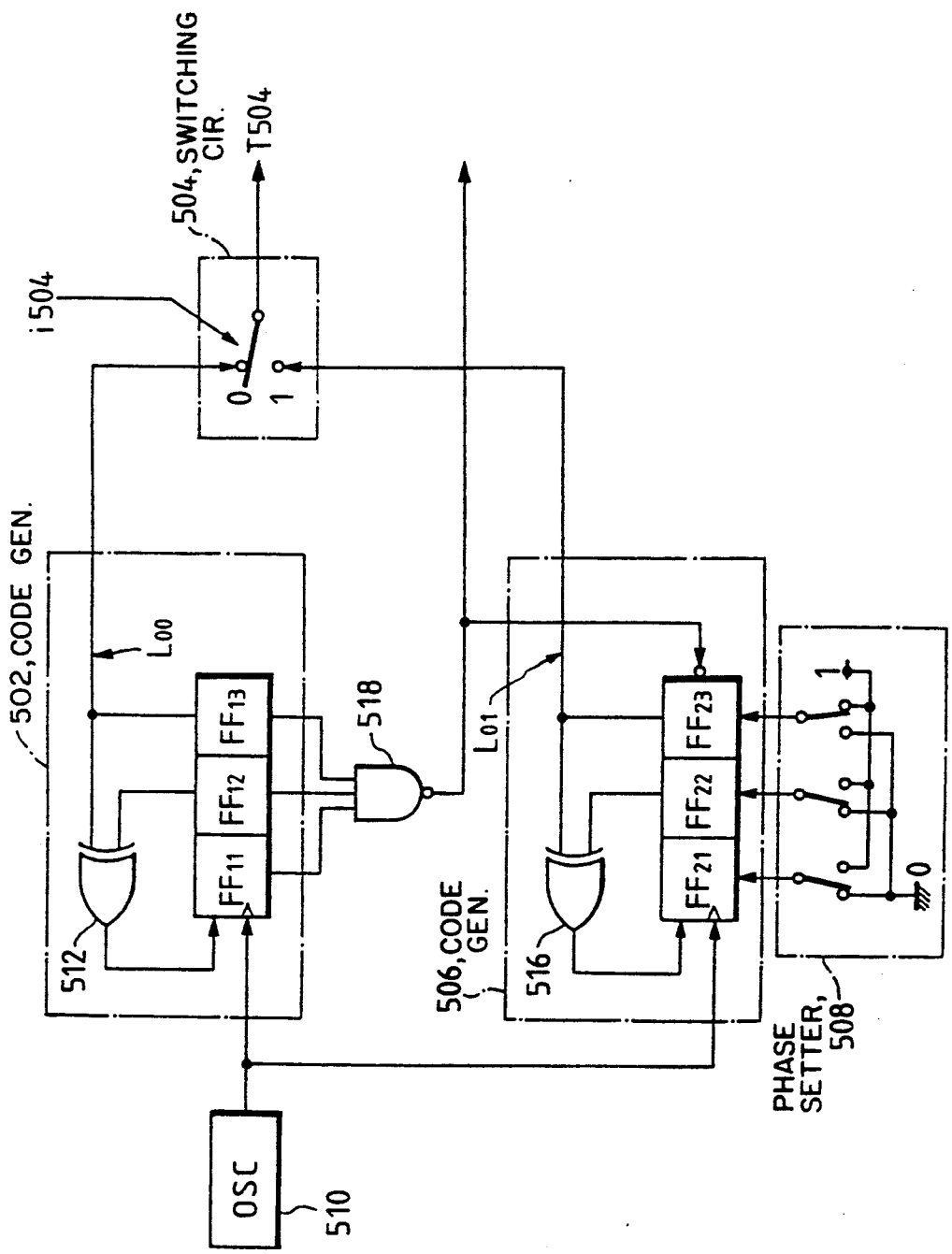

FIG. 7 is a block diagram of yet another CSK modulator 340, in which feedback tap locations for two shift-registers are identical. Thus, two generators 502 and 506 output the same M-series code. However, since initial states of the two shift-registers are different, phase of code L00 is different from that of code L01.

M-series code L00 from generator 502 in FIG. 7 is not a Manchester code. However, if desired, code L00 may be converted into a Manchester code by inputting clock signal CLK and code sequence L00 (output from F13) into an EX-OR gate. Each transition of incoming clock signal CLK is synchronized to the center of each chip. The EX-OR gate will then output a Manchester M-series code. The same applies to code L01.

Even though the labels L00 and L01 have been used to differentiate codes outputted from the shift-registers F11–F13 and F21–F23 and the labels M00 and M01 for Manchester codes formed from L00 and L01, labels M00 and M01 will now be used to designate both L00 and L01, as well as M00 and M01.

Contents of registers FF11 through FF13 are shown below for eight clock cycles.

| St. No. | FF11 | FF12 | FF13 | |
|---------|------|------|------|---|
| 1 | 1 | 1 | 1 | ← initial state |
| 2 | 0 | 1 | 1 | |
| 3 | 1 | 0 | 1 | |
| 4 | 0 | 1 | 0 | |
| 5 | 0 | 0 | 1 | |
| 6 | 1 | 0 | 0 | |
| 7 | 1 | 1 | 0 | |
| 1 | 1 | 1 | 1 | ← back to initial state |

When the shift-register in generator 502 is in an all 1's state, the shift-register in generator 506 is at 1 0 0 state. Thus, relative to code M00, code M01 is delayed by four chips, or equivalently four clock cycles (four chip = half of the period of code L00 = T/2).

For CSK systems employing two codes M00 and M01 in which code M00 is different from code M01 only in its phase, large inter-correlation peaks Qa and Qb (FIG. 4) appear in signals Ra and Rb. To prevent Qa and Qb from causing incorrect demodulation of data, the phases of codes M00 and M01 are offset by approximately T/2. By the virtue of the offset, each inter-correlation peaks Qa and Qb appear in the proximity of the boundary region of period T. Auto-correlation peaks Pa and Pb are at or near the center of each period.

Figure 8:
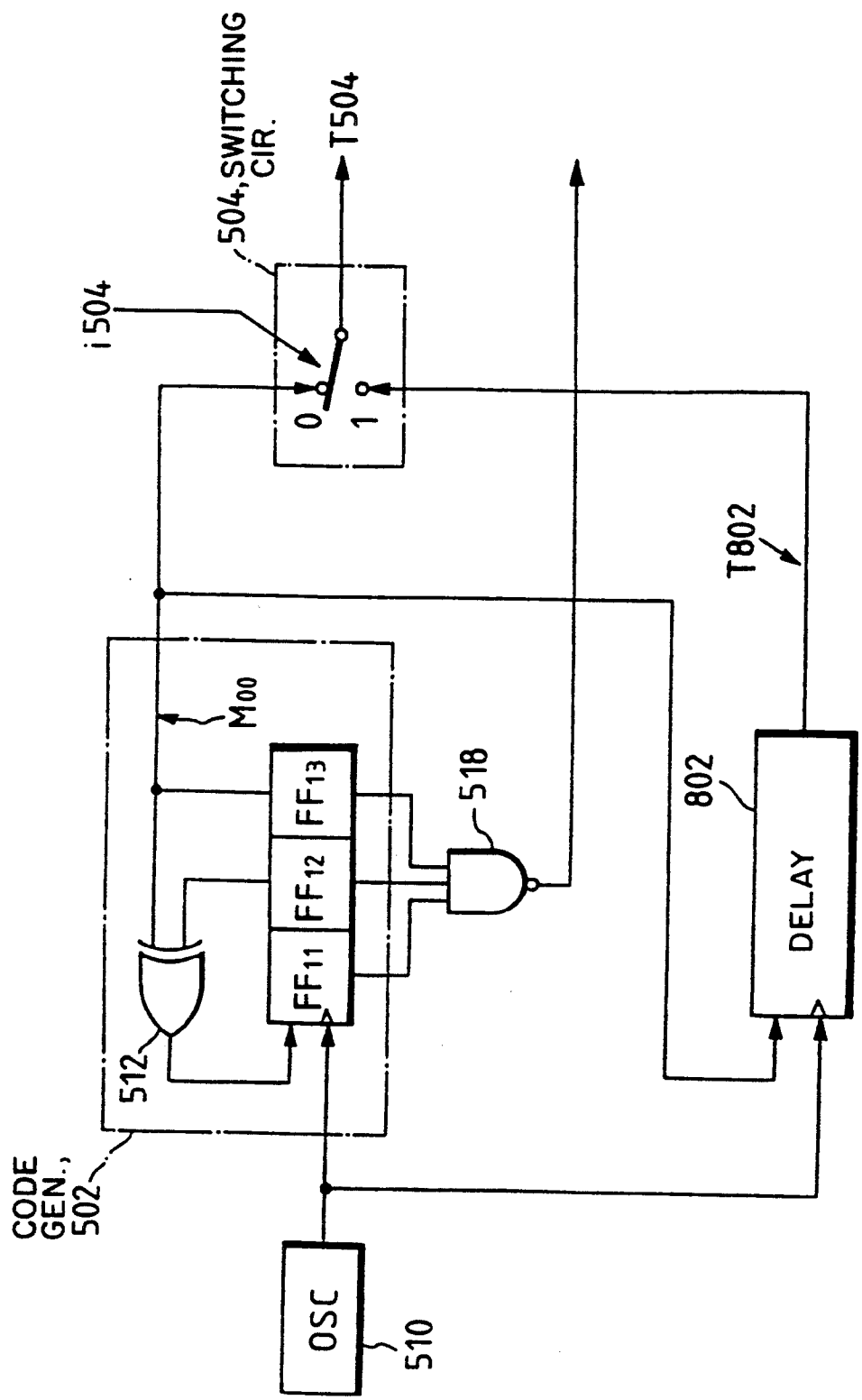

FIG. 8 is a block diagram of another CSK modulator 340. M-series code generator 506 and initial phase setting circuit 508 as displayed in FIG. 7 have been replaced by the delay circuit 802. Delay circuit 802 takes as its inputs two signals: an output from M-series generator 502 and clock signal CLK. Circuit 802 then outputs M01, a delayed version of code M00. Delay circuit 802 may be constructed with registers.

For all CSK modulators described above, output waveforms from switching circuit 504 may contain distortions. To eliminate the distortion, output signal T504 may be buffered by a flip-flop.

Correlator

Figure 9:
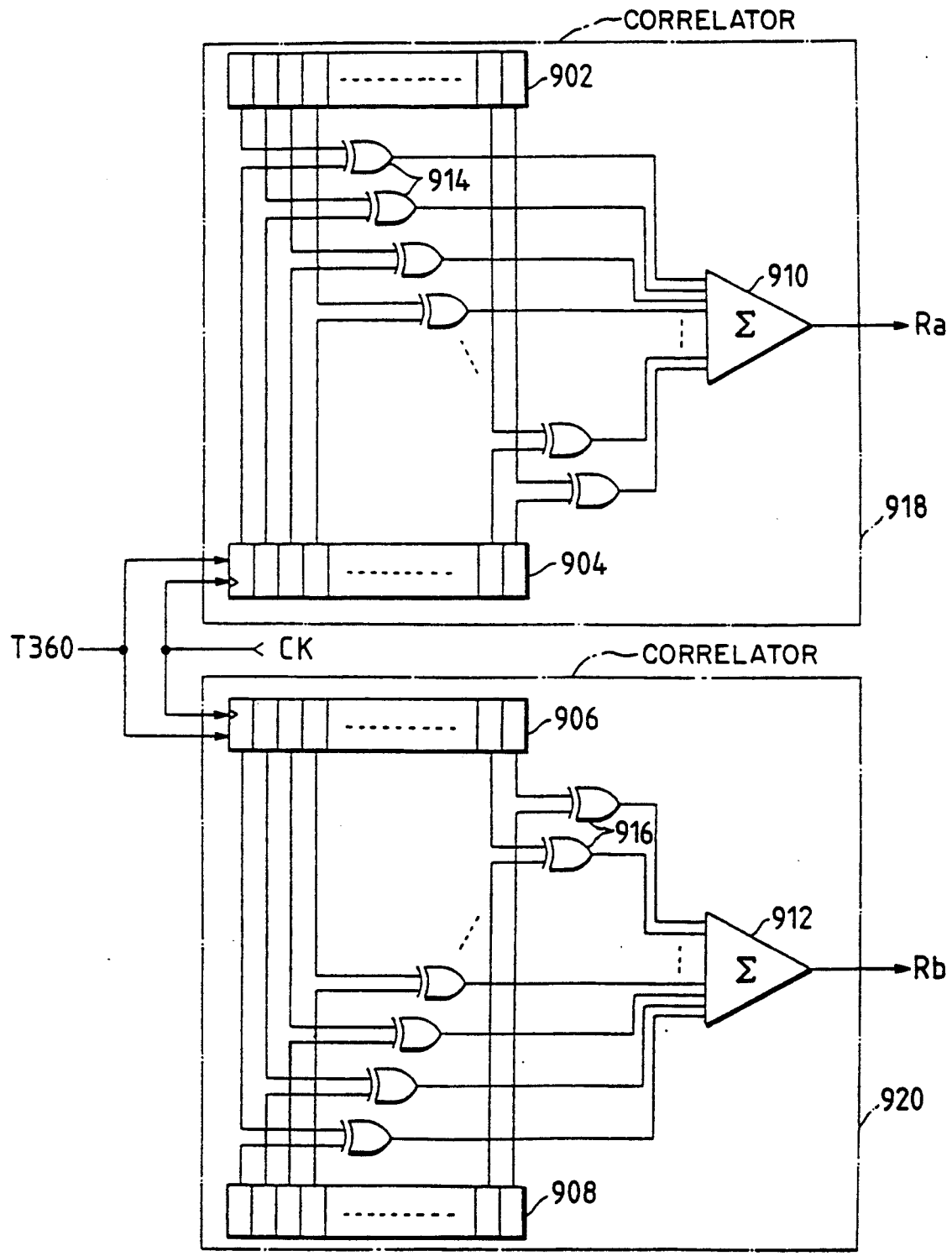
FIG. 9 is a schematic diagram of a pair of correlators.

FIG. 9 is a schematic diagram of one embodiment of correlators 370 and 380 for a CSK system using either a Manchester M-series code or a simple M-series code.

For CSK systems using simple M-series codes, the frequency of the correlator clock signal CK is set at a rate equal to that of modulator clock signal CLK. However, for CSK systems using Manchester M-series codes, the frequency of clock signal CK is set at a rate twice as high as that of modulator clock signal CLK.

The correlators 370 and 380 comprise two shift-registers 902 and 908, respectively. Shift-register 902 holds a replica of code M00, and shift-register 908 holds a replica of code M01. The number of stages in each of shift-registers 902 and 908 is equal to the number of chips produced during period T by each of generators 310 and 320.

The number of shift-register stages required in 902 and 908 depends on whether generators 502 and 506 (FIG. 5(a)) produce Manchester M-series codes or simple M-series codes. Let P = the number of stages in shift-registers 502 and 506. Also, let n = the number of stages in shift-registers in generators 502 and 506. For a Manchester M-series code, $P = 2 \cdot (2^n - 1)$. However, for a simple M-series code, $P = 2^n - 1$.

Correlators (370 and 380 in FIG. 3) 918 and 920 include two shift-registers 904 and 906, respectively. Each shift-register receives signal T360 (FIG. 3) as its input and propagates signal T360 through its register stages in accordance with the clock signal CK. The number of stages in 904 and 906 are equal to that in 902 and 908.

Shift-registers 902 and 904 are connected in the manner described below.
1) Chip values held by each stage of shift-register 902 and a corresponding stage of shift-register 904 are tapped and input to an EX-OR gate 914.
2) The output from each EX-OR gate 914 is inverted and input to an accumulator 910. Accumulator 910 sums outputs from EX-OR gates 914 and generates correlation signal Ra.

Shift-registers 906 and 908 are configured similarly to 902 and 904.

Figure 14:
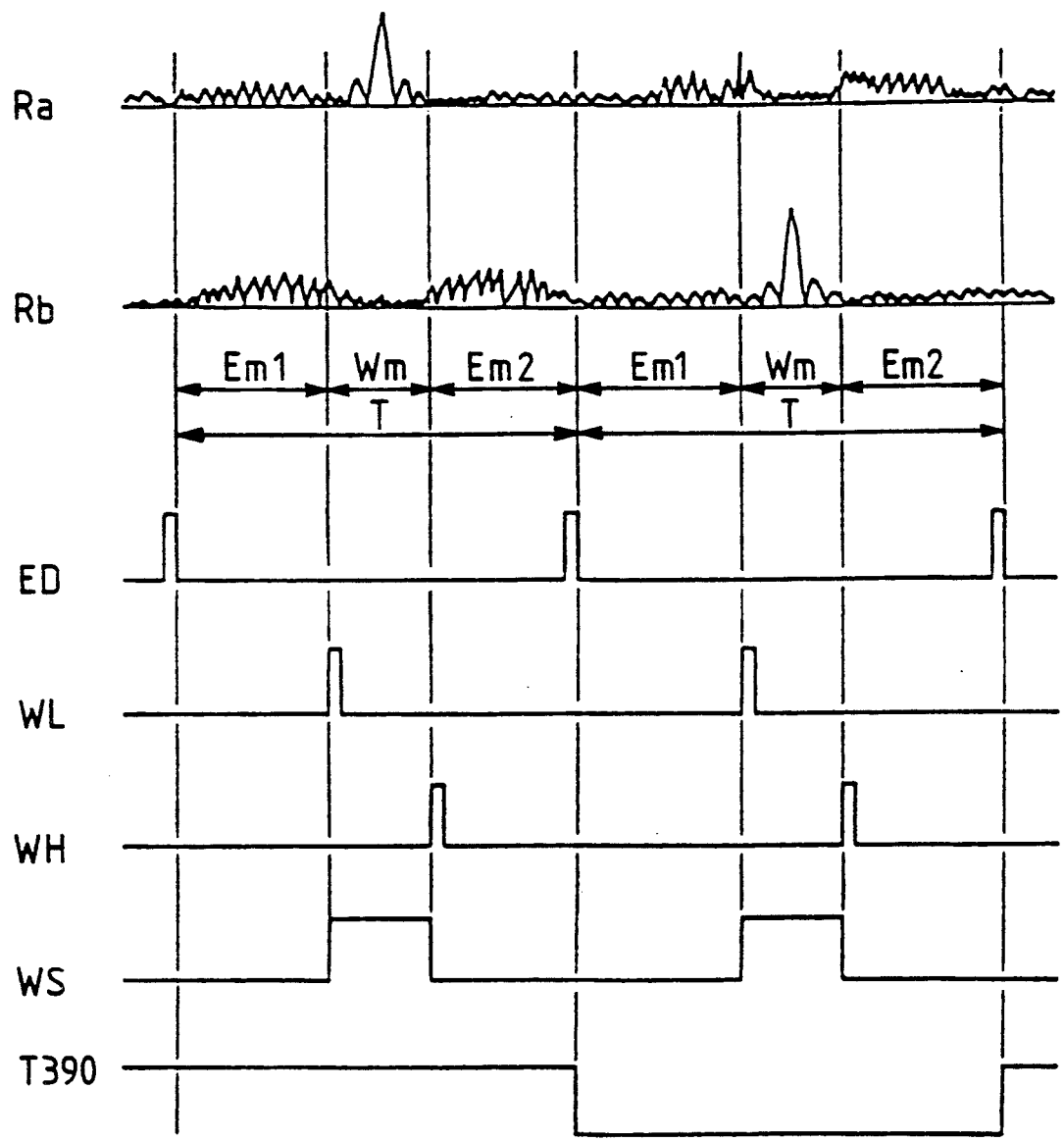
FIG. 14 shows waveforms at various points within the demodulator of FIG. 13.

Output Ra from accumulator 910 shows the degree of correlation between the local replica of code M00 and incoming signal T360 (FIG. 3, FIG. 14). Output Rb shows the degree of correlation between the local replica of code M01 and signal T360 (FIG. 3, FIG. 14). Signal Ra or Rb attains its maximum size whenever a code contained in T360 aligns with one of codes M00 or M01 stored in shift-registers 902 and 904.

Figure 10:
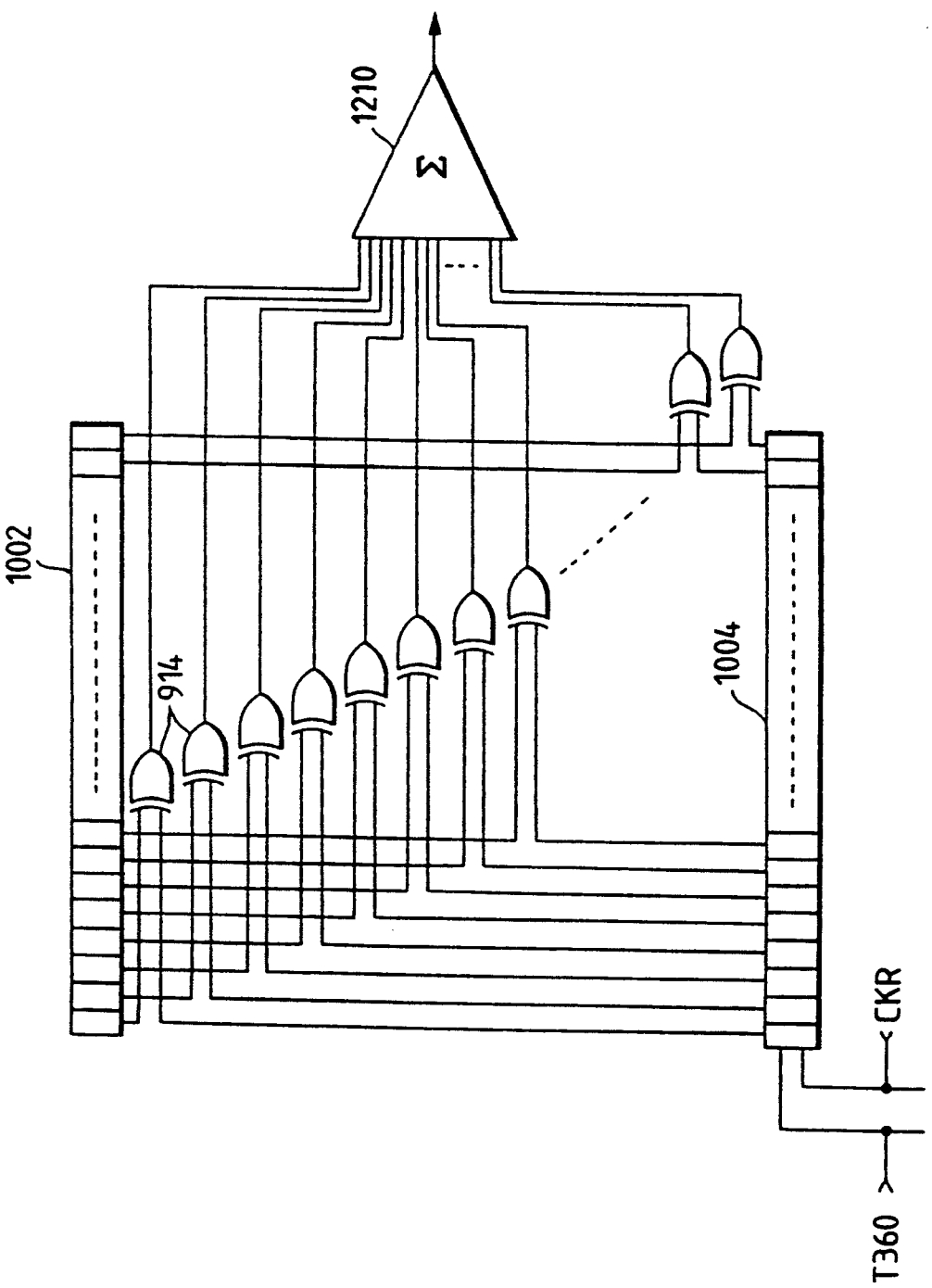
FIGS. 10, 11, and 12 show other embodiments of the pair of correlators.

FIG. 10 is a block diagram of a modified embodiment of correlator 918 in FIG. 9. P-stage shift-registers 902 and 904 in FIG. 9 have been replaced with P×R-stage shift-registers 1002 and 1004. Also, shift-registers 1002 and 1004 are driven by the clock signal CKR, whose frequency is R-times that of clock signal CK. Because shift-registers 1002 and 1004 comprise R-times as many stages as 902 and 904, the accumulator 910 sums m-times as many outputs from EX-OR gates as accumulator 1010. Consequently, the precision of accumulator 1010 is also correspondingly greater than that of accumulator 910.

Similar modifications may be made to correlator 920 in FIG. 9.

Figure 11:
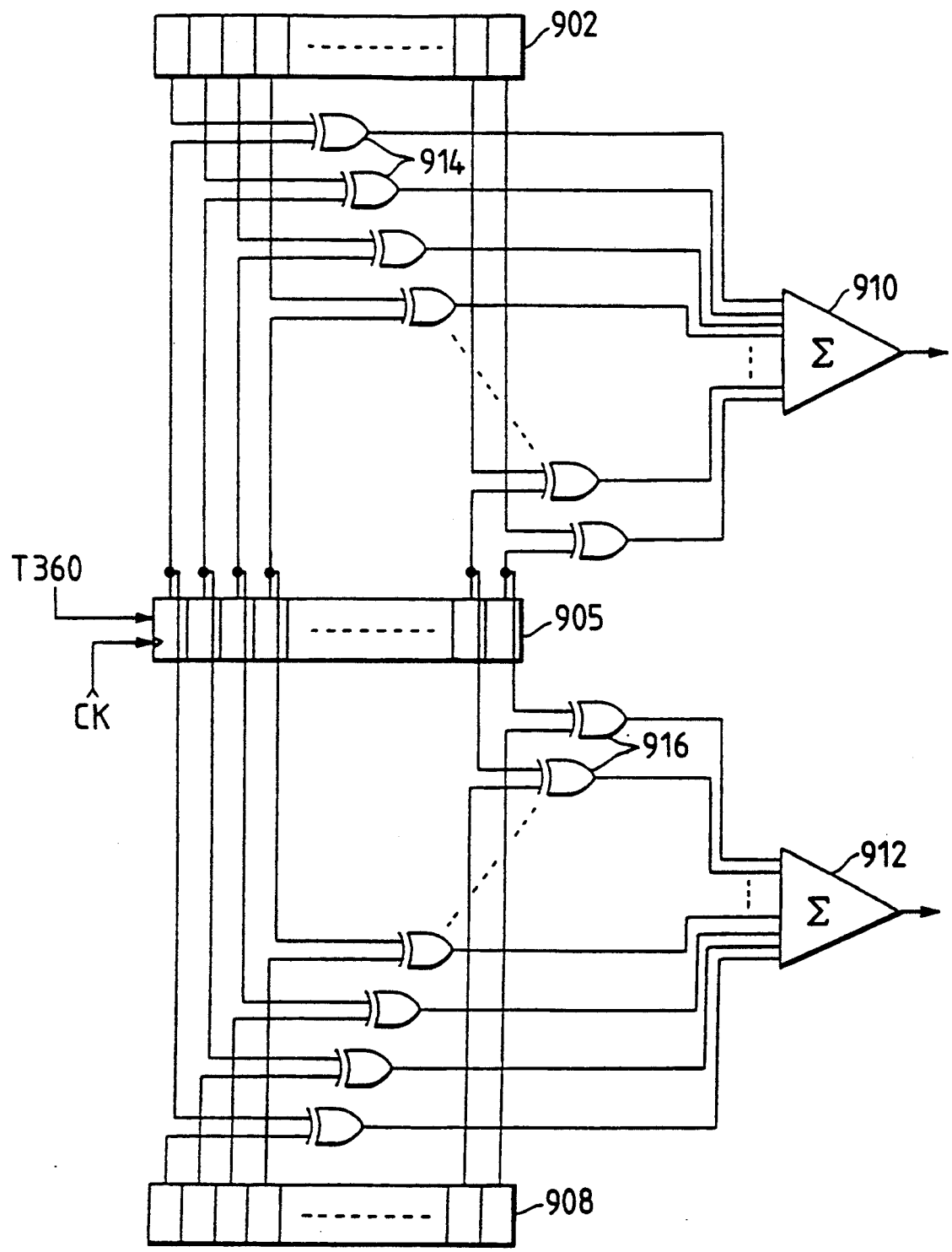

FIG. 11 is a block diagram of an alternative embodiment of correlators 918 and 920. A single shift-register 905 replaces two shift-registers 904 and 906 (in FIG. 9) and is shared by correlators 918 and 920 (not labelled in FIG. 11). This allows reduction of the number of shift-registers required for construction of correlators. If desired, the embodiment of FIG. 11 may be modified so that the number of stages may be increased R-fold.

Figure 12:
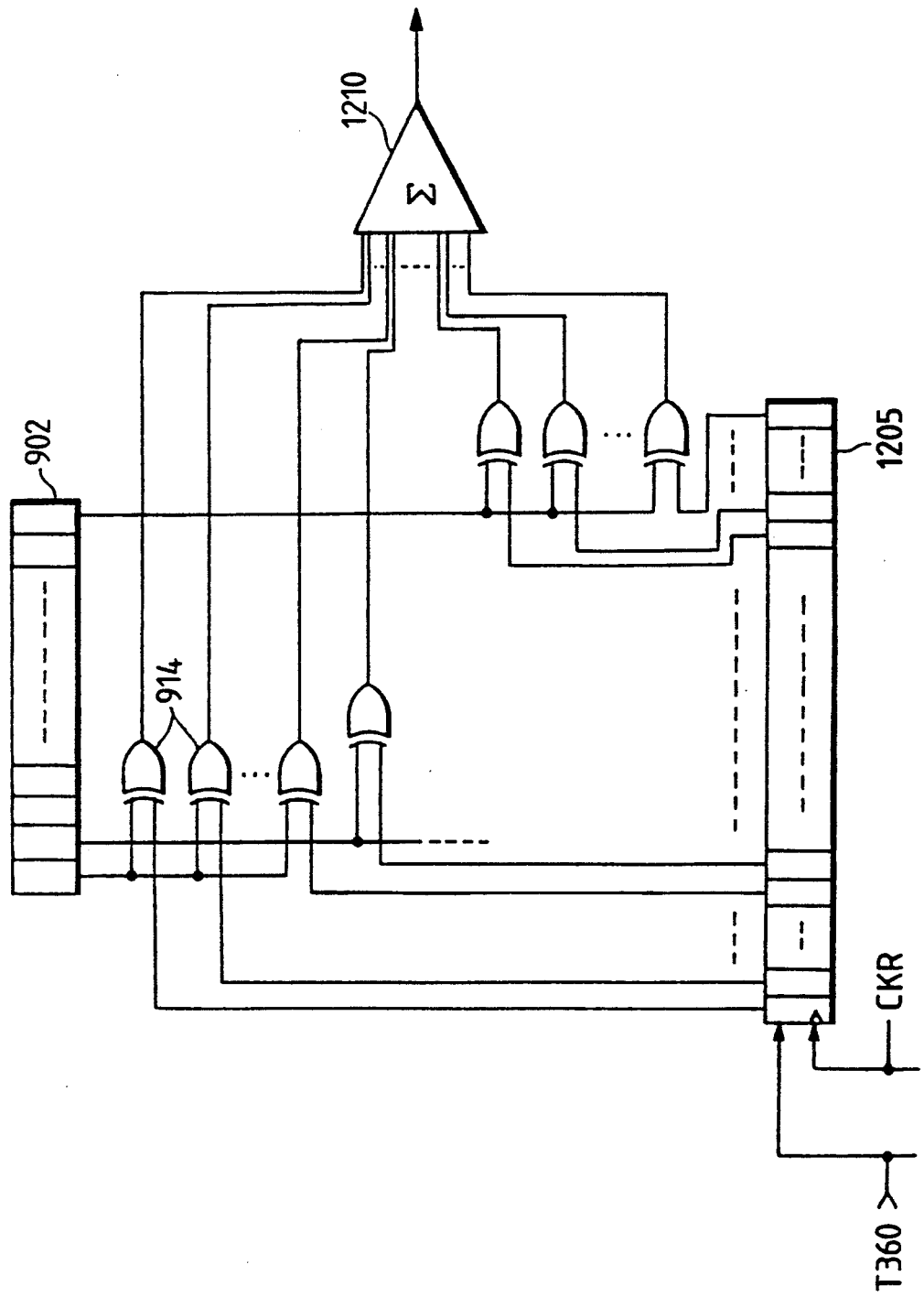

FIG. 12 is a block diagram of a modified embodiment of correlator 918 in FIG. 11. Shift-register 905 has been replaced by P x R-stage shift register 1205, which is driven by the clock signal CKR.

Demodulator, Carrier Detecting Circuit, and Sync Control (DCS)

In an actual CSK system, each subcomponent circuit module need not correspond exactly to one of functional subcomponents shown in FIG. 3. For example, a single circuit module may serve as both demodulator 390 and carrier detecting circuit 400.

The present disclosure reveals two general embodiments of CSK system, which may be called, respectively, DCS Type 1 and DCS Type 2. DCS Type 1 refers to CSK system configurations in which three separate circuit modules exist for demodulator 390, carrier detecting circuit 400, and synchronization control circuit 410. DCS Type 2 refers CSK system configuration in which functions of demodulator 390 and carrier detecting circuit 400 are shared by a single circuit module.

DCS Type 1

Demodulator

Figure 13:
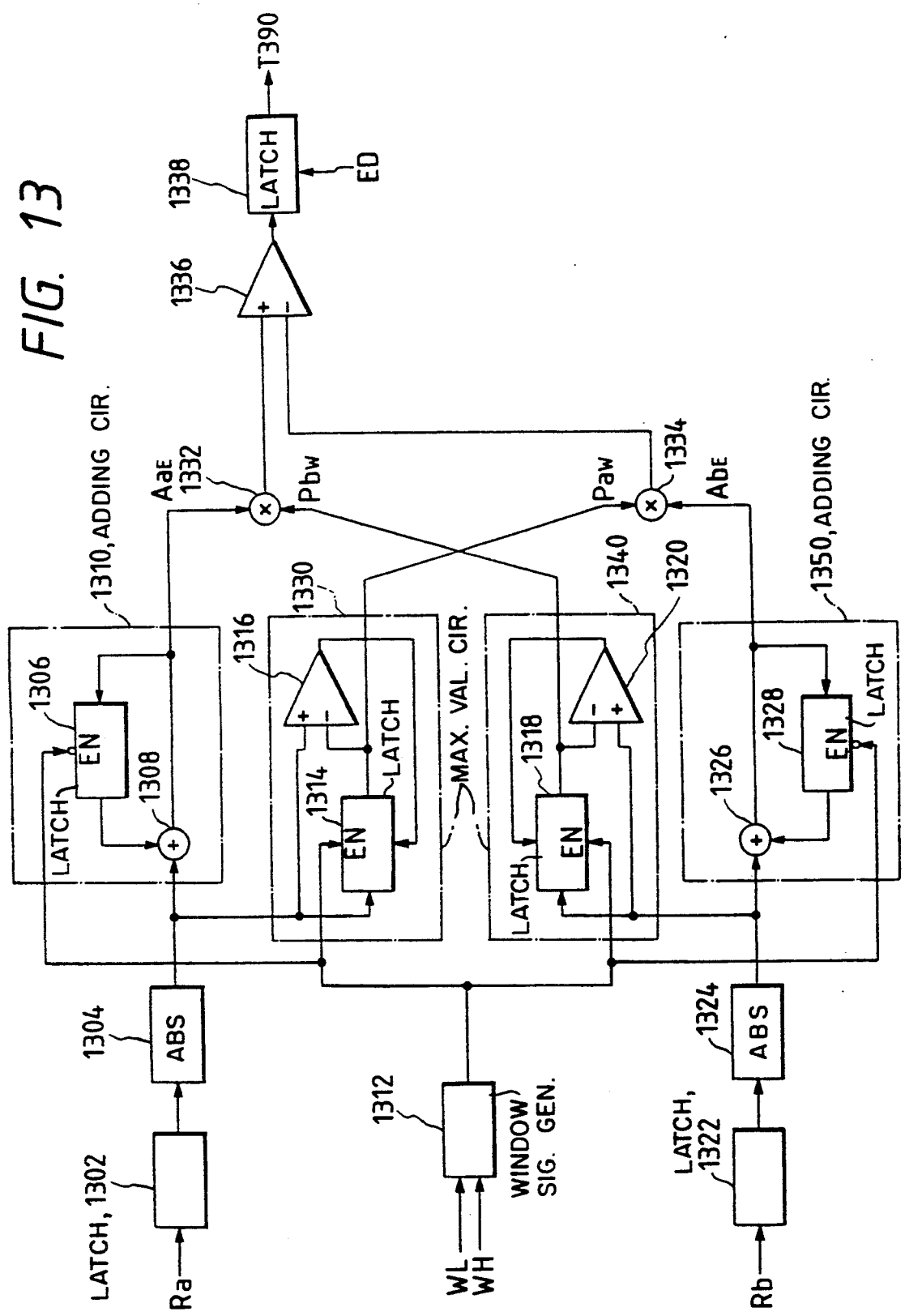
FIG. 13 is a block diagram of a demodulator.

CSK demodulator 390 in FIG. 3 is detailed in FIG. 13 as a digital circuit operating synchronously with clock signal CK. The clock signals have been omitted from the figure in order to simplify its representation of demodulator 390.

Signal waveforms from various parts of demodulator 390 are presented in FIG. 14, in which correlation signals Ra and Rb are drawn as analog signals. Operations on signals Ra and Rb by demodulator 390 depends on a duration of time segment for each datum, whose beginning and end are signaled by ED pulses. Each data time segment, T seconds long, is partitioned into three segments: Em1, Wm and Em2. In FIG. 14, Em1 and Em2 are shown to be of equal lengths. However, in general, lengths of Em1 and Em2 need not be equal. Furthermore, Wm need not be placed at the center of each data time segment.

When Synchronization control circuit 410 in FIG. 3 detects the presence of data i330, it generates three timing signals for demodulator 390. The three signals are a data section end signal ED, a demodulation window start pulse WL, and a demodulation window stop pulse WH. Signal ED regulates the location of an end point of each data time segment so that an auto-correlation peak appears at the center of each data time segment. Signals WL and WH mark a start and an end of each monitoring window for each data time segment.

Before the demodulation algorithm of circuit 390 can be described, some of the terms in FIG. 13 need to be defined.

Paw is an auto-correlation peak value (maximum value) of Ra in a Wm section.

Pbw is an auto-correlation peak value (maximum value) of Rb in a Wm section.

AaE is an integration value (accumulated over time) of Ra in Em1 and Em2 sections; and AbE is an integration value (accumulated over time) of Rb in Em1 and Em2 sections. Sections Em1, Wm, and Em2 in above definitions are all contained within a single data time segment.

The data at the output of demodulator 390 (T390) are generated in accordance with the following rule.

Rule 1: if Pbw AaE > Paw AbE, an output datum will be set to "1"; otherwise, the datum will be set to "0."

Rule 1 may appear cumbersome compared to the rule shown below.

Rule 2: If Pbw > Paw, an output datum will be set to "1"; otherwise, the datum will be set to "0."

However, in the presence of noise in signal T350 (FIG. 3), rule 1 is more robust than rule 2.

If correlators 310 and 320 generate two codes in which one code is merely a phase-shifted version of M00, large inter-correlation peaks will appear in Ra and Rb. Furthermore, integration of inter-correlation peaks over sections Em1 or Em2 will render AaE and AbE extremely large, allowing rule 1 to provide for an accurate demodulation in the presence of noise.

If correlators 310 and 320 produce two distinct M-series codes to represent "1" and "0," then AaE and AbE will have the following property: if AaE > AbE, then likely "1" will be received. This property is used in rule 1 to increase the stability of demodulation in the presence of noise.

Input signals to demodulator 390 comprise: Ra, Rb, WL, WH, and ED. Correlation signal Ra is input to the latch 1302 and then directed to absolute value circuit 1304, which simply outputs absolute value of its input data. Correlation signal Rb is routed similarly. Demodulation window start pulse WL and demodulation window stop pulses WH regulate timing of window signal generating circuit 1312, which outputs window signal WS in accordance with WL and WH.

The adding circuit 1310 accumulates values of Ra for the duration of Em1 and Em2. Via means of a feedback loop, the output from the adder 1308 is latched at 1306. At the rising edge of each input clock signal (not shown in FIG. 13), the latched value is added to the output of 1304 and latched again at 1306. By iterating the above-described procedure, circuit 1308 accumulates values of Ra during each clock cycle. Its result, signal AaE, is transmitted to the multiplier 1332.

The maximum value holding circuit 1330 finds the maximum value of Ra within a time window Wm. An output of "1" from the comparator 1316 ("1" or "0") causes a latching of signal value at 1314. At the rising edge of each input clock signal (also not shown in FIG. 13), the latched value is compared to the present value of Ra. Comparator 1316 will output "1" if the present input is larger than the latched value; else it will output "0"; in any event, larger of its two inputs is latched at 1314. By iterating just described procedure, latch 1314 finds and holds the maximum value of Ra within the duration of time spanned by Wm. Its output, signal Paw is transmitted to the multiplier 1334.

The maximum value holding circuit 1340 and the adding circuit 1350 function similarly to 1310 and 1330. Thus, the maximum value holding circuit 1340 outputs Pbw, and the adding circuit 1350 outputs AbE. Pbw and AbE are routed to the multipliers 1332 and 1334, respectively.

The multiplier 1332 and 1334 generates Pbw AaE and Paw AbE, respectively. Outputs from the multipliers are input to the comparator 1336.

Comparator 1336 first compares relative magnitudes of Pbw AaE and Paw AbE. Next, it outputs a signal "1" or "0" in accordance with rule 1, as described previously. The output of comparator 1336 is temporarily held at the latch 1338. When the data section end signal ED indicates an end of data time segment, the output of comparator 1336 is released by latch 1338 as demodulated data T390 (FIG. 3). At the same time, adding circuits 1310 and 1340 and the maximum value holding circuits 1330 and 1350 are all reset.

Major Embodiments of Carrier Detecting Circuit

Figure 15:
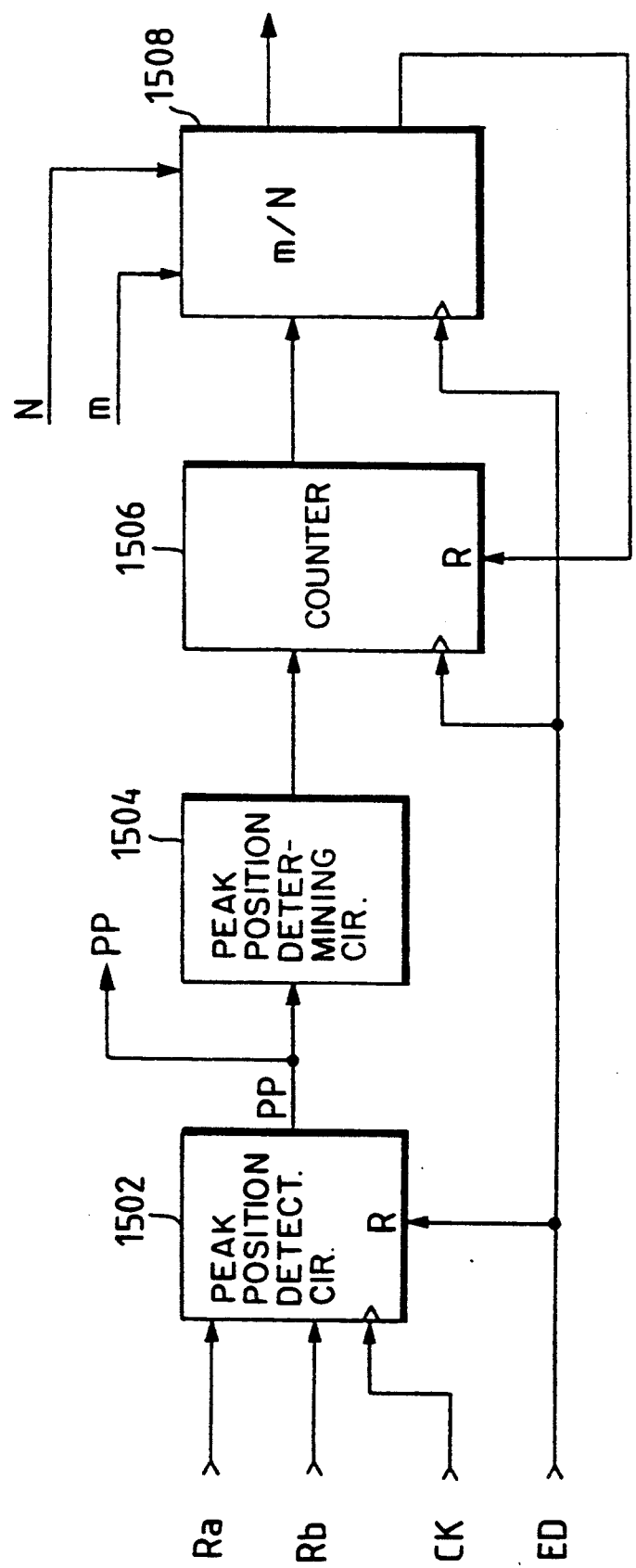
FIGS. 15 and 16 illustrate two examples of construction of a carrier detecting circuit.

The carrier detecting circuit 400 (FIG. 3) detailed in FIG. 15 comprises the following circuits.

A peak position detecting circuit 1502 for determining the location of peaks in the sum of signals Ra and Rb during a given data time segment.

A peak position determining circuit 1504 for dividing the given data time segments into subintervals, and then determining to which subinterval the determined peak position belongs.

A counting circuit 1506 for counting the number of occurrences of a peak within each subinterval.

An m/M determining circuit 1508. If an auto-correlation peak has been detected within a subinterval more than a predetermined number of times, then m/N determining circuit outputs a synchronization establishment signal indicating the presence of incoming data stream within received signal.

Circuit modules 1502 through 1508 are cascaded so that the output from each circuit feeds into its subsequent module. The output from m/M determining module 1508 is also the output of the entire carrier detecting circuit 400.

Figure 16:
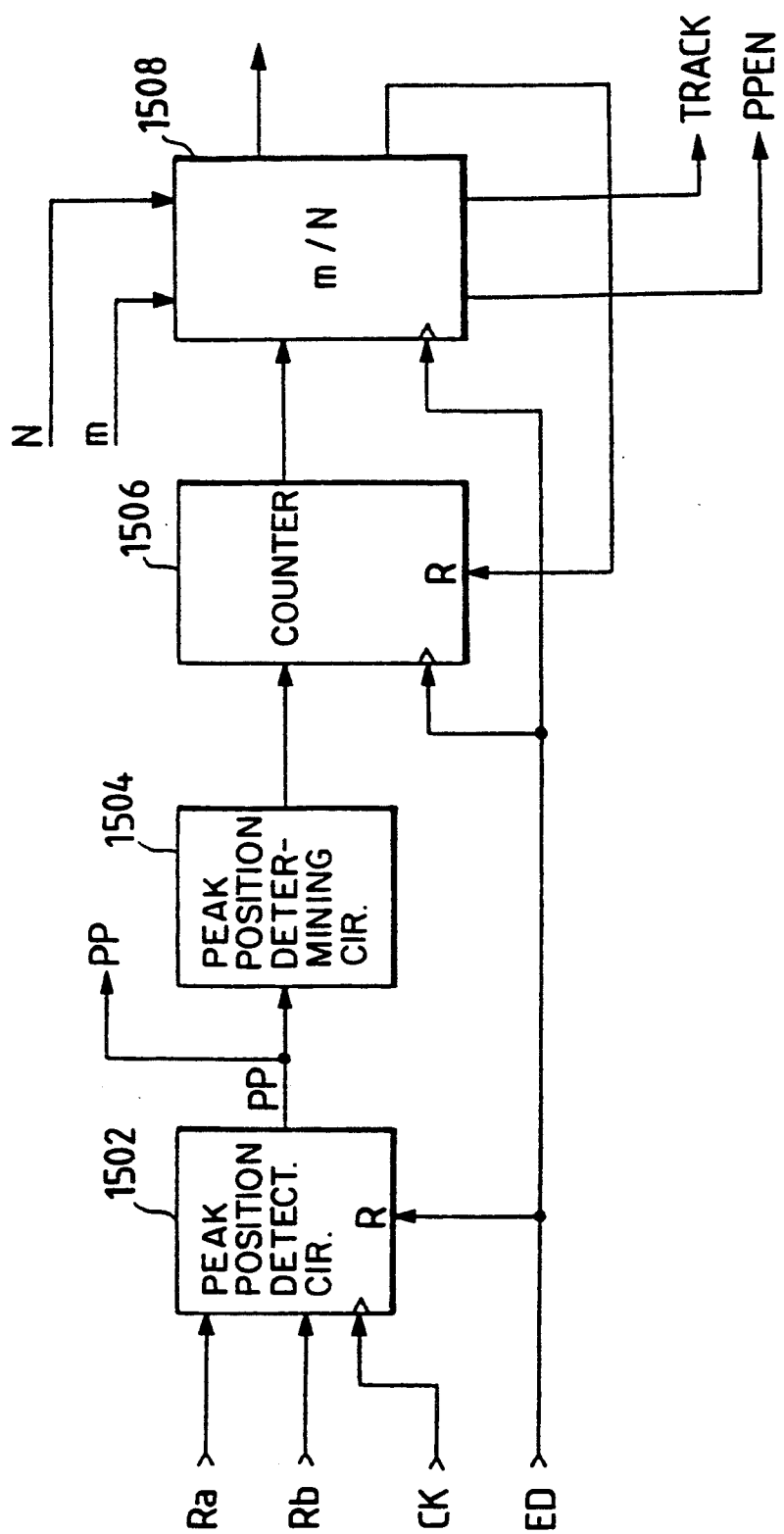

FIG. 16 illustrates another block diagram of carrier detecting circuit 400. However, the circuit 400 in FIG. 16 outputs two extra signals, PPEN and TRACK. The value "1" of PPEN indicates whether the peaks have arrived in one of above-mentioned subintervals for more than a predetermined number of times. TRACK indicates whether PPEN has assumed value of "1" within a given length of time.

Detailed descriptions of components 1502 through 1508 of carrier detecting circuit 400 are provided in following sections.

Peak Position Detecting Circuit

Figure 17:
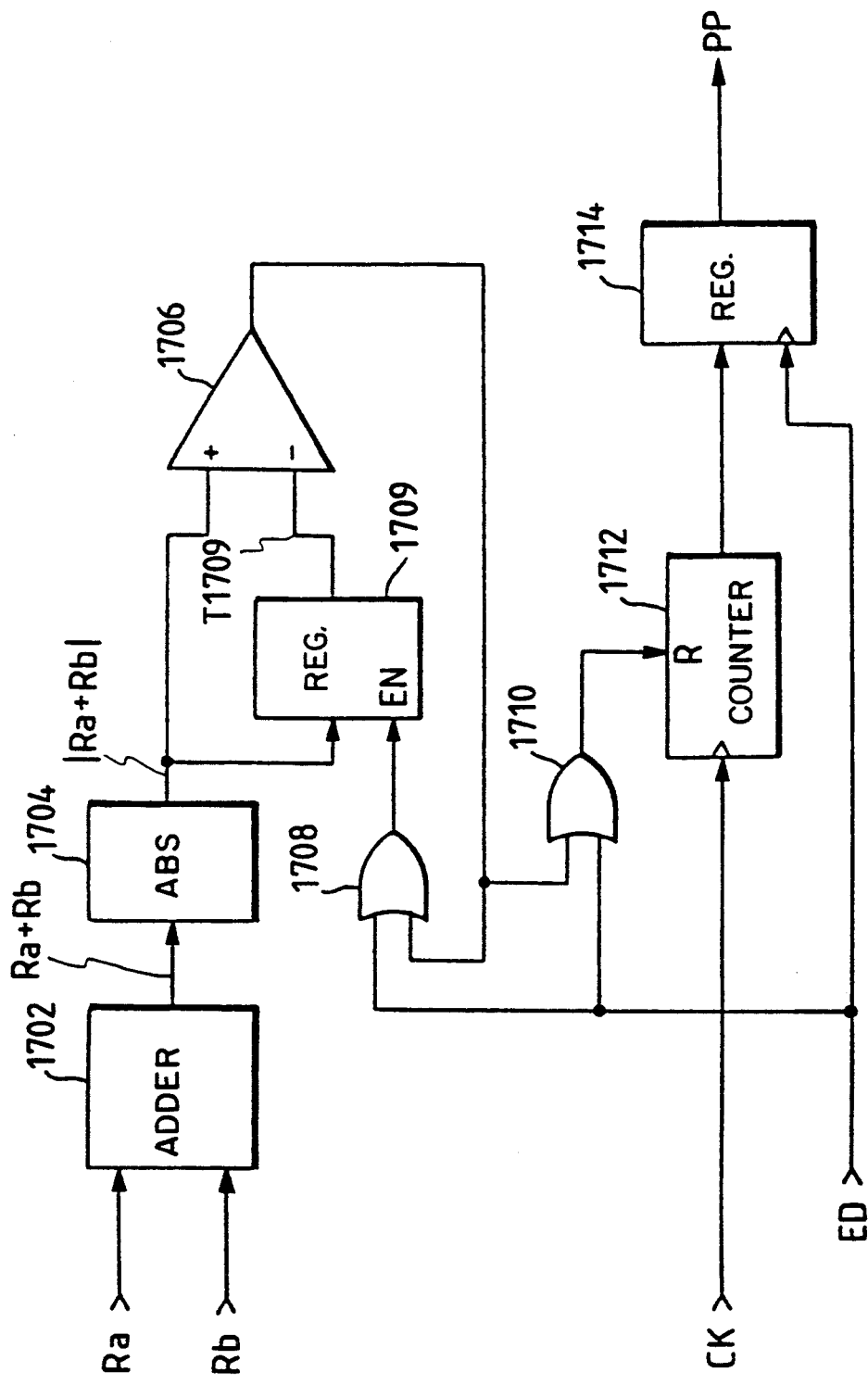
FIG. 17 is a block diagram of a peak position detecting circuit.
Figure 18:
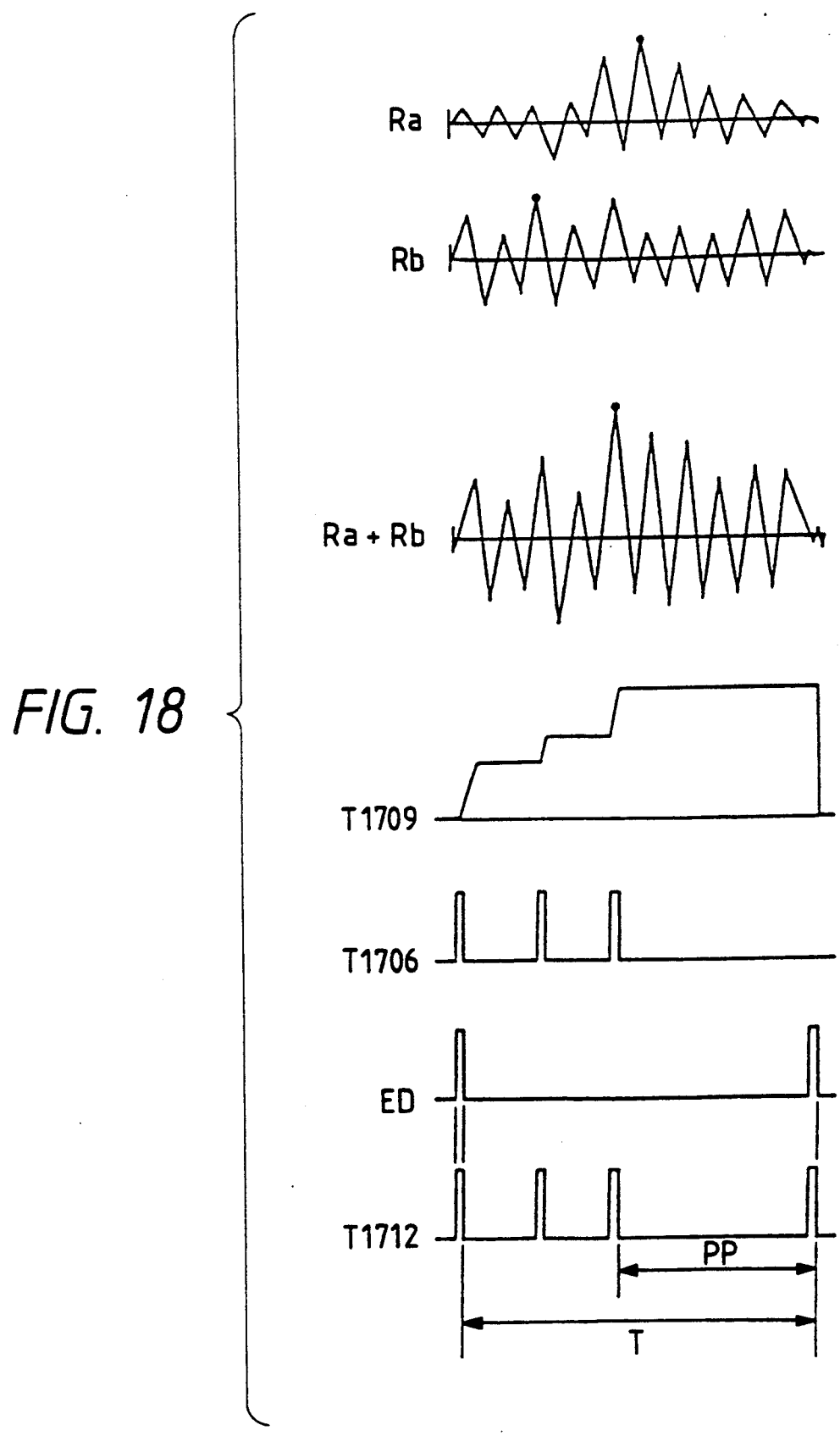
FIG. 18 shows waveforms at various points in the circuit shown in FIG. 17.

The peak position detecting circuit 1502 (FIG. 16) shown in FIG. 17 determines the position of a peak, where the "peak", at the moment, is defined as the maximum value of signal |Ra+Rb| in a given data time segment. Signal |Ra+Rb| is output from the absolute value circuit 1704, which in turn accepts the quantity Ra+Rb as inputs from the adder 1702. As illustrated in FIG. 18, the location of the peak, or the peak position PP, is measured from the position of the maximum value of signal |Ra+Rb| to the location of an adjacent pulse of data end signal ED.

The circuit shown in FIG. 17 is reset with each pulse of signal ED. As soon as a pulse of ED arrives via the OR-gate 1708, the register 1709 is allowed to latch an initial value output by absolute value circuit 1704. During the next clock cycle, comparator 1706 compares the latched value with a new value output from 1704. If the new value is larger, comparator 1706 outputs "1," allowing latch 1709 to store the larger value. By iterating the preceding procedure, comparator 1706 and register 1709 find maximum value of |Ra+Rb| in a given data time segment.

Counter 1712 is reset by an output of "1" from the comparator 1706; that is, counter 1712 begins counting from 0 whenever a new maximum value is found. Counter 1712 completes its counting when a pulse of ED arrives via the OR-gate 1710.

The arrival of pulse of ED also latches the counted value at the register 1714. Clearly, the latched value is the peak position PP signal, the desired output of peak position detecting circuit 1502.

Figure 19:
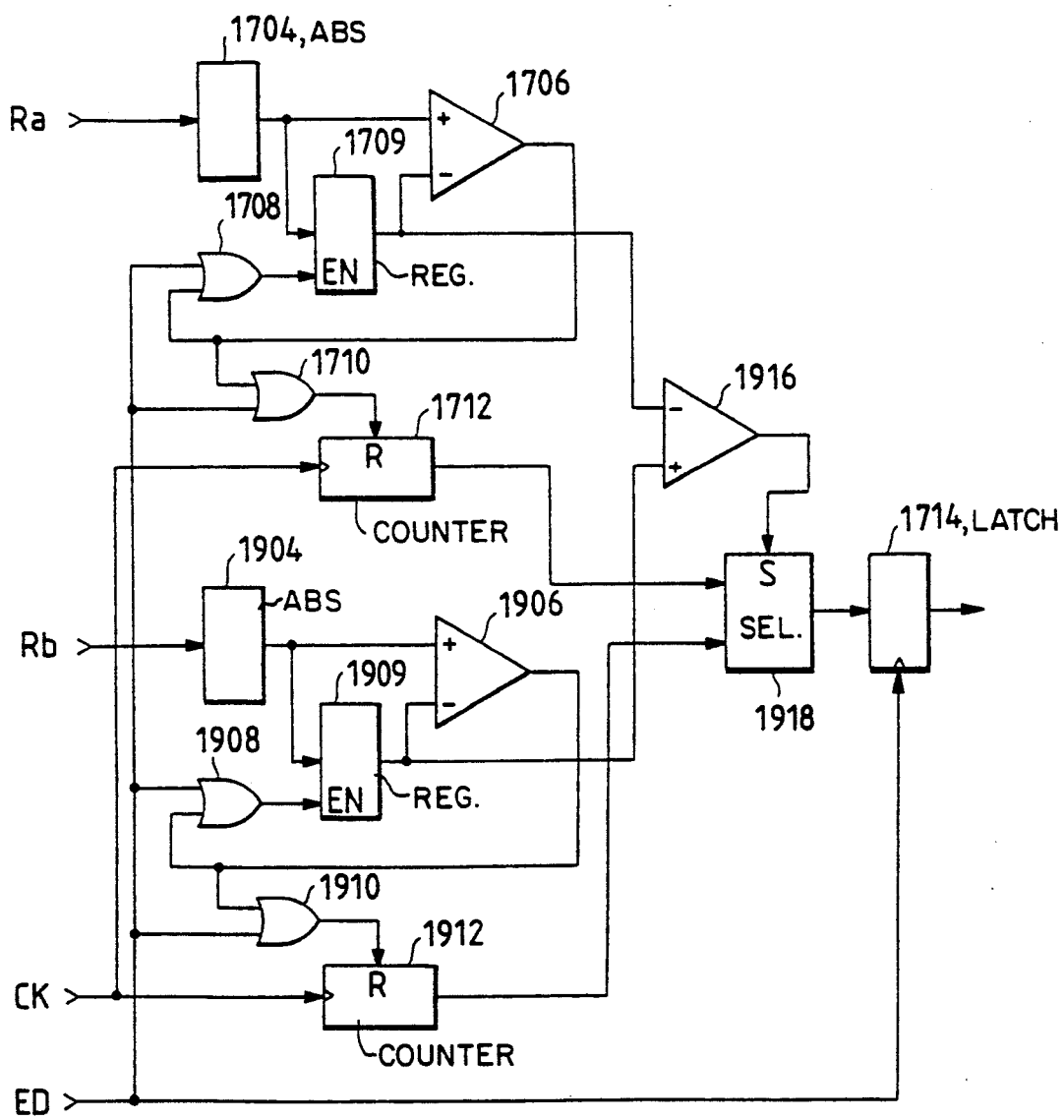
FIGS. 19 and 20 illustrate other examples of the peak position detecting circuit.

FIG. 19 is a block diagram of another embodiment of peak position detecting circuit 1502. The circuit in FIG. 19 can be divided into two halves. Each half of the circuit contains almost all components corresponding to those of the circuit shown in FIG. 17, except for adder 1702 (FIG. 17).

The top half of the circuit module in FIG. 19 finds the location of maximum value of |Ra|. The bottom half, the location of maximum value of |Rb|. The outputs from both halves are analogous to signal PP of the peak position detecting circuit 1502 in FIG. 17.

The comparator 1916 compares the sizes of maximum values of |Ra| and |Rb| and outputs "1" or "0." Its output is transmitted to the selector 1918 which chooses as its output one of two counted values from the counters 1712 and 1912. If the maximum value of |Ra| is larger than that of |Rb|, the selector will choose the output from 1712; otherwise, the output from 1912. In any case, the selected output will be latched at 1714, to be output as PP signal upon the arrival of an ED pulse.

Figure 20:
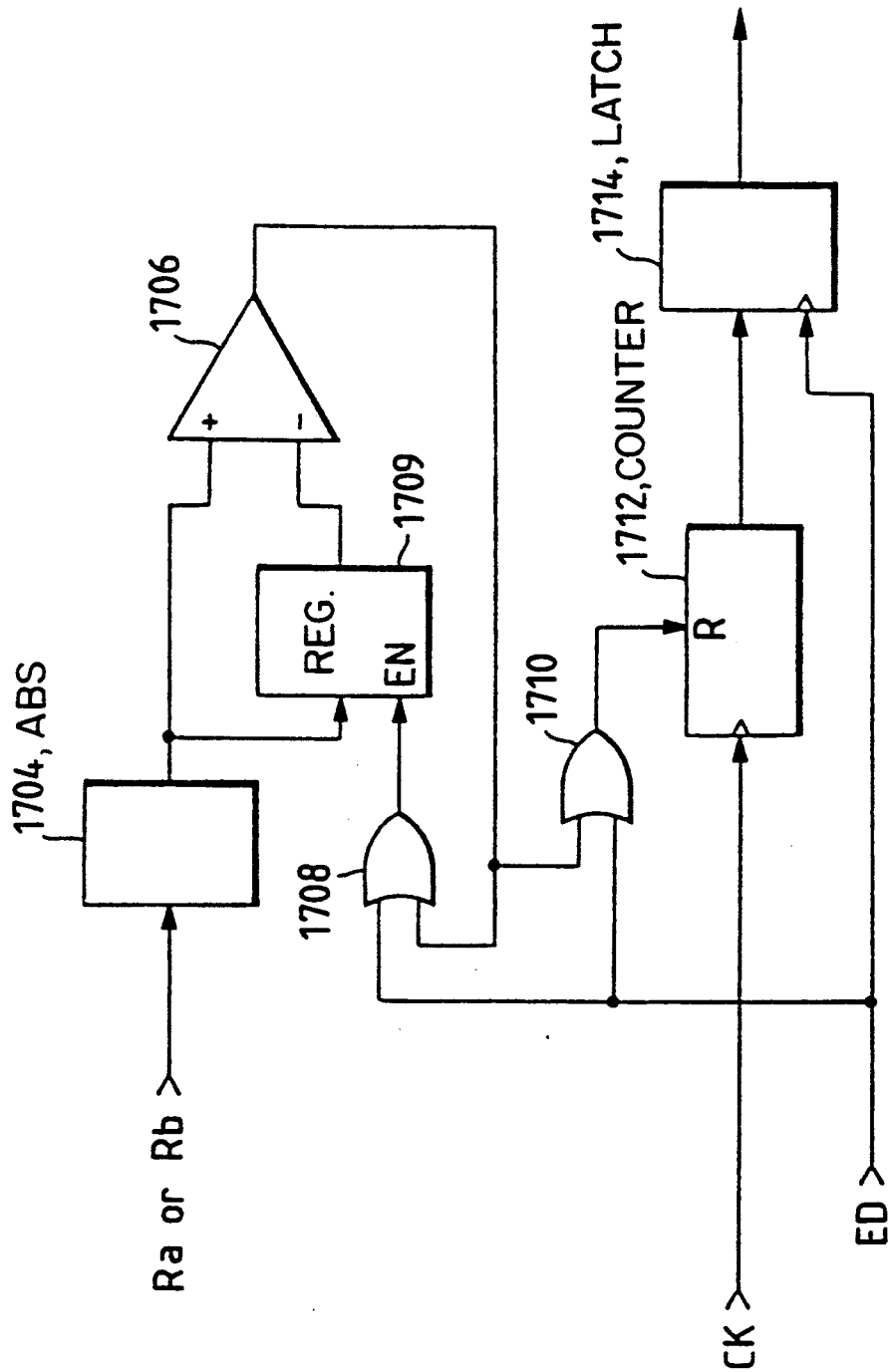

FIG. 20 is a block diagram of yet another embodiment of peak position detecting circuit 1502. The illustrated circuit is different from that shown in FIG. 17 in that it does not comprise adder 1702. In this case, only one of two correlation signals Ra and Rb is input to absolute value circuit 1704. Selection of one of signals Ra and Rb depends on whether "1" or "0" has been received.

Peak Position Determining Circuit

A peak position determining circuit 1504 (FIG. 16) performs the following three operations:
1) It partitions a data time segment into subintervals. Associated with each subinterval is an output line.
2) It determines in which subinterval a peak has occurred. The location of the peak relative to an ED pulse is given by its input, the peak position PP signal.
3) It transmits "1" on the output lines corresponding to the subintervals in which a peak has occurred. If no subinterval contains a peak, then no output line will carry "1."

Figure 22:
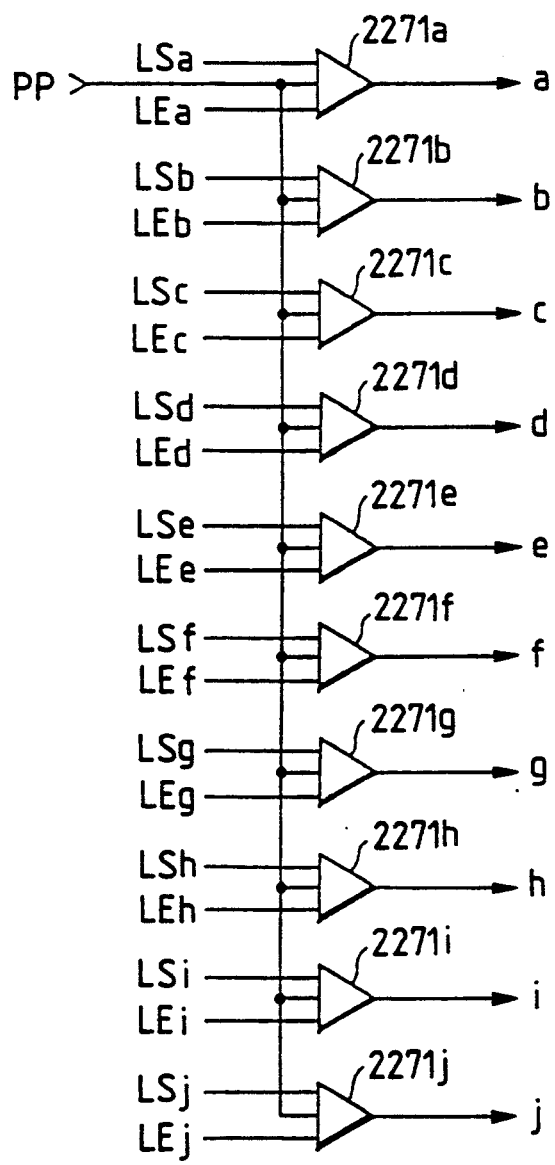
FIG. 22 is a schematic diagram of a peak position determining circuit corresponding to the partitioning shown in FIG. 21.
Figure 23:
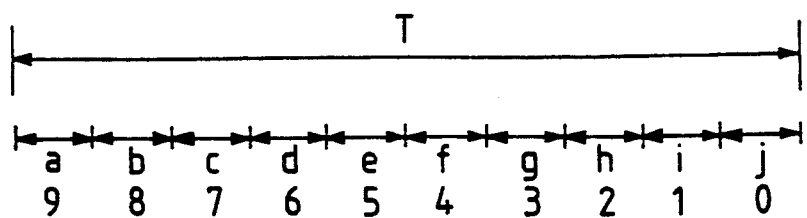
FIG. 23 shows partitioning the duration of time spanning a single bit of data.

FIG. 22 is a schematic diagram of one embodiment of peak position determining circuit 1504 comprising a bank of window comparators.

Figure 21:
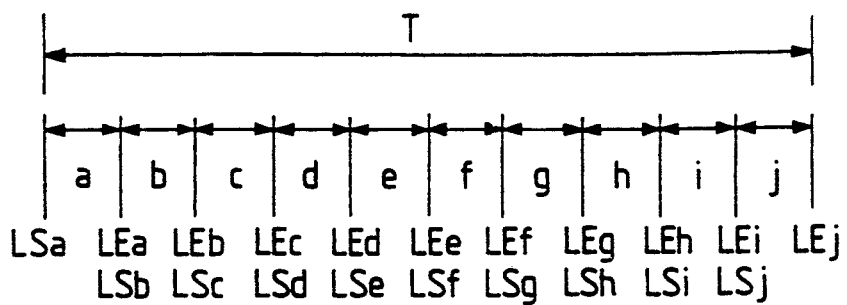
FIG. 21 shows partitioning the duration of time spanning a single bit of data.

Let a data time segment of duration T be partitioned into a number of equal length segments, as shown in FIG. 21. Labels LSa through LSj mark the start of each subinterval, and LEa through LEj mark the end of each subinterval. Thus, for example, LSa and LEa mark the start and the end of subinterval a. The length of each subinterval is not necessarily equal to that of any other subinterval, provided that no overlap of subintervals occur.

Each subinterval of the data time segment is assigned to one of window comparators $2271a$–$2271j$. Each comparator tests if its input signal, PP, indicates that a peak value has occurred within its assigned time subinterval. If any of the comparators finds that a peak has occurred within its assigned subinterval of time, it outputs the value "1."

Figure 24:
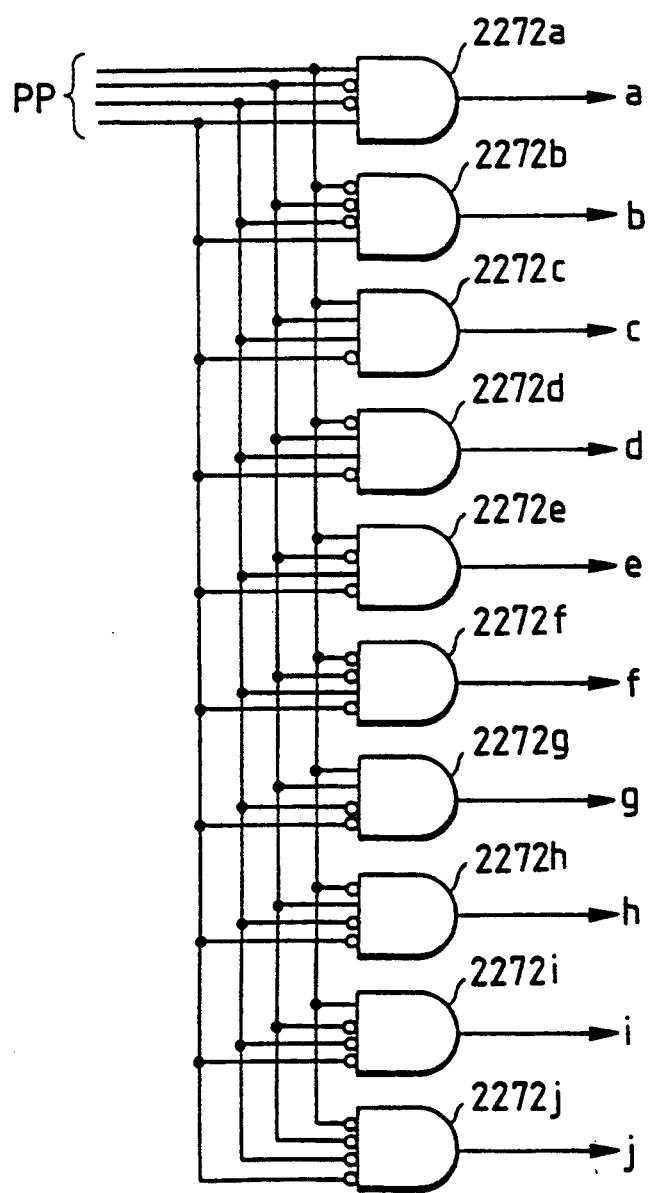
FIG. 24 is a schematic diagram of another construction the peak position determining circuit corresponding to the partitioning shown in FIG. 23.

FIG. 24 is a schematic diagram of another embodiment of peak position determining circuit 1504. Each window comparator of FIG. 22 is replaced by an AND-gate, with proper inverting bubbles at the inputs of each gate.

In FIG. 24, a data time segment is partitioned into ten subintervals, each subinterval with a numeric label. Subintervals are labeled from the left to right in a descending order, with the most left subinterval labelled as 9.

Each subinterval is assigned to an AND-gate. "Bubbles" (or input signal inverting symbols) at the input side of AND-gates reflect the labelled number of an assigned subinterval. For example, AND-gate $2272c$ is assigned to subinterval 7. Looking at AND-gate $2273c$ reveals only one bubble at its lowermost input lead. Thus, AND-gate $2272c$ will output "1" if values at its input leads are (from its lowest input lead to its highest input lead) 0 1 1 1, a binary sequence equivalent to decimal number 7.

Signal PP transmits a binary number output from a counter in peak position detecting circuit 1502. The binary number is equal to the number of clock cycles from the occurrence of a peak (as defined and implemented in any one of various embodiments of peak position detecting circuit) to the end of a data time segment. For example, let a value of PP at a particular instant be equal to binary number 0 1 0 1, and let a data time segment be partitioned into ten equal subintervals. PP value of 0 1 0 1 is equal to decimal number 5, indicating that the peak position is 5 clock cycles to the left of the end of data time segment.

When PP carries a numeric value to the AND-gates $2272a$ through $2272j$, only AND-gates with the input bubble combination corresponding to the input numeric value will output "1." For example, if PP value is equal to 0 1 0 1, only AND-gate 2272e will output "1."

In any case, the circuit in FIG. 24 performs all three above-mentioned operations of peak position determining circuit 1504. It transmits "1" on the output lines corresponding to the subintervals in which a peak has occurred. If no subinterval contains a peak, then no output line will carry "1."

Figure 25:
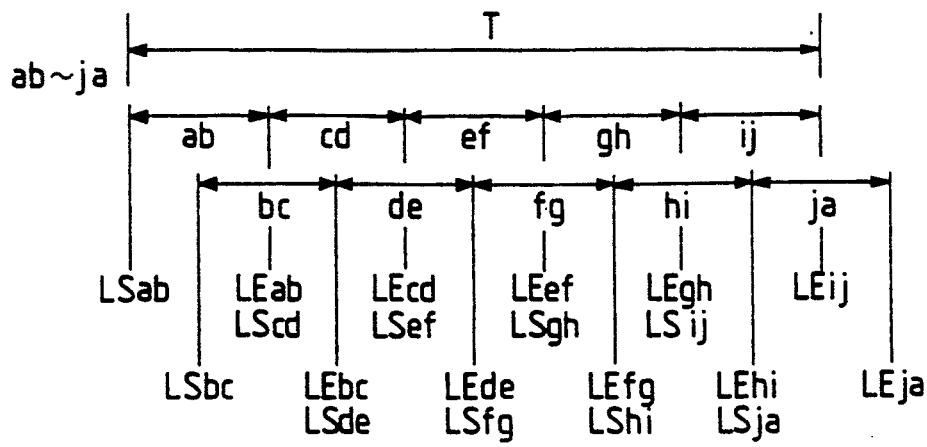
FIG. 25 shows partitioning the duration of time spanning a single bit of data.
Figure 26:
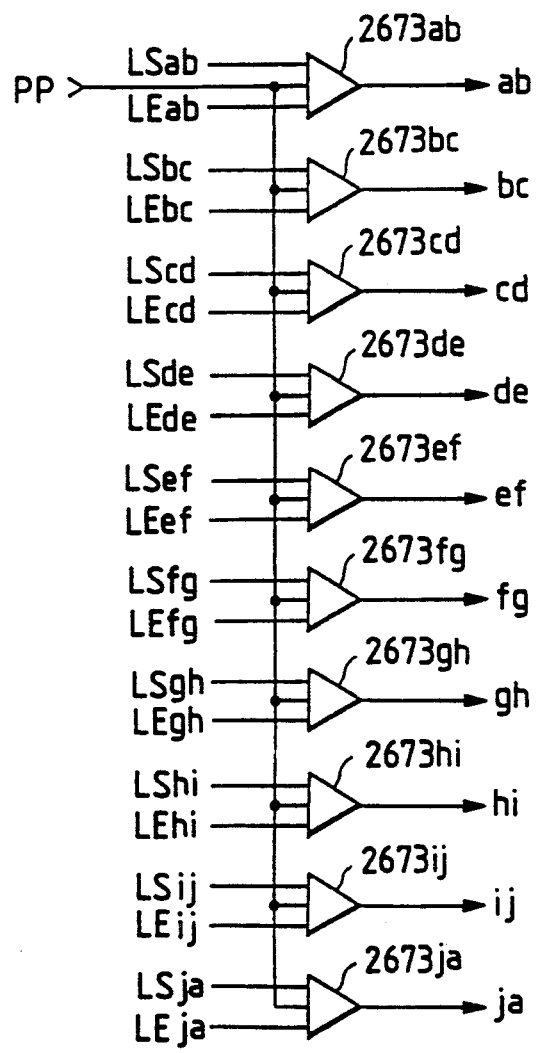
FIG. 26 is a schematic diagram of another embodiment of the peak position determining circuit corresponding to the partitioning shown in FIG. 25.

FIG. 26 illustrates yet another embodiment of peak position determining circuit 1504. As shown in FIG. 25, the data time segment, or the data section T, is divided into ten subintervals. The individual subintervals are labelled ab, bc, ..., and ja. The start position LS and the end position LE for each subinterval are set in the individual window comparators 2673a through 2673j. Window comparators 2673a through 2673j generate output signals (ab, bc, and so forth) at the level H whenever the peak position PP is located between these two positions.

Figure 27:
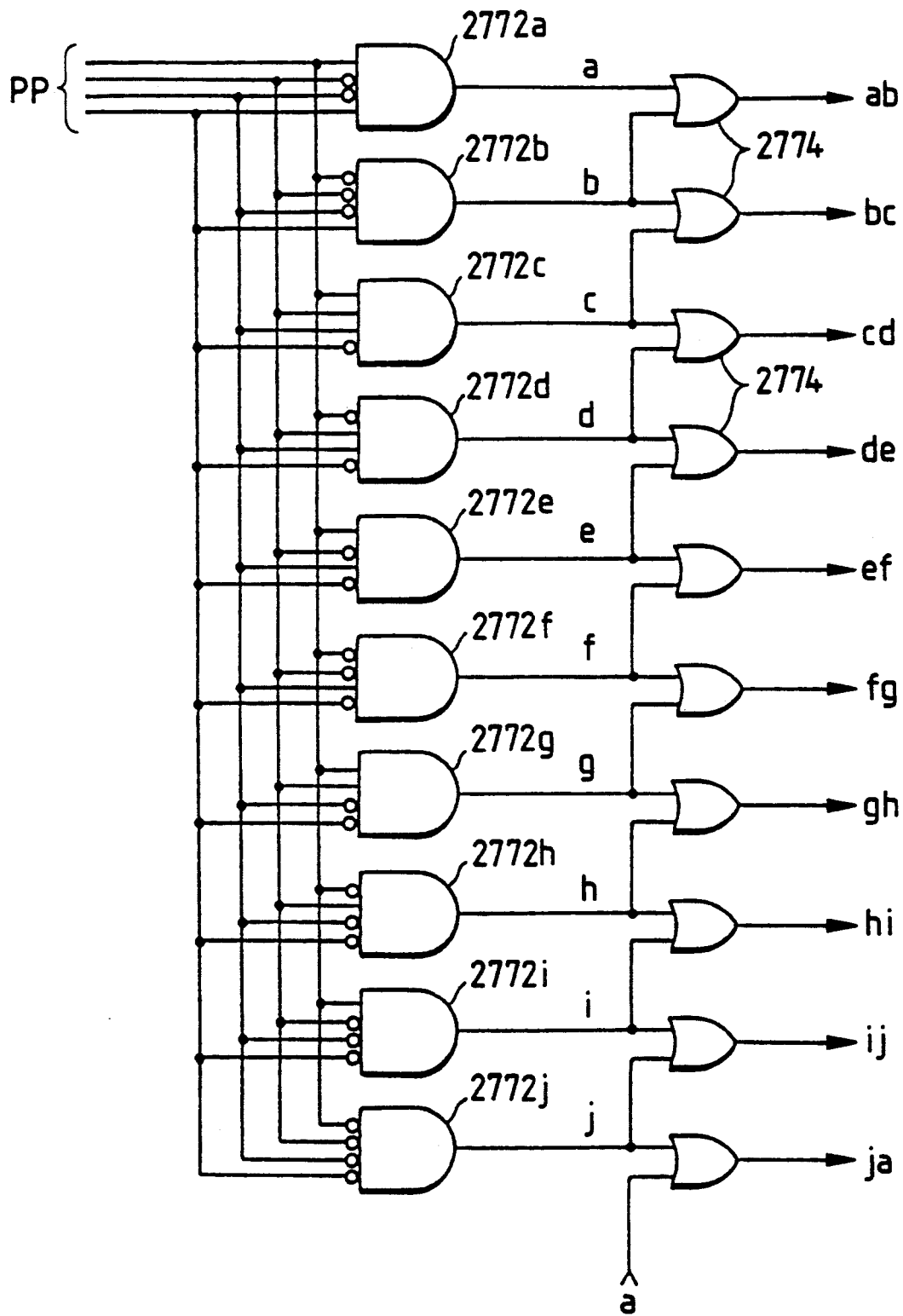
FIG. 27 is a schematic diagram of another embodiment of the peak position determining circuit corresponding to the partitioning shown in FIG. 25.

FIG. 27 is a schematic diagram of a fourth embodiment of peak position determining circuit 1504, which is constructed with AND-gates and OR-gates. The circuit in FIG. 27 partitions a data time segment in a manner shown in FIG. 25. The effect of taking an output from an OR-gate, which takes as its inputs from two AND-gates, is to combine two subintervals assigned to the two AND-gates. For example, two AND-gates 2772a and 2772b are assigned to subintervals a and b. The OR-gate taking inputs from 2772a and 2772b is then assigned to the subinterval ab; the OR-gate will output "1" if PP occurs in interval ab (the union of interval a and interval b). Similarly for other OR-gates.

Figure 28:
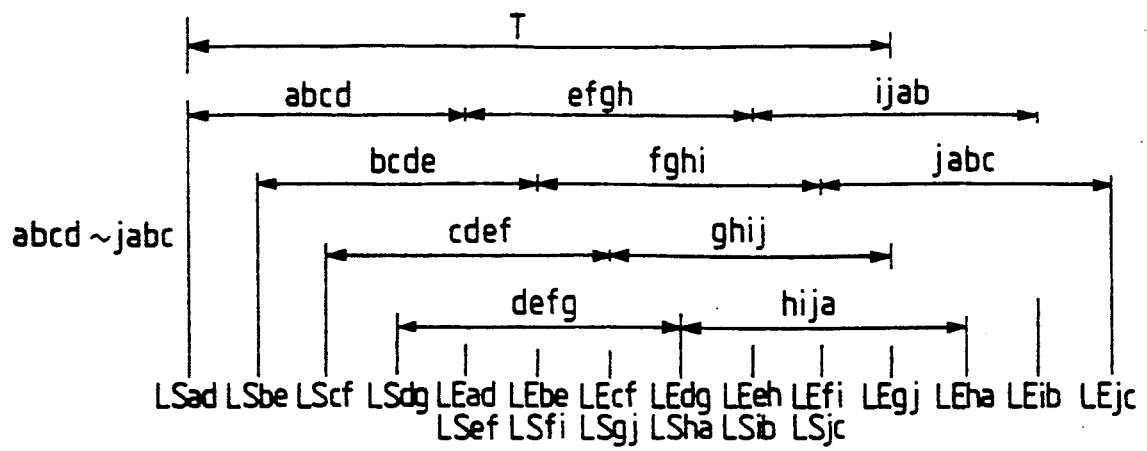
FIG. 28 shows partitioning of the duration of time spanning a single bit of data.
Figure 29:
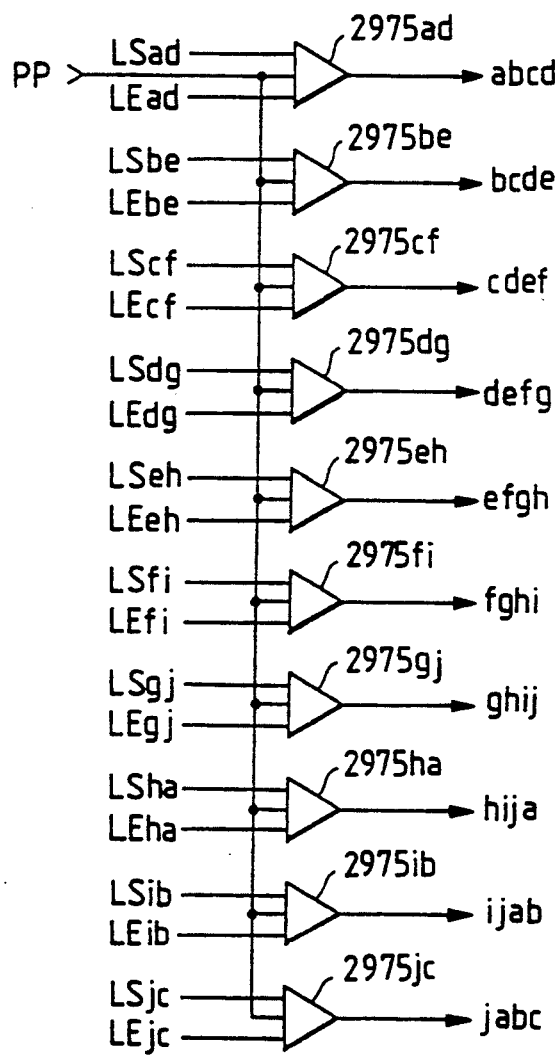
FIG. 29 is a schematic diagram of another embodiment of the peak position determining circuit corresponding to the partitioning shown in FIG. 28.

FIG. 29 illustrates the fifth embodiment of peak position determining circuit 1504. The circuit partitions, as shown in FIG. 28, the data section T into ten subintervals in which each subinterval overlaps its adjacent subinterval by ¾ of its length. The individual areas are labelled abcd, bcde, ... bija. Each of ten window comparators 2975abcd, ... 2975bija is assigned to one subinterval.

Figure 30:
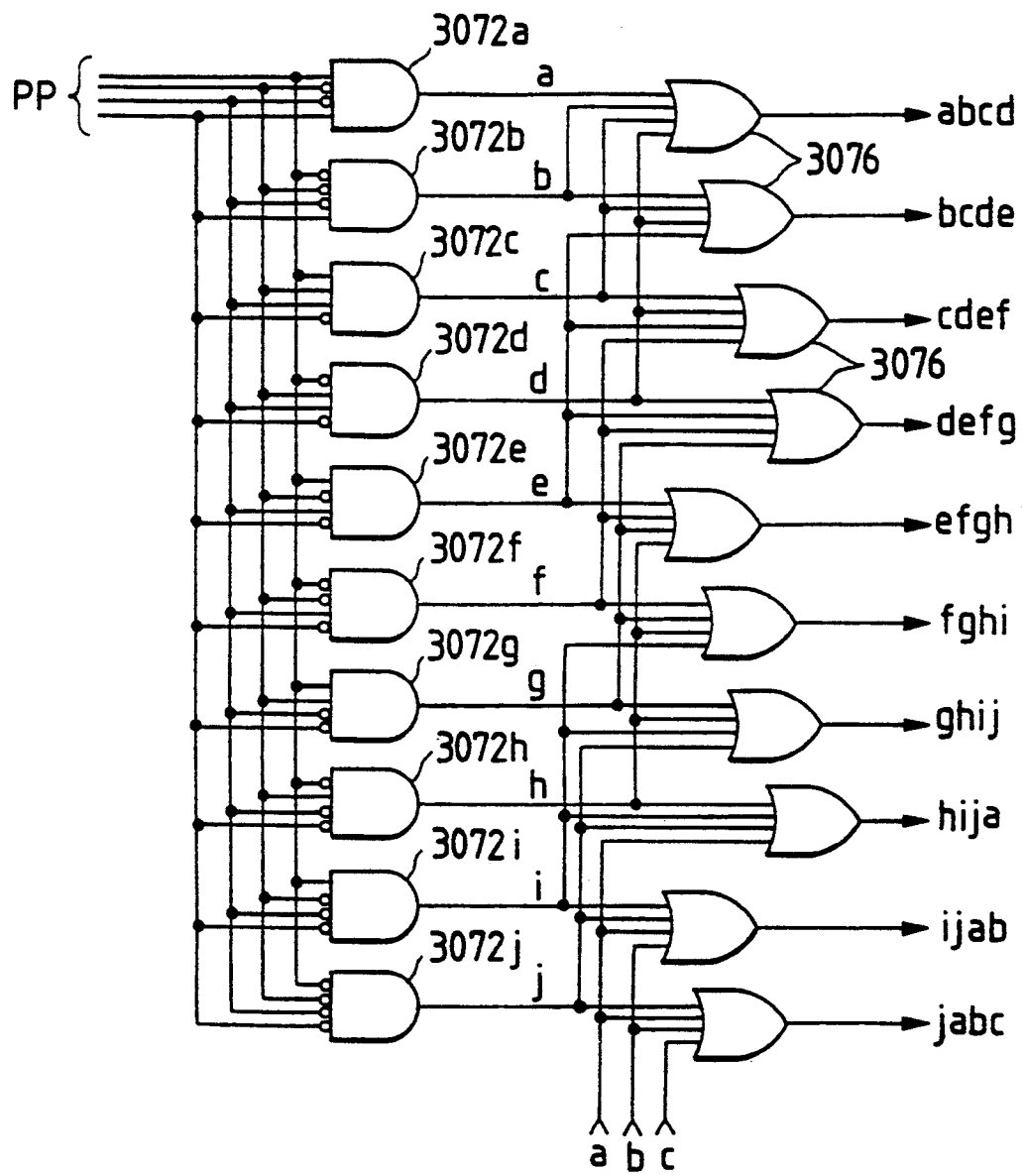
FIG. 30 is a schematic diagram of another embodiment of the peak position determining circuit corresponding to the partitioning shown in FIG. 28.

FIG. 30 is a schematic diagram of a sixth embodiment of peak position determining circuit 1504, constructed with AND-gates and OR-gates. Partitioning of its data time segment is identical to that shown in FIG. 28.

Counting Circuit and mN Determining Circuit

Figure 31:
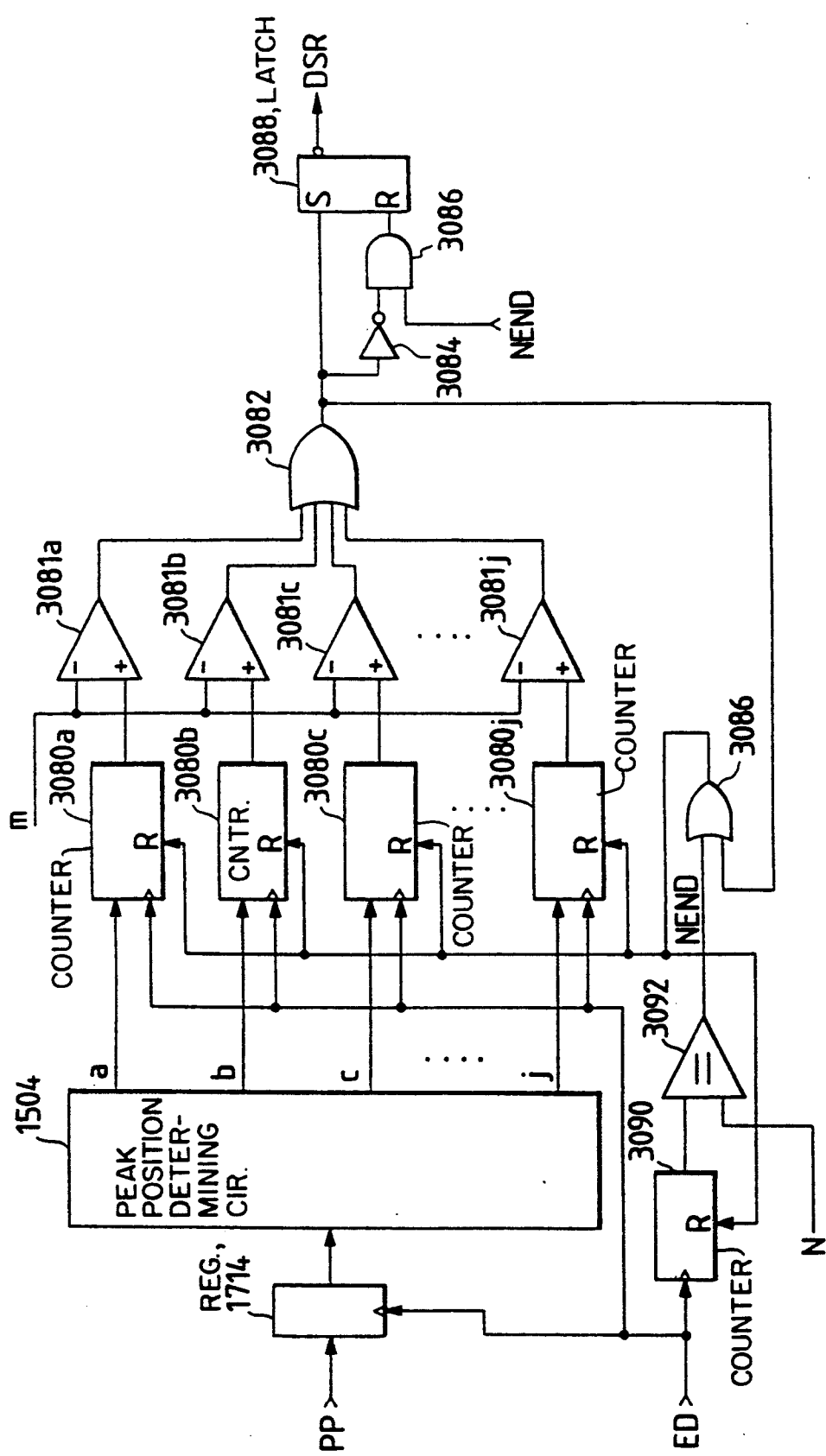
FIGS. 31, 32 and 33 are each a block diagram of a counting circuit and an m/N determining circuit.

One embodiment of the counting circuit 1506 (FIG. 16) and the m/N determining circuit 1508 (FIG. 16) are shown in FIG. 31. Counting circuit 1506 comprise counters 3080a through 3080j and m/N circuit 1508 comprise the rest of circuit blocks. The combination of counting circuit 1506 and m/N determining circuit 1508 outputs a synchronization signal when it determines that a peak has occurred for more than a prescribed number of times m, within N data time segments (N>=m).

Counter 3080a counts the occurrences of a peak within N number of data time segments. If the value at one of its two input lines, connected to the output line a of peak position determining circuit 27, is "1," it will increment its count by 1 whenever an ED pulse arrives at its other input. Other counters 3080b through 3080j operates similarly.

The counter 3090 increments its count by "1" with each arrival of an ED pulse. The output of counter 3090 is compared with number N at the comparator 3092. Whenever the output of counter 3090 attains number N, the comparator 3092 transmits an N data period end NEND pulse.

Each one of comparators 3081a through 3081j compares an output of one of counters 3080a-3080j to a prescribed number m. Each comparator transmits "1" if its input value from the counter is equal to or greater than m. All outputs from the comparators 3081 are then input to an OR-gate 3082, which outputs "1" whenever any one of counters 3080a through 3080j has counted occurrences of peaks equal to or greater than m.

The output of OR-gate 3082 can be interpreted as a "synchronization signal." The synchronization signal indicates whether or not 1) there is actual data present within the received signal, or
2) monitoring window signal WS spans the portion (of data time segment) containing auto-correlation peaks.

The synchronization signal is input to the R-S latch 3088. As soon as its S input line becomes "1," R-S latch 3088 outputs "1." Thus, R-S latch 3088 responds as soon as a peak occurs within a given subinterval of data time segment m-times, and does not wait until the arrival of an NEND pulse before transmitting its output value.

Synchronization signal and signal NEND both feed, via the OR-gate 3086, to the counters 3080a through 3080j and to the counter 3090. If synchronization signal assumes a value of "1," or if a NEND pulse arrives, OR-gate 3086 will output "1." This will reset counters 3080a-3080j and counter 3090. In other words, whenever synchronization is declared, counting circuit 1506 will be reset. Thereafter, the counters 3080a through 3080j and the counter 3090 restart their counting from 0.

Immediately after a NEND pulse or synchronization signal has reset counting circuit 1506 and m/N circuit 1508 (FIG. 16), OR-gate 3082 changes its output to "0." However, the output of R-S latch 3088 is still held at "1." Next, counting circuit 1506 begins counting again, and m/N circuit 1508 waits for counting circuit 1506 to signal m occurrences of peaks. However, if peaks are not found m-times within the next N consecutive data time segments, the next NEND pulse will activate one input of the AND-gate 3086. The other input of AND-gate 3086 will also be at "1," because the input value of invertor 3084 will be equal to "0" (set by OR-gate 82). Finally, the output of "1" from AND-gate 3086 will reset latch 3088, causing a transmission of "0." The output of AND-gate 3086 can be interpreted as "off-sync" signal. Off-sync signal value of "1" causes R-S latch 3088 to output "0."

In summary, the combination of counting circuit 1506 and m/M determining circuit 1508 outputs a synchronization signal when it detects occurrences of a peak for more than a prescribed number of times m; within N number of data time segments (N>=m).

Figure 32:
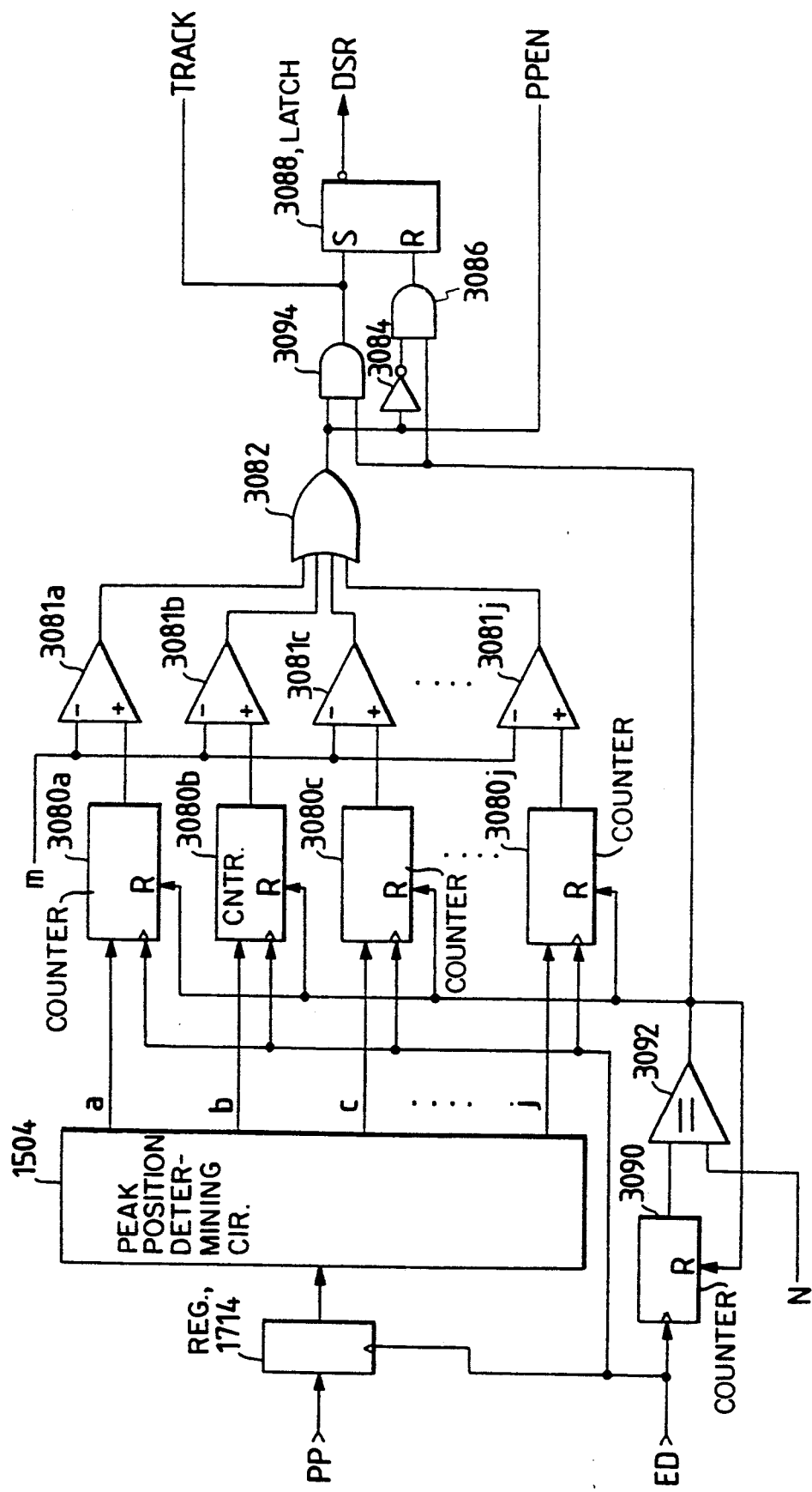

FIG. 32 shows the second embodiment of counting circuit 1506 and m/N determining circuit 1508. Compared to the circuit in FIG. 31, the circuit in FIG. 32 has an extra AND-gate 3094 at the output of OR-gate 3082. Furthermore, the OR-gate 3086 has been removed. By the virtue of extra AND-gate 3094, which takes its inputs from OR-gate 3082 and comparator 3092, the output signal from OR-gate 3082 is synchronized to NEND pulses. Unless a NEND pulse arrives at the input of AND-gate 3094, R-S latch will not transmit the output of OR-gate 3082. In addition, unlike in FIG. 31, the output from 3082 is no longer routed through counters via an OR-gate 3086. Thus, even if the output at OR-gate 3082 assumes the value of "1," counters 3080a-3080j and 3090 will not be reset; only an arrival of NEND pulse will reset the counters. In short, the output of the circuits in FIG. 32 is synchronized to NEND pulses.

Figure 33:
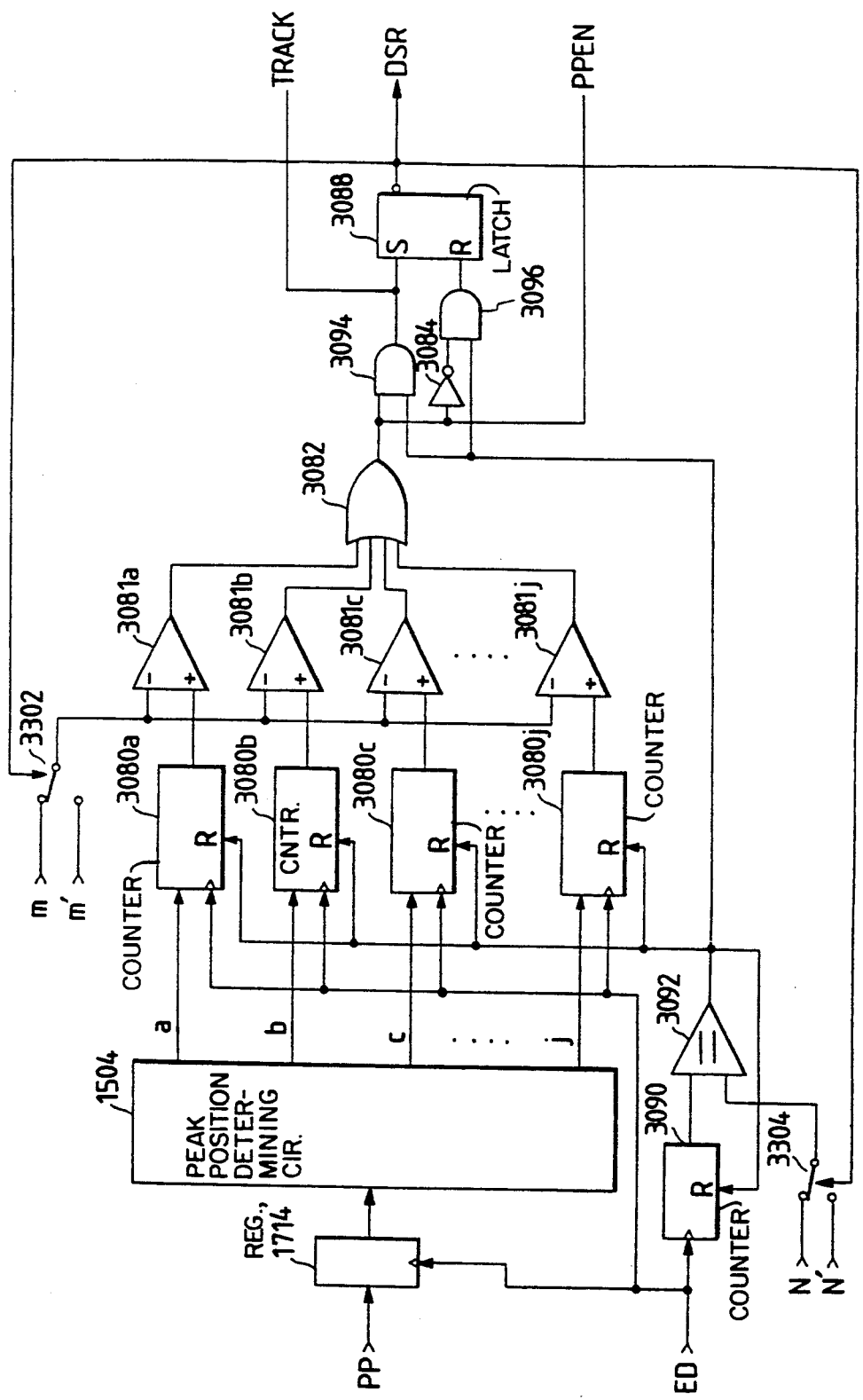

FIG. 33 is a schematic diagram of a third embodiment of counting circuit 1506 and m/M determining circuit 1508. When the value of synchronization signal output from the R-S latch 3088 makes a transition from "1" to "0," the switching circuits 3302 and 3304 switch from the prescribed numbers N and m, which are used in comparators 3081a–3081j and 3092, to the set of numbers N' and m.' Thus, the circuit in FIG. 33 applies two different set of numbers to comparators 3081a–3081j and 3092 during its synchronization and out of synchronization conditions. The numbers are usually set so that $m/N > m'/N'$.

FIG. 32 and 33 show, however, how two extra signals, synchronization signal PPEN and tracking TRACK signal can be tapped from output lines from components of circuits 1506 and 1508 (FIG. 16).

Other Embodiments of Carrier Detecting Circuit

Figure 34:
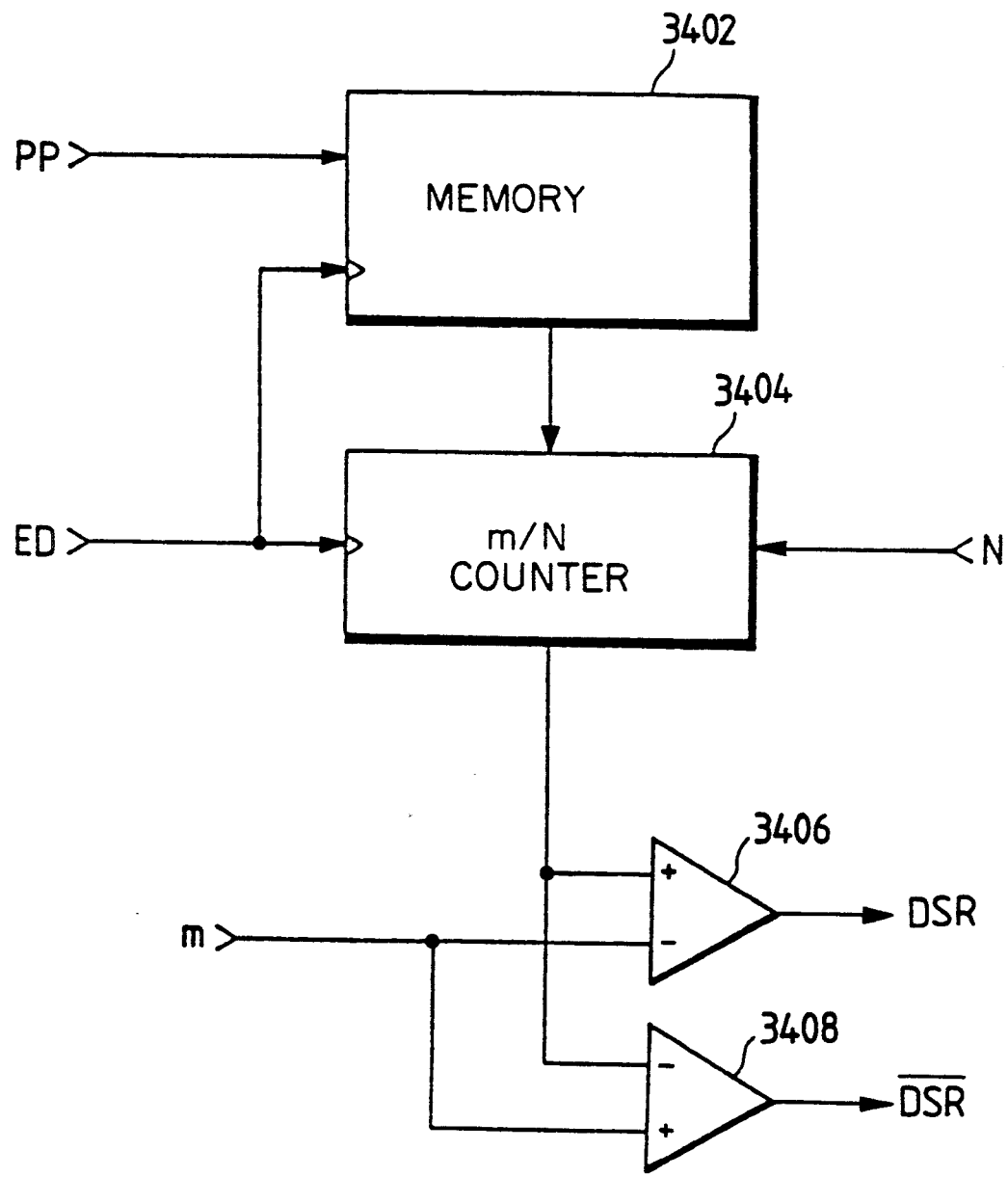
FIGS. 34 and 35 are other examples of the carrier detecting circuit.

We now describe two more embodiments of carrier detecting circuit 400. FIG. 34 shows three major components of the third embodiment of carrier detecting circuit 400: peak position memory block 3402, m/N counters 3404, and comparators 3406 and 3408. Peak position detecting circuit 1502 (FIG. 16), though a part of the present embodiment, is not shown in the figure.

Each value of a peak position PP signal is transferred from the peak position detecting circuit 1502 to the peak position memory block 3402 for each data section end signal ED. The peak position PP for the past U data sections are stored consecutively in memory block 3402. The number U may be equal to or greater than the number N mentioned in the preceding section (in its description of m/N determining circuit).

The data stored in memory block 3402 are passed to counter 3404, which performs the following operations.
1) It divides a data time segment into subintervals, and then determines to which subinterval each peak position PP belongs.
2) It counts the number of occurrence of a peak within each subinterval during N data periods, or N data time segments.
3) It outputs the maximum number of counts to comparators 3406 and 3408.

The counter 3404 can be realized with a microprocessor.

The comparator 3406 outputs a carrier detection signal (DSR signal in FIGS. 31–33) when the maximum value of the counts of the peak position is not less than the prescribed number m. Otherwise, the comparator 3408 outputs the carrier non-detection signal.

It is desirable that the above operations be performed each time a data section end signal ED is generated.

Figure 35:
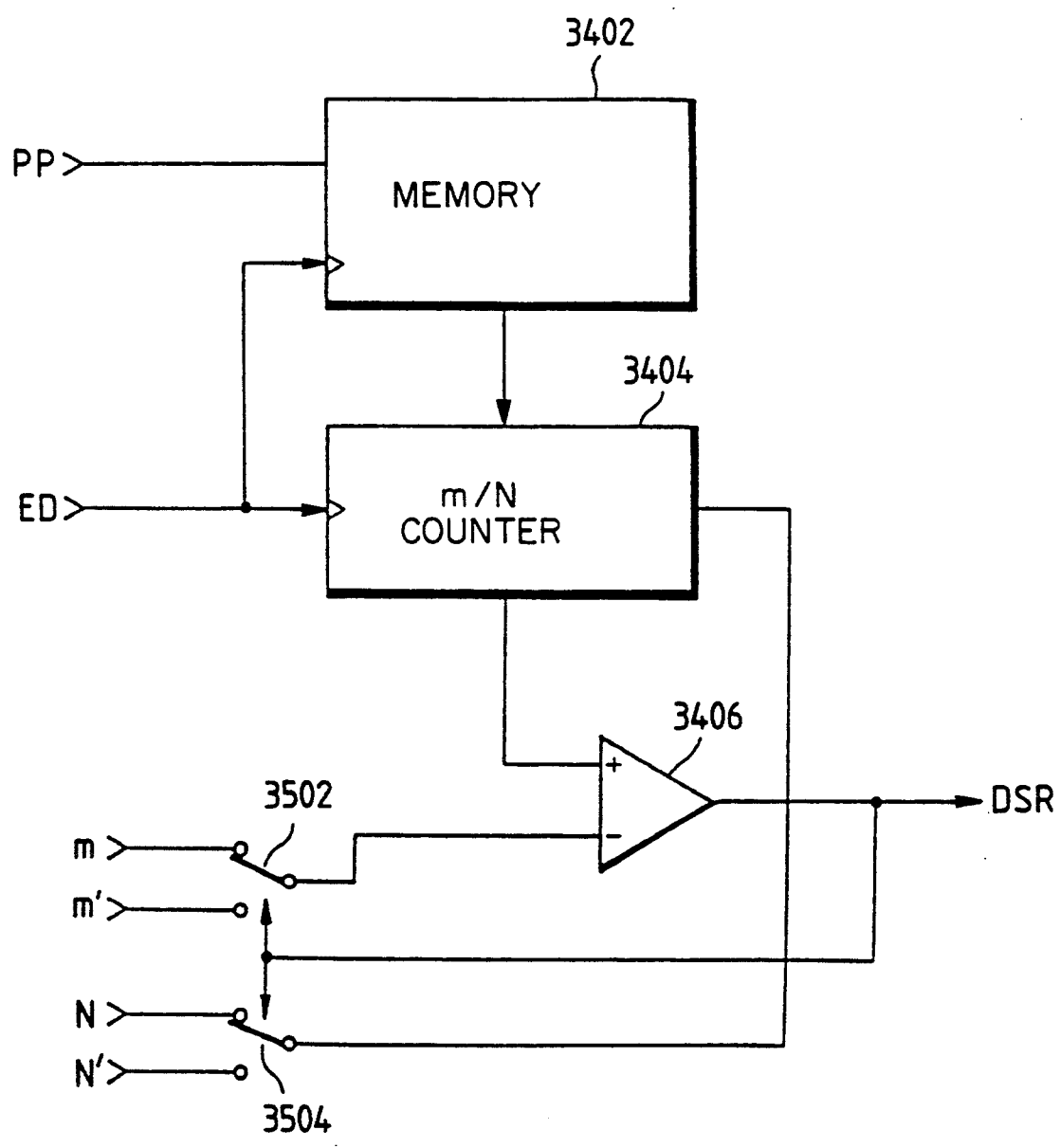

FIG. 35 is an alternative embodiment to that shown in FIG. 34. Like the circuits in FIG. 34, the FIG. 35 circuit applies two different sets of numbers during its synchronization and out of synchronization conditions. When the value of synchronization signal output from the comparator 3406 makes a transition from "1" to "0," the switching circuits 3502 and 3504 switch from the prescribed numbers N and m to the set of numbers N' and m.' Thus, the FIG. 35 circuit applies two different set of numbers to comparators 3406 and counter 3404 during its synchronization and out of synchronization conditions. The numbers are usually set so that $m/N > m'/N'$.

Sync Control

The synchronization control circuit 410 in FIG. 3 generates three timing signals for demodulator 390. As mentioned in previous sections, the three signals (FIG. 13 and 14) are a data section end signal ED, a demodulation window start pulse WL, and a demodulation window stop pulse WH. Signal ED regulates the location of an end point of each data time segment so that an autocorrelation peak appears at the center of each data time segment. Signals WL and WH mark a start and an end of each monitoring window for each data time segment.

The circuitry for generating of WL and WH can be easily implemented mainly with counters and comparators as long as ED is available as an input signal, and its construction will not be discussed in the present section. Instead this description will concentrate on the circuitry for generating data section end signal ED. Finally, the operation of synchronization control circuit 410 with a carrier detection circuit 400 will be described.

Figure 36:
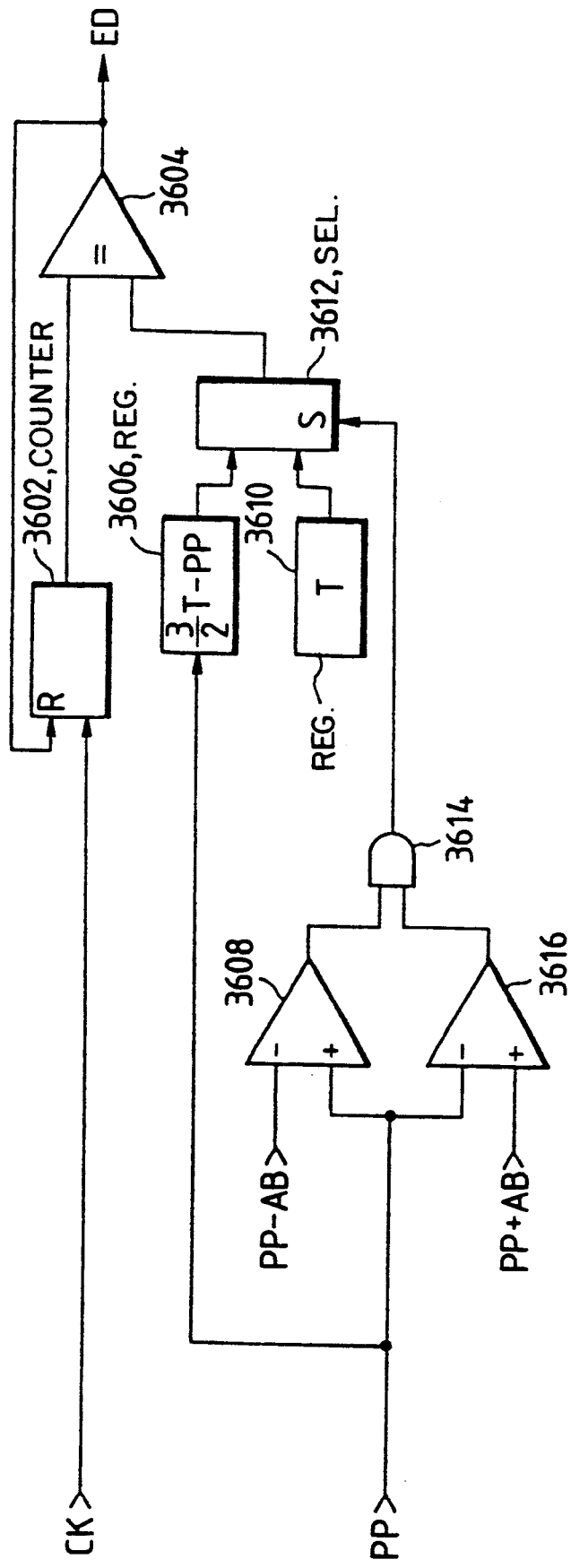
FIGS. 36 and 37 are block diagrams of a data section end signal ED generator.

FIG. 36 shows a simple construction of ED generator. The inputs to the circuit 410 consist of clock signal CK and PP, the signal produced by peak position detecting circuit 1502.

Comparator 3608 takes two inputs. A number corresponding to the position of the left edge of the monitoring window Wm (FIG. 14) is input to its − side. On its + side, PP is input. Thus, the comparator 3608 will generate "1" if the peak position occurs after the left edge of Wm. The position of the left edge is measured in number of clock cycles from the end of a given data time segment. The comparator 3616 operates similarly, with its + input side accepting the number Wm and with its − input side accepting signal PP. Two outputs from the comparators 3608 and 3616 are routed to the AND-gate 3614, which generates "1" only when a peak lands within Wm.

The output from AND gate 3614 is transmitted to the selector 3612. Selector 3612 will choose one of two input numbers, (3/2) T−PP and T, as its output. Number T corresponds to the duration of a single data bit (in number of clock cycles). If the output of AND gate 3614 indicates that a peak is outside of monitoring window Wm, selector 3612 will select the output from register 3606, accepting the number (3/2) T−PP. Otherwise, it will select the output T from register 3610.

Selected numbers will be input to the comparator 3604. The comparator 3604 will generate an ED pulse whenever its one input from counter 3602 is equal to its other input from selector 3612. Finally, the generated ED pulse will reset counter 3602.

In summary, the timing of signal ED is controlled by circuitry which detects whether a peak falls within Wm. Whenever the peak lands within window Wm, relative position of ED is unchanged from one period to the next, with the next ED pulse T clock cycles away from the present ED pulse. However, if the output of AND gate 3614 indicates that the peak is not being monitored properly, the relative location of the next ED pulse will change. ED generator will change the position of ED pulses until monitoring window Wm spans the part of data time segment containing the peak.

Figure 37:
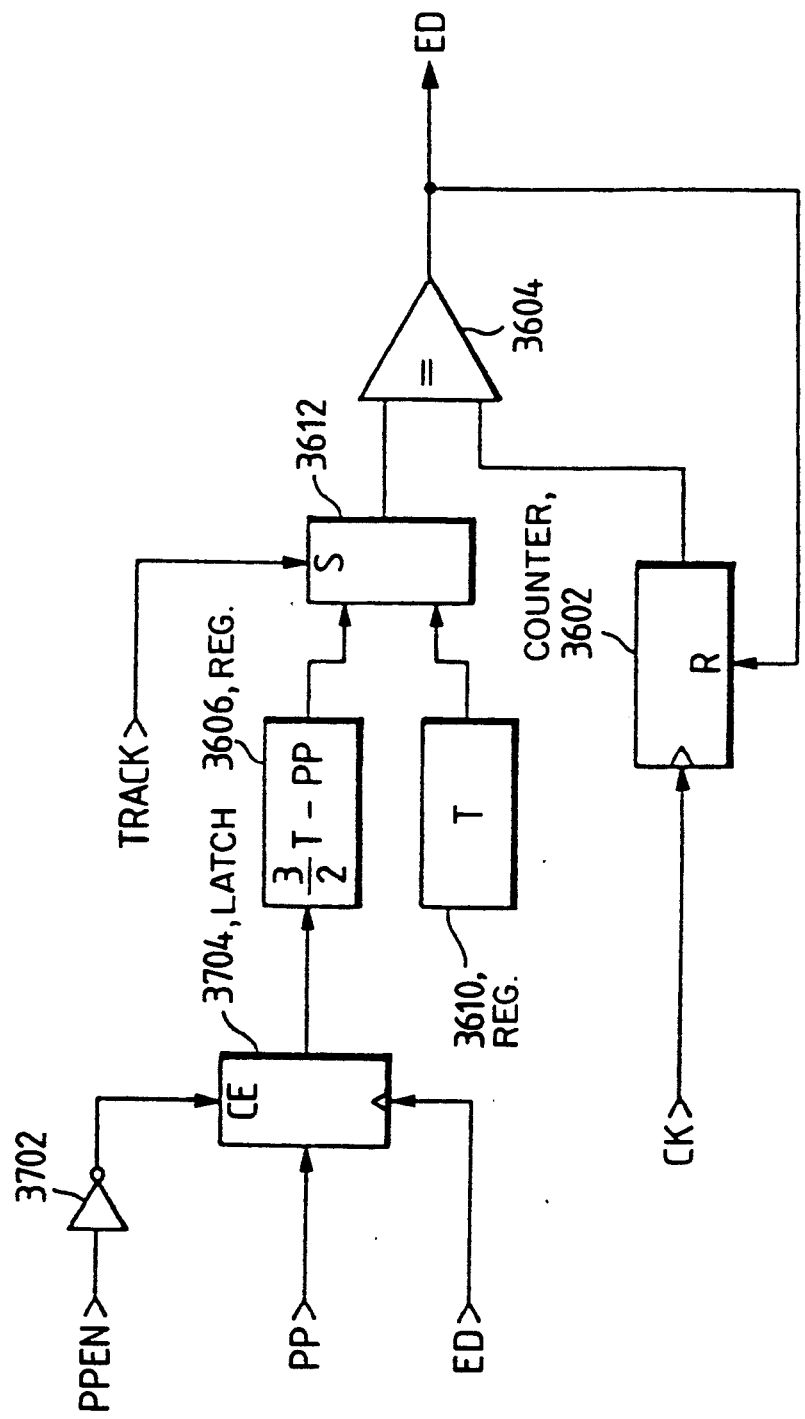

FIG. 37 illustrates another example of a data section end signal ED generating circuit included in the synchronization control circuit 410. The present circuit accepts as its inputs the signal PPEN and the signal TRACK, which are output from the carrier detecting circuit 400 (FIGS. 32 and 33).

The differences between the present circuit and the circuit in FIG. 36 are that the elements 3608, 3616 and 3614 in FIG. 36 have been removed. In addition, the circuit in FIG. 37 includes invertor 3702 and the latch 3704.

The value "0" of signal PPEN enables the latching of 3704. Thus, latch 3704 will latch value of PP at with each arrival of ED pulse until PPEN disables the latching. Thereafter, until PPEN assumes value of "0" again, all subsequent value of PP are rejected. In essence, latch 3704 stores the value of PP which have appeared m-times within N data segments.

The output from 3614 in FIG. 36 has been replaced by TRACK signal. Whenever TRACK signal assumes "1," selector 3612 chooses the output of 3606. Otherwise, it chooses the output of 3610.

The rest of the circuit operates similarly to that shown in FIG. 36. However, here, changing the timing of signal ED is enabled by TRACK signal. Whenever the peak lands within window Wm, relative position of ED is unchanged from one period to the next, with the next ED pulse T clock cycles away from the present ED pulse.

Figure 38:
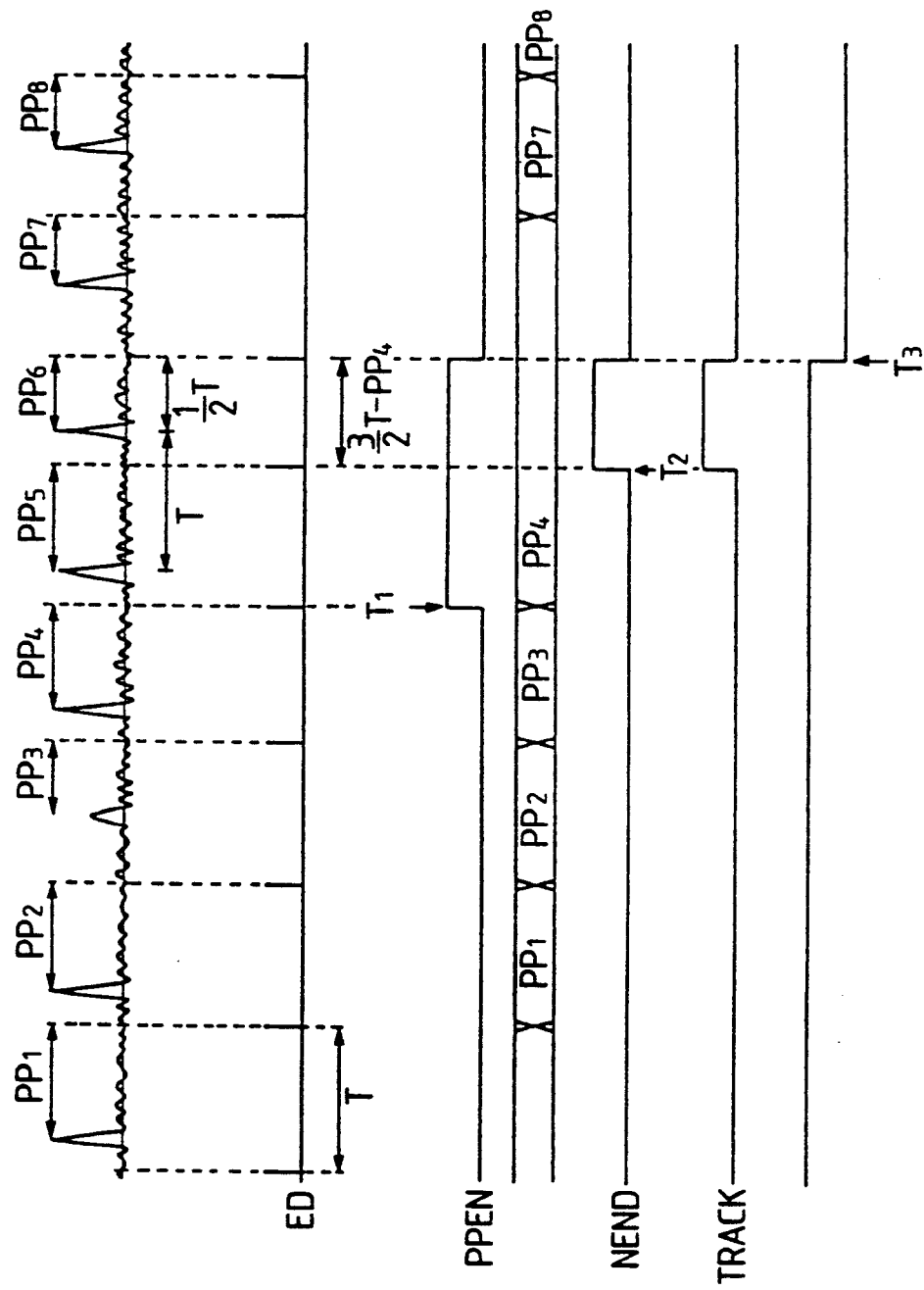
FIG. 38 shows signals at various points in the circuit shown in FIGS. 36 and 37.

The waveforms from the various parts of the circuit in FIG. 37 are displayed in FIG. 38. Here, $N=5$ and $m=3$. It is evident from the figure that element 3606 has been designed to output $(3/2)T-PP$ so that the length (duration of time) from the next peak to the generation of the next ED pulse will be $T/2$. In other words, ED pulse is generated so that the next peak will be at the center of the data section T.

When the synchronization signal TRACK has the value "1," the selector 3612 selects the output of register 3610 as its input. Consequently a train of time an ED pulse is generated, the latch circuit 3704 latches a PP. Provided that the three peaks ($m=3$) with the peak positions $PP_1$, $PP_2$, and $PP_3$ have occurred within a given subinterval of data period T, the signal PPEN assumes the level "1" at the time $t=T'$. Subsequently, latch 3704 rejects other inputs PP's, and holds the peak position $PP_4$. $PP_4$ is latched immediately before the signal PPEN assumes the level "1." When the monitoring of the data is completed five times ($N=5$, $t=T_2$), N data period end signal NEND assumes the value of "1." Because signal PPEN is at the level "1," TRACK also assumes the value of "1." Next, selector 3612 chooses the datum $(3/2)T-PP_4$ set in 3606 and feeds the datum to the comparator 3604. Thus, another ED pulse will be output when $(3/2)T-PP_4$ clock cycles have elapsed ($t=T_3$). The synchronization is established, and the subsequent peaks will appear at the center of the following data time segments.

ED signal generating circuit in FIG. 38 operates in accordance with signals produced from the carrier detecting circuits 400 shown in FIGS. 32 and 33. However, it can also operate with signals from the carrier detecting circuit 400 shown in FIG. 31, where PPEN is generated asynchronously with NEND pulses.

Figure 39:
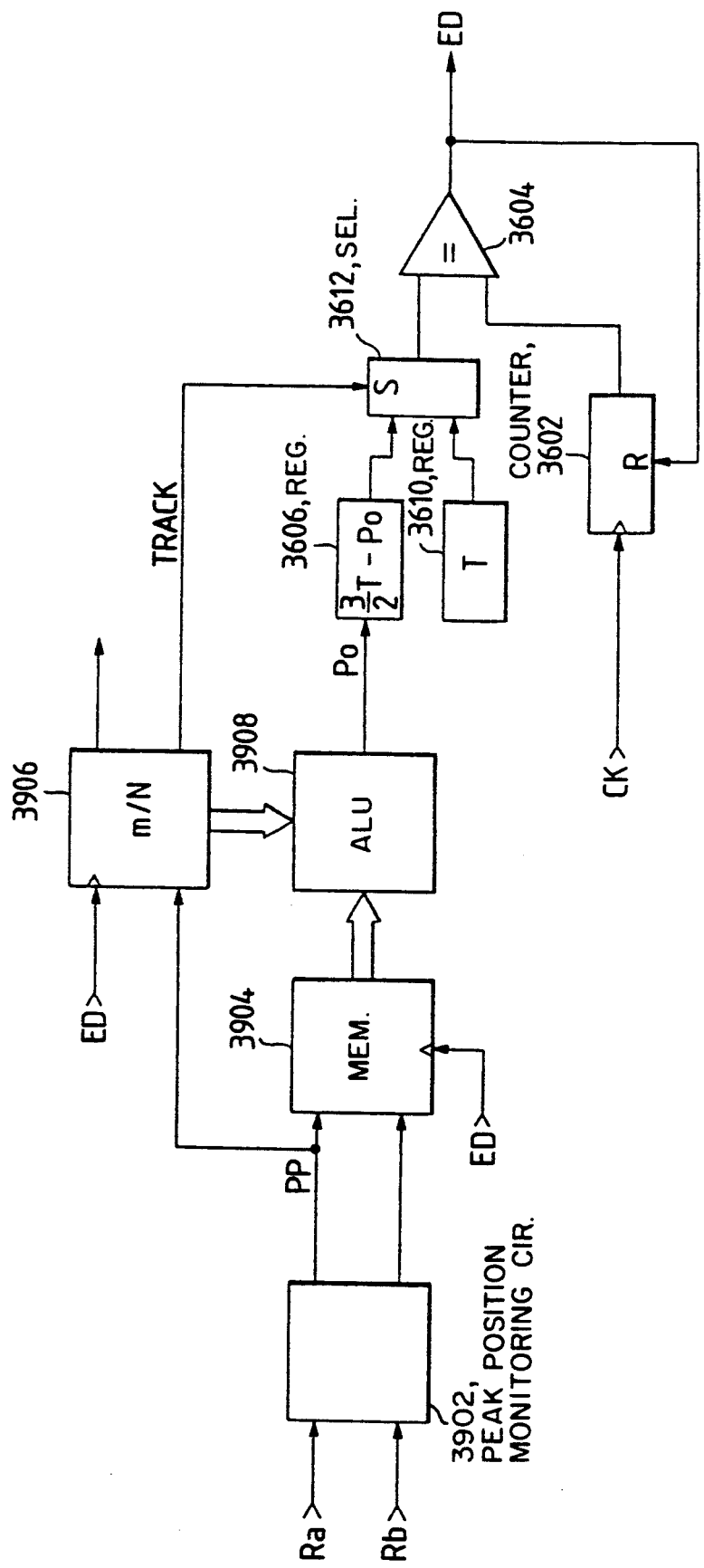
FIG. 39 is a block diagram of the carrier detecting circuit and the ED signal generator.

FIG. 39 is a block diagram of the synchronization control circuit 410 along with carrier detecting circuit 400. The synchronization circuit 410 uses an ED generator very similar to those already described. As is evident from comparing FIG. 39 with FIG. 37, latch 3704 and invertor 3702 have been eliminated, and the arithmetic operation block 3908 has been added. In addition, the carrier detecting circuit in FIG. 39 is of a different configuration than those already described in previous sections.

Carrier detecting circuit 400 in FIG. 39 comprises the peak position monitoring circuit 3902, the peak position memory block 3904, the m/N block 3906, and the arithmetic operating block 3908. Peak position monitoring circuit 3902 finds the peak of correlation signals Ra and Rb. Here, the "peak" may be found in one of many ways already shown in previous embodiments of peak position detecting circuit 1502 (FIG. 16). In addition, however, peak position monitoring circuit 3902 also fetches the amplitude L of each detected peak. Peak position monitoring circuit 3902 passes the peak position PP signal and PP amplitude L to peak position memory block 3904 and m/N block 3906. Peak position memory block 3904 stores the value of signal PP and L for every input ED pulse. The m/N block 3906 takes as its input the peak position PP with an arrival of each ED pulse.

The m/N block 3906 uses two numbers, m and N. These prescribed numbers m and N may be switched to m' and N' in accordance with the synchronization signal, a signal indicating the presence or absence of a carrier detection, as described in previous sections. In addition, it produces signal TRACK, in a manner similar to that of m/N determining circuit 1508, and transfers its output value to the ED generator. Its other outputs are passed to arithmetic operating block 3908.

The arithmetic operation block 3908 computes the weighted mean peak position $P_0$ by using its following inputs:

1) the peak position data stored in the memory block 3904:
2) the peak amplitudes, L's;
3) subintervals in which the peak positions output by m/N block 3906.

Arithmetic operation block 3908 feeds the weighted mean peak position $P_0$ to the register 3606.

The remaining circuit consists of ED generator, which functions as previously described. The particular embodiment of ED generator, however, uses $P_0$ to center the auto-correlation peaks at the center of each data time segment.

Arithmetic Operating Block and the Weighted Mean Peak Position

Arithmetic operation block 3908 may utilize one of four methods for finding the weighted mean peak position $P_0$. The computing algorithms are described below.

Method 1

First define the following.
r: the number of those subintervals each of which contains m peaks, in N data time segments.
j: the number of subintervals in N data time segments.
u: a numeric label of each subinterval.
LSu: the starting position of each subinterval
LEu: the end position of each subinterval u.
v: numbers which are equal to the numeric labels of subintervals each of which does not contain m peaks, given N data time segments.
Then, $P_0$ is found by:

$$P_0 = \left[ \sum_{u=0,\, u=/\{v\}}^{j} (LSu + LEu) \right] / 2r \qquad (1)$$

Method 2

Further define,

Vu: the number of occurrences of peaks in each subinterval u.

V: the total number of occurrences of peaks in all subintervals.

$$P_0 = \left[ \sum_{u=0}^{j} (LSu + LEu)Vu \right] / 2V \qquad (2)$$

Figure 40:
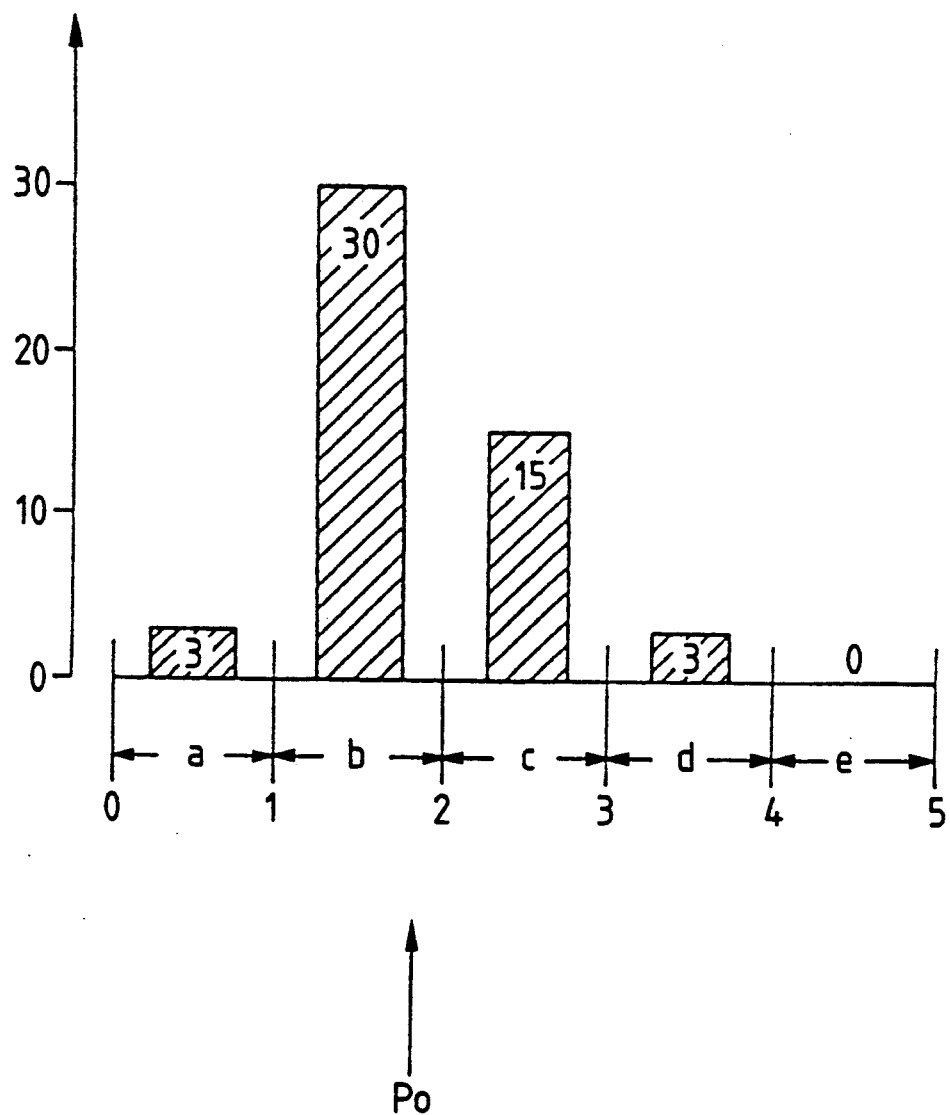
FIG. 40 shows graphs related to computation of a weighted mean peak position.

For example, assume j=4. (FIG. 40). The start position and end position of each subinterval is expressed by:
LS0=0, LE0=LS1=1, LE1=LS2=2, LE2=LS3=3, LE3=LS4=4, and LE4=5.
Also,
V0=3, V1=30, V2=15, V3=3, and V4=0.
Then, V=51.
From equation (2), $P_0$=1.85.

Method 3

Define

Xu: sum of every peak amplitudes in each subinterval u.
Then, $$P_0 = \left[ \sum_{u=0, u=/v}^{r} (LSu + LEu)Xu \right] / \left[ 2r \sum_{u=0, u=/v}^{r} Xu \right] \qquad (3)$$

Method 4

$$P_0 = \left[ \sum_{u=0}^{j} (LSu + LEu)Vu\, Xu \right] / 2V \sum_{u=0}^{j} Xu)$$

DCS Type 2

The preceding sections have described DCS Type 1. As mentioned above, DCS Type 2 refers to a CSK system configuration in which functions of demodulator 390 and carrier detecting circuit 400 are shared by a single circuit module. In addition, DCS Type 2 employs synchronization tracking circuit, not found in DCS Type 1.

Demodulator and Carrier Detecting Circuit

Figure 41:
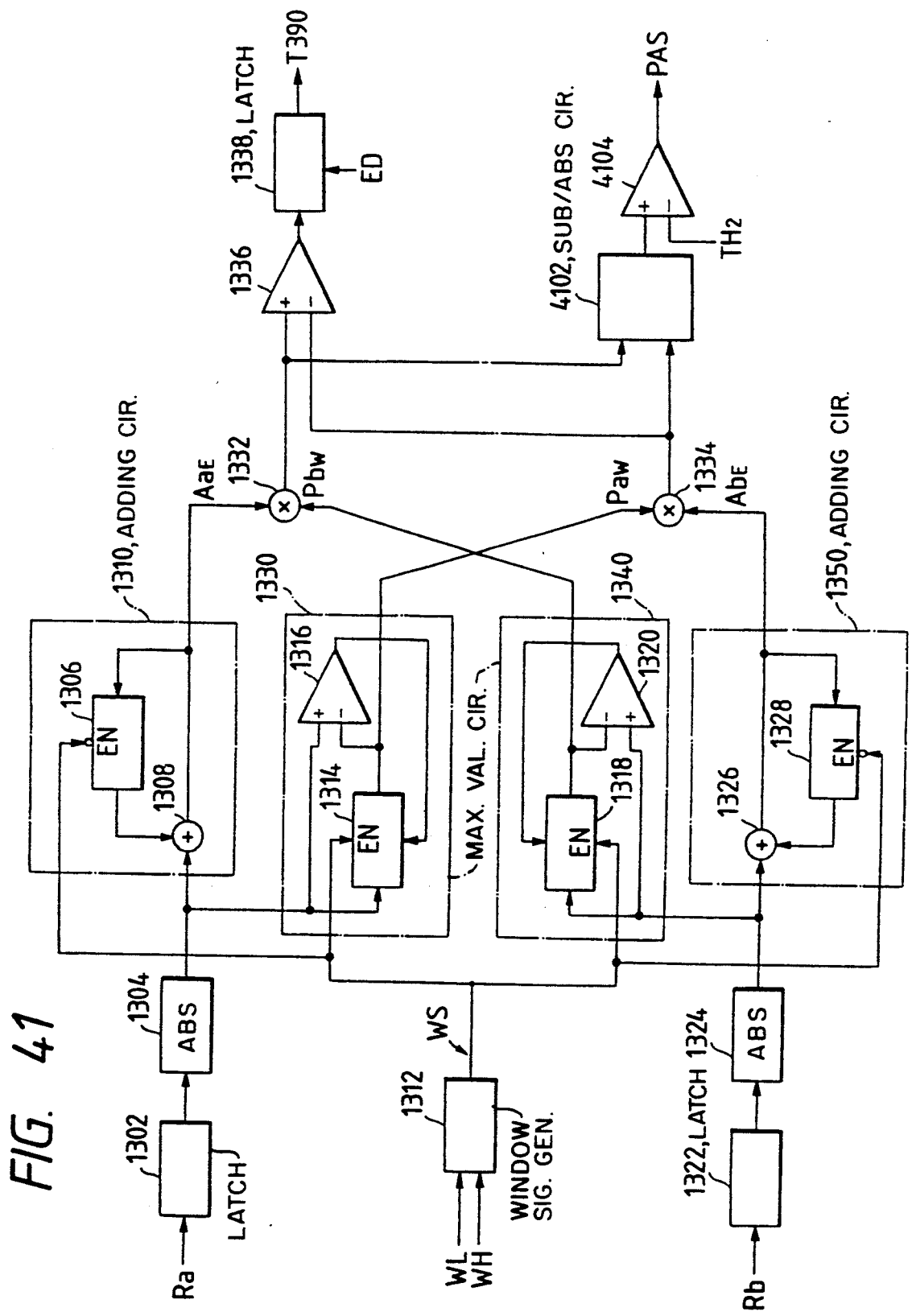
FIG. 41 is a schematic diagram of another construction of the demodulator and the carrier detecting circuit.

FIG. 41 is a block diagram of demodulator 390 and carrier detecting circuit 400. The structure of the circuit is similar to that shown in FIG. 13. However, there are two extra circuit submodules: subtraction/absolute value circuit 4102 and comparator 4104. The rest of the circuit blocks function in identical fashion as those in FIG. 13. The description of their operation is omitted as redundant.

Subtraction/absolute value circuit 4102 evaluates the absolute value of (Pbw AaE−Paw AbE). Next its result is compared to the threshold value TH2 at comparator 4104. If the value is larger than the threshold value TH2, the carrier detection signal PAS assumes the value "1."

FIG. 14 shows waveforms at various points in the present circuit. Two independent monitoring for tracking and demodulation/carrier detection are possible. Generally, when the signal transmission path introduces a significant degree of degradation, the peak values Paw and Pbw in the Wm sections of the correlated outputs tend to be small relative to noise. In order to avoid the demodulation errors, it is desirable that the window section Wm of demodulator 390 have a narrower width than that of synchronization control circuit 410.

Sync Control Circuit

Sync Circuit without Sync Track

Figure 42:
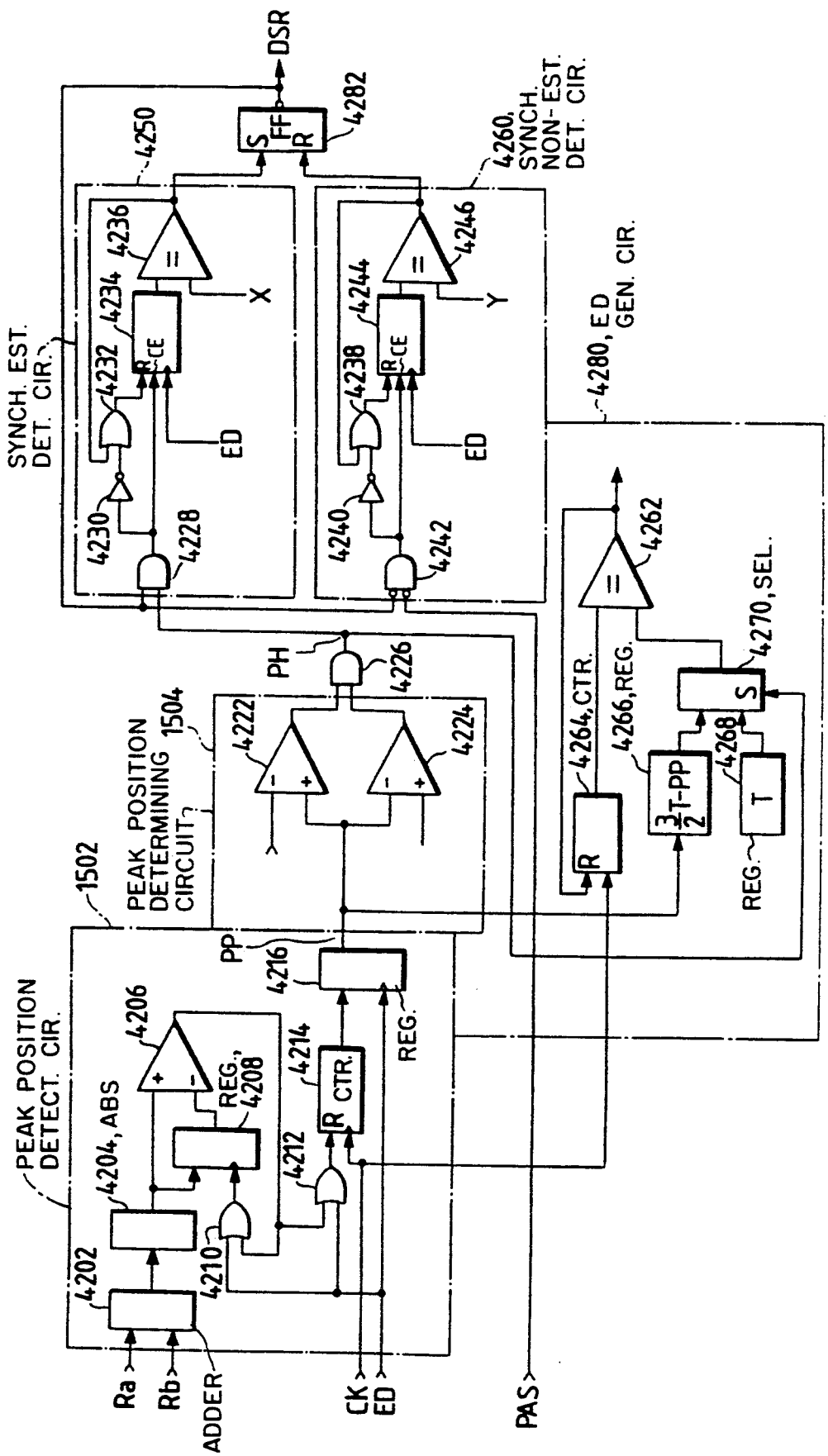
FIG. 42 illustrates a construction of a synchronization control circuit.
Figure 43:
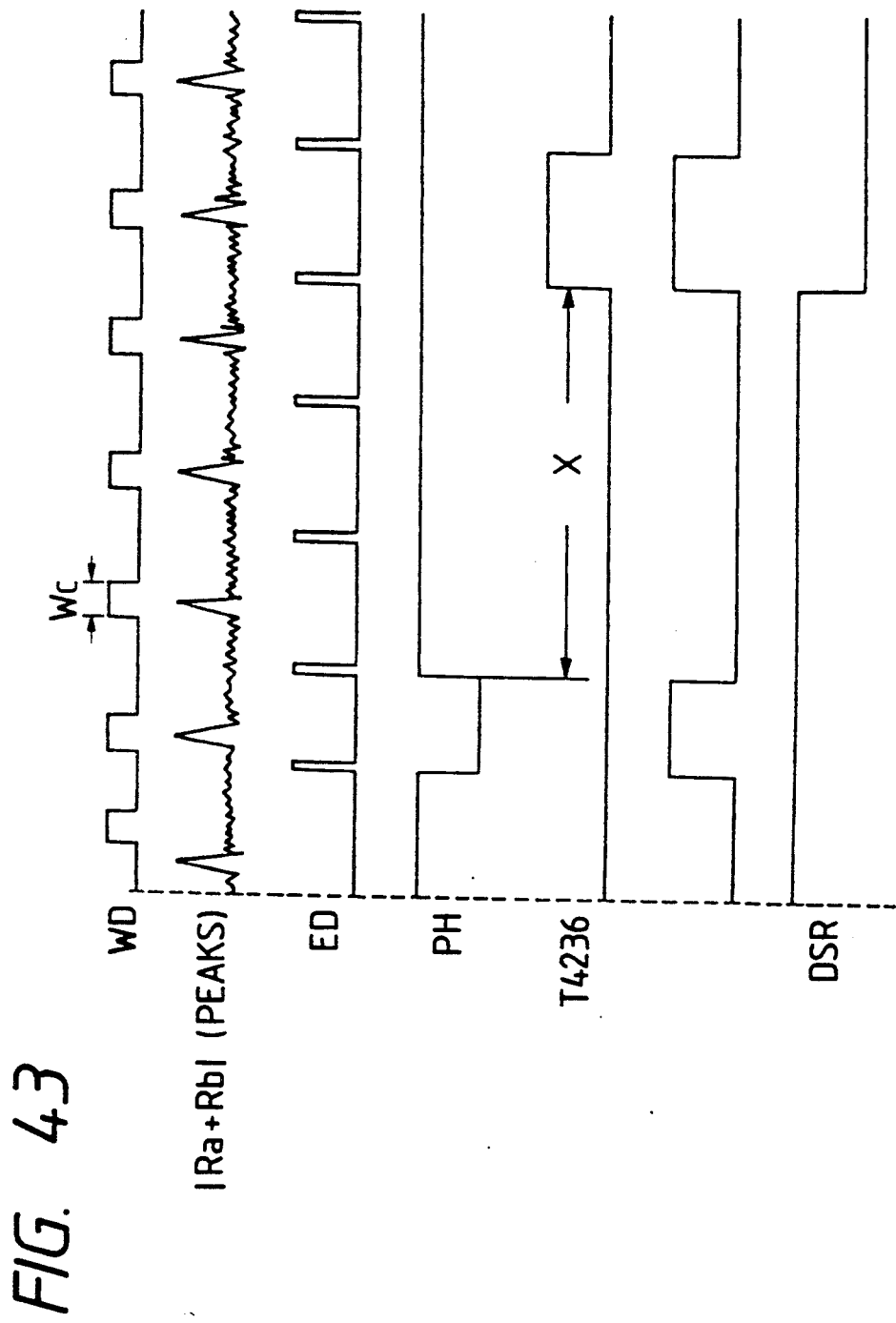
FIGS. 43 and 44 illustrate waveforms at various points in the circuit shown in FIG. 42.
Figure 44:
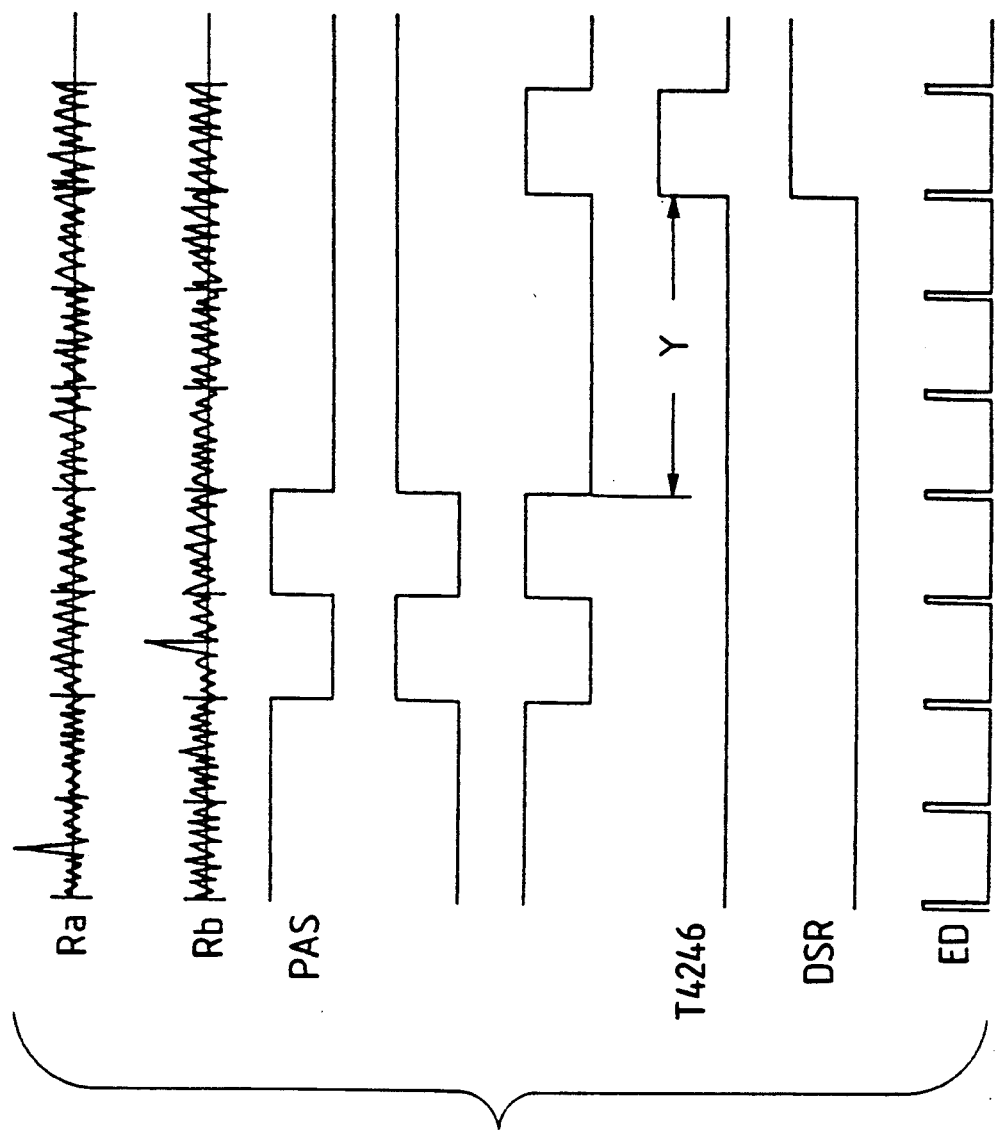

FIG. 42 is a block diagram of synchronization control circuit 410 (FIG. 3). This synchronization control circuit 410 comprises a peak position detecting circuit 1502, a peak position determining circuit 1504, a synchronization establishment determining circuit 4250, a synchronization non-establishment determining circuit 4260, and an ED generating circuit 4280. FIGS. 43 and 44 shows signals at various points on circuits in FIG. 42. In FIG. 43, WD signal specifies the location of synchronization monitoring window, similar to WS signal for demodulator 390.

The arrangement of peak position detecting circuit 1502 is identical to that shown in FIG. 17. The output of 1502 feeds into peak position determining circuit 1504 and ED generating circuit 4280.

Peak position determining circuit 1504 determines whether or not the detected peak is within the synchronization monitoring window Wc (FIG. 43) set within a data time segment of duration T. The synchronization monitoring window Wc is independent of the demodulation monitoring window Wm.

The peak position determining circuit 1504 is identical to the parts of one embodiment of ED generator 4280 shown in FIG. 36. Two comparators work, just as in FIG. 36, to determine whether PP is within a given window Wc of data time segment. The AND-gate 70 outputs "1" if a peak is within the window and "0" if otherwise. In FIG. 42, the output line from AND-gate 4226 is labeled PH.

The ED generator 4280 is identical to the parts of the embodiment of ED generator displayed in FIG. 36. Depending on signal PH from AND-gate 4226, clock signal CK, and ED pulses, the generator realigns the location of ED pulses relative to the location of previous ED pulses, so that auto-correlation peaks will appear at the center of window Wc.

The combination of both circuits 1504 and 4280 as originally used is shown in FIG. 36. Detailed descriptions of the circuits 26B and 300 and their operation are provided in sections relating synchronization control circuits without sync track.

The output PH from AND-gate 4226 feeds into AND-gate 4228.

The value "1" of PH, along with the value "1" of DSR, prompts AND-gate 4228 to output "1." This enables the counter 4234, which begins to count the arrival of ED pulses. The number of ED pulses, output from 4234, is then compared to a preset number X at the comparator 4236. Whenever the count equals the value X, comparator 4236 outputs "1," setting R-S latch to output "0" (notice the inverting bubble at the output of R-S latch 4282) at DSR line. Also, the output from comparator 4236 resets counter 4234 via means of an OR-gate 4232.

When DSR line assumes the value "0," AND-gate 4228 outputs "0," and counter 4234 becomes inactive. The subsequent output values of R-S latch 4282 is equal to its old output value.

As soon as DSR outputs "1," AND-gate 4242 is ready to output "1" upon arrival of "0" at its other input. As soon as PAS signal turns low (indicating that there is no detected carrier), AND-gate 4242 outputs "1," enabling the counter 4244. Counter 4244 counts the arrival of ED pulses. The number of ED pulses, output from 4244, is then compared to another preset number Y at the comparator 4246. If the count equals the value Y, comparator 4246 outputs "1," driving R-S latch 4282 to reset and output "1."

The output of "1" feeds back into AND-gate 4228, which in turn, waits for signal PH. Thereafter, circuits 4250 and 4260 function as described above, with 4250 being active and 4260 being inactive whenever PH signal and DSR have value of "1" conversely, 4260 is active and 4270 is inactive whenever PAS signal and DSR have value of "0."

Feeding the output from AND-gate 4228 through invertor 4230 and OR-gate 4232 into the reset input of counter 4234 places a constraint on counter 4234. Since counter 4234 is reset whenever PH turns "0," a peak must occur consecutively, or else counter 4234 restarts its counting from 0. Similarly, AND-gate 4242 places a constraint on counter 4244 that PAS signal and DSR signals both always have the value "0" while counter 4244 operates; if either one the inputs to AND-gate 4242 assumes the value "1" even for a moment during counting, counter 4244 will start counting from 0.

Sync Control Circuit with Sync Track

Synchronization control circuit 410 presented in the previous section does not comprise a synchronization tracking circuit. The synchronization tracking circuit may replace ED generator 4280 shown in FIG. 42.

Figure 46:
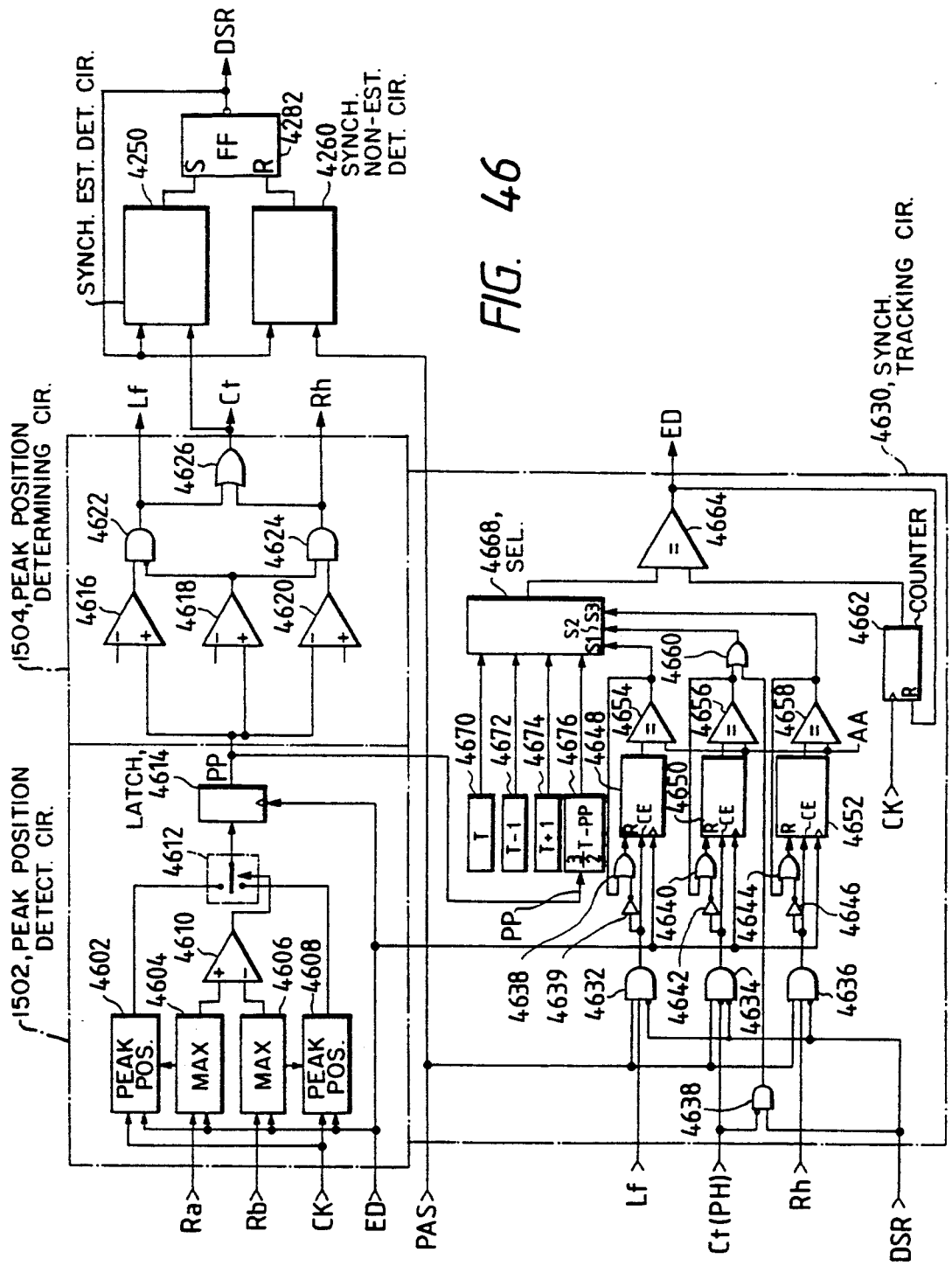
FIG. 46 is a schematic diagram of another embodiment of the synchronization control circuit.

FIG. 46 shows the following circuits; a peak position detecting circuit 1502, a peak position determining circuit 1504, synchronization establishment determining circuit 4250, and a synchronization non-establishment determining circuit 4260, and a synchronization tracking circuit 4630. Construction of circuits 1502 and 1504 are different from corresponding modules in FIG. 42.

Peak position detecting circuit 1502 consists of maximum value holding circuit 4604 and 4606 and peak position holding circuits 4602 and 4608.

Each of the maximum value holding circuits 4604 and 4606 comprises, the following, as shown for circuit 1502 in FIG. 42; OR-gate 4210, absolute value circuit 4204, latch 4208, and comparator 4206.

Each of peak position holding circuits 4602 and 4608 comprises OR-gate 4212, counter 4214, and latch 4216. In any case, peak position holding circuits 4602 and 4608 store values PP for peaks of Ra and Rb.

If all components of 4602, 4604, 4606, and 4608 are laid out on a single drawing, peak position detecting circuit 1502 would look almost identical to that shown in FIG. 19. The combination of comparator 1916 and switch 1918 (FIG. 19) functions very much like switch 4612. Also, latch 1714 (FIG. 19) plays an identical role as latch 4614.

Correlation signals Ra and Rb feeds into maximum value holding circuits 4604 and 4606. At each clock cycle, largest value of Ra and Rb are stored in 4602 and 4608 respectively. If the value of Ra is larger, then the output of 4602 is chosen by the switch 4612; else 4608 is chosen. In any case, the largest value of Ra or Ra over a single data segment is input to latch 4614 via switch 4612, and this value is transmitted as PP upon the arrival of an ED pulse.

Figure 45:
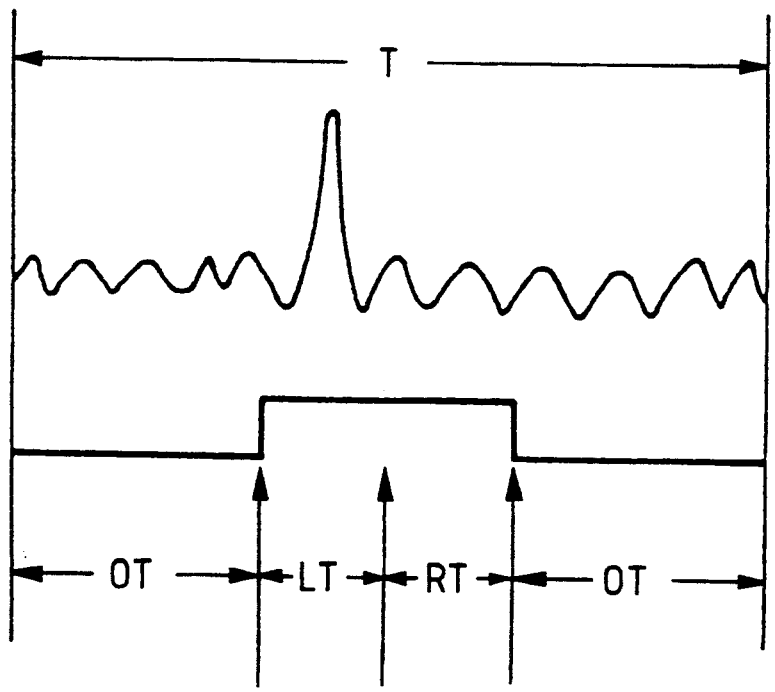
FIGS. 45 illustrates the partitioning of a data time segment at the output of the peak position determining circuit in FIG. 46.

PP pulse is then input to components of peak position determining circuit 1504. Specifically, PP is routed to comparators 4616, 4618, and 4620. Each comparator does the following:

1) Comparator 4616 compares the input value PP to the position of left edge of monitoring window Wc (FIG. 45).
2) Comparator 4618 compares PP to the position of the center of monitoring window (FIG. 45).
3) Comparator 4620 compares PP to the position of right edge of monitoring window Wc (FIG. 45).

In response to the outputs from the comparators, each of the gates 4622, 4624, and 4626 does the following:

1) AND-gate 4622 outputs Lf signal. Lf will assume the value "1" if PP is within the left side of monitoring window Wc ("LT" region, FIG. 45). Otherwise, it will assume the value "0." For PP to be within the left side of monitoring window, however, inputs to AND-gate 107 must have values "1" and "0" (see the inverting bubble at the lower end of AND-gate 4622). In other words, PP must not be outside the left edge of Wc (regions "OT" FIG. 45), yet be on the left to the center of Wc.
2) AND-gate 4624 outputs Rh signal. Rh will assume the value "1" if PP is within the right side of monitoring window Wc ("RT" region, FIG. 45). Otherwise it will assume the value "0." For PP to be within the right side of monitoring window, both inputs to AND-gate 4624 must have the value "1." PP must not be outside the right edge of Wc, but be on the right to the center of Wc.
3) OR-gate 4626 outputs Ct signal. Ct will assume the value "1" if PP is within monitoring window Wc, and "0" otherwise. In other words, if a peak is within either the right side or the left side of monitoring window Wc, it is still within monitoring window Wc.

Signal Ct is equivalent to signal PH in FIG. 42. It is input to synchronization establishment determining circuit 4250.

Synchronization establishment determining circuit 4250 and synchronization non-establishment determining circuit 4260 are identical to corresponding circuits shown in FIG. 42, and the description of their operation are omitted.

Ct, Rh, and Lf signals are all input to synchronization tracking circuit 4630. The major components of are: left-side determining circuit (not labelled), right-side determining circuit (not labelled), and outside determining circuit 4686 (not labelled); selector 4668 and registers 4670, 4672, 4674, and 4676; and counter and a comparator 4664.

Left-side determining circuit 4682 (not labelled) comprises AND-gate 4632, Or-gate 4638, counter 4648, comparator 4654, inverter 4639. Circuit 4682 operates almost identical to synchronization establishment determining circuit (see FIG. 42; note the similarities between and 4682). Operation of individual components of 4682 are as described for 4250. Several items for left-side determining circuit may be noted as follows:

1) It takes four input lines: ED, Lf, DSR, and PAS.
2) Three input lines DSR, PAS, and ED are input to the AND-gate 4632.
3) Left-side determining circuit outputs "1" if the number of occurrences of the peak detected within the left side of monitoring window Wc is equal to a predetermined number (at comparator 4654) of times. Otherwise, it outputs a "0."

4) Counter 4648 counts the number of ED pulses while Lf (value of "1"), DSR ("0"), and PAS ("1") prompt AND-gate 4632 to output "1."

Right-side determining circuit 4684 and outside determining circuit 4686 operate similarly. Comparators within 4682, 4684, and 4686 are all set to the identical number AA. For outside determining circuit 4686, the effect of introducing OR-gate 4660 and AND-gate 4678 causes outside determining circuit to output "1" only when DSR is low (or when window is off-sync). Outputs from 4682, 4684 and are all routed to the selector 4668.

Selector 4668 chooses one of register values according to its select inputs s1, s2, and s2. Specifically, the possible values of its select input values are:

1) s1=1, s2=0, s332 0: This combination of input signal implies that a peak has occurred within the left side of monitoring window AA times. Thus, the value T−1 held by register 4672, will be chosen. The effect of choosing registers 4672 or 4674 is to move relative location of ED pulse slightly toward the center, since T>>1.

2) s1=0, s2=0, s3=1: This combination of input signal implies that a peak has occurred within the right side of monitoring window AA times. Thus, the value T+1, held by register 4674, will be chosen.

3) s1=0, s2=1, s3=0: This combination of input signal implies that a peak not occurred within monitoring window AA times. In other words, monitoring window is looking at totally wrong area of a given data time segment. Thus, the value (3/2)T−PP, held by register 4676 will be chosen so that window Wc will correctly capture auto-correlation peaks.

4) s1=0, s2=0, s3=0: This combination of input signal implies that a peak has been detected at the center of monitoring window AA times. Thus, the value T, held by register 4670, will be chosen and will maintain the relative location of present ED pulse relative to the past ED pulse.

Finally, comparator 4664 and counter 4662 work in combination to produce ED pulses at times specified by selector 4668.

Figure 47:
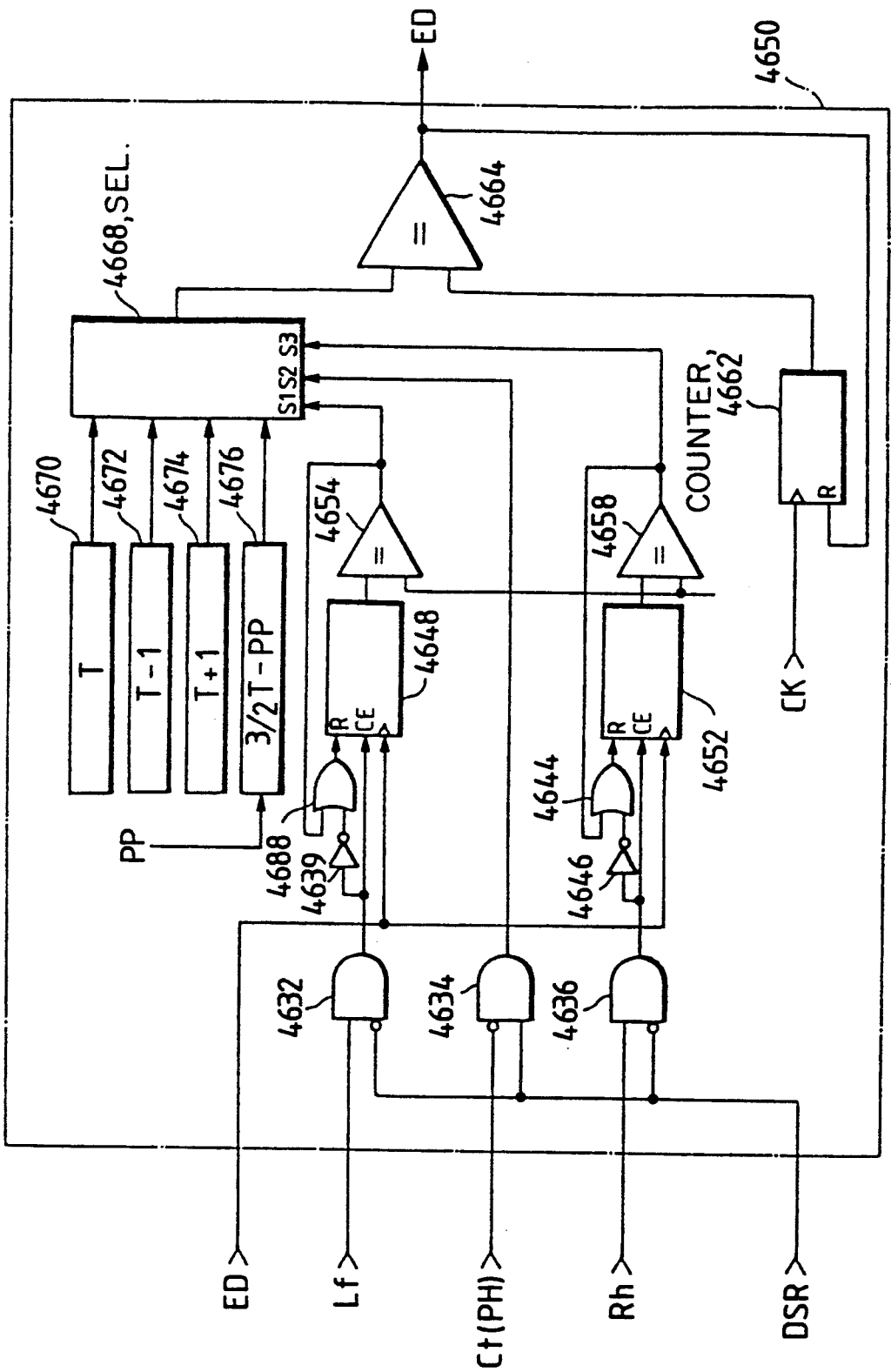
FIG. 47 is a schematic diagram of a synchronization tracking circuit.

FIG. 47 illustrates another embodiment of the synchronization tracking circuit 4630. In this figure, the parts identical to those shown in FIG. 46 are labelled with the same reference marks, and their description is omitted here. In comparison with circuit 4630 in FIG. 46, the synchronization tracking circuit 4630 in FIG. 47 does not include outside determining circuit which comprises counter 4650, comparator 4656, inverter 4642, and OR-gate 4640. OR-gate 4660 is also omitted. The carrier detection signal PAS, which is input to AND-gates 4632, 4634, and 4636, is also omitted.

The peak position detecting circuit 1502 shown in FIG. 46 bases its algorithm for detecting peak position on the relative sizes of peaks. However, depending on the condition of signal transmission paths, sometimes the inter-correlation peaks may become larger than the auto-correlation peaks. As long as a peak position detecting circuit 1502 simply chooses the largest of Ra and Rb as its auto-correlation value, the synchronization tracking circuit 4630 as in FIG. 46 may begin to center its monitoring window about inter-correlation peaks.

Synchronization tracking circuit 4630 in FIG. 46 is susceptible to this sort of error because, outside establishment circuit 4686 may become activated when an auto-correlation peak becomes excessively small, even if temporarily. Such small auto-correlation peak will cause the synchronization tracking circuit 4630 to conclude that the peak is outside monitoring window Wc. However, synchronization tracking circuit 4630 in FIG. 47 is not as susceptible to this sort of synchronization error. Temporary fluctuations in peaks do not cause the output of register 4676 to be selected; thus, the occurrence of the type of error mentioned above is prevented in synchronization tracking circuit as shown in FIG. 47.

An Example of CSK System

Figure 48:
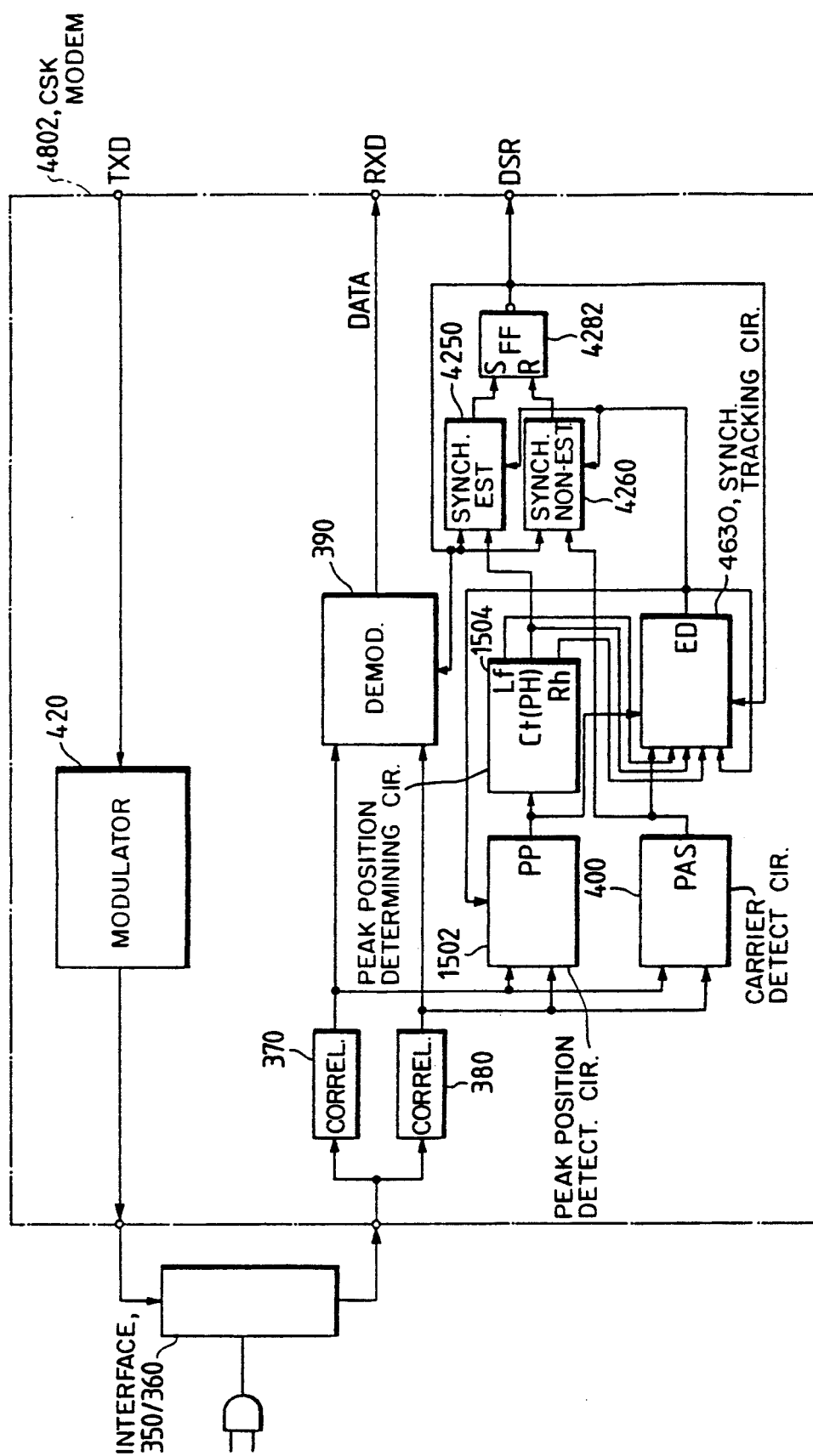
FIG. 48 shows an example of a CSK modem.

As an example of CSK system, FIG. 48 shows a CSK modem 4802. The modem comprises a signal transmitter, signal interfaces 350 and 360, and a receiver.

The transmitter includes a modulator 420, which modulates the transmitted data by an M-series code, and feeds the modulated signal to a commercial alternating-current interior line interface 12. Electric power line communication is carried out with a commercial alternating-current power transmission line (for instance, at 100 V). The transmitted signal is converted into a signal suitable for power line communication by the interface 12, and the signal, being superimposed on the commercial alternate- current, is sent out on the power line.

In the interface 12, a signal which is transmitted from another modem is received. The signal received is separated from the commercial alternate-current and processed for signal conversion (including analog/digital conversion), and is thereafter fed into the receiver in modem 4802.

The receiver comprises correlators 370 and 380, a demodulator 390, a carrier detecting circuit 400, a peak position detecting circuit 1502, a peak position determining circuit 1504, a synchronization tracking circuit 4630, a synchronization establishment determining circuit 4250, a synchronization non-establishment determining circuit 4260, and a flip-flop which 4282 outputs a synchronization establishing signal DSR. Operation of all listed components has been described in previous sections.

While the invention has been described in terms of the various embodiments preferred by the inventors at the time this application was filed, other embodiments and variations are possible based on the teachings of the invention herein.

What is claimed is:

1. A Code Shift Keying (CSK) communication system for transmitting and receiving digital data each of which is a bit having a value of either "1" or "0," the system comprising:

a transmitter including
  means for processing each of its input bits,
  means for continuously generating two M-series codes, a first M-series code being identical to a second M-series code except in its phase,
  means for selecting one of said two M-series codes depending on the value of a particular bit being processed, and
  means for outputting as a transmitted signal the selected code in a period of time spanning the duration of the particular bit; and a receiver including
  means for recapturing the transmitted signal as a received signal, means for obtaining two correlation signals by correlating the received signal with each copy of the two M-series codes, means for partitioning each correlation signal into a sequence of consecutive periods, means for comparing during each period the largest peak of one correlation signal with the largest peak of the other correlation signal, means for deciding during each period whether the received signal spanning the period has value of "1" or "0" depending on the result of comparing the sizes of the peaks, and means for generating a sequence of bits each of which has value of either "1" or "0."

2. A communication system as in claim 1, wherein said receiver comprises:

window generating means for generating periodic pulses each of whose center is synchronized to each peak of a signal formed by performing an operation on two correlation signals; and peak detection means for detecting and storing location and size of said each peak within a duration of time spanned by one of the periodic pulses generated by said window generating means.

3. A Code Shift Keying (CSK) communication system transmitter for processing and transmitting digital data each of which is a bit having a value of either "1" or "0," the transmitter comprising:

M-series code generating means for continuously generating a first and a second M-series codes in a period of time spanning the duration of a particular bit, the first M-series code being identical to the second M-series code in its sequence of 1's and 0's but different in its phase; and a switching circuit for selecting one of said two M-series codes depending on the value of said particular bit, and for outputting, as transmitted signal, the selected code in a period of time spanning the duration of the particular bit.

4. A transmitter as in claim 3, wherein said M-series code generating means comprises:

two identical M-series code generators, a first M-series code generator for generating said first M-series code and a second M-series code generator for generating said second M-series code; and a phase setting circuit for causing the second M-series code generator to generate said second M-series code with its phase different from the phase of said first M-series code.

5. A transmitter as in claim 3, wherein said M-series code generating means comprises:

an M-series code generator for generating said first M-series code; and a delay element for generating said second M-series code by accepting as its input said first M-series code, by delaying its inputted first M-series code, and by outputting the delayed first M-series code as said second M-series code.

6. A Code Shift Keying (CSK) communication system receiver for receiving a signal and processing the received signal which is capable of including series of a first and a second M-series codes which is identical to the first code except in its phase, the receiver comprising:

a first correlator for generating a first correlation signal by correlating a local replica of the first code and the received signal;

a second correlator for generating a second correlation signal by correlating a local replica of the second code and the received signal; and a demodulator for periodically monitoring the first and the second correlation signals, for comparing during each monitoring period the largest peak of the first correlation signal with the largest peak of the second correlation signal, for deciding during each monitoring period whether the received signal spanning the monitoring period has value of "1" or "0" depending on the result of comparing sizes of said largest peaks, and for generating sequence of bits each of which has value of either "1" or "0."

7. A receiver as in claim 6, wherein said demodulator comprises:

window generating means for generating periodic pulses each of whose center is synchronized to a main peak of a signal formed by performing an operation on two correlation signals during a period of time spanning one of said bits; and peak detection means for detecting said main peak within a duration of time spanned by one of the periodic pulses.

8. A Code Shift Keying (CSK) communication system receiver which includes two correlators for generating two correlation signals from a received signal, a demodulator for generating sequence of data bits based on two correlation signals and periodic timing pulses, a carrier detecting circuit for providing signals to and accepting signals from a timing pulse generator and accepting signals from two correlators, and the timing pulse generator for generating the timing pulses partly based on signals within or from the carrier detecting circuit, wherein the carrier detecting circuit comprises:

a peak position detecting circuit including
operating means for outputting peaks of a signal formed by processing two correlation signals,
means for detecting each position of said peaks, each peak within a single period of time spanned by one bit, and
means for outputting a peak position detection signal;

a peak position memory buffer for storing detected peak positions over a duration of time spanned by N data bits;

partitioning means for assigning, for each of N periods of time, M number of subintervals, each subinterval within one period having corresponding N-1 subintervals in other N−1 periods, all corresponding subintervals forming a single subinterval group, and all subintervals forming M subinterval groups;

first means for determining, for each duration of time spanning one bit of data, which of M subintervals contain a correlation peak, whose position is stored in said peak position memory buffer;

means for counting the total number of correlation peaks contained within each subinterval group based on outputs from said first determining means, and for outputting each of M counts resulting from the counting;

second means for determining if any of M counts is equal to or greater than a prescribed number m, deciding that a carrier has been detected if one of the counts is not less than m, and for outputting various signals including a carrier detection signal thereafter.

9. A receiver as in claim 8, wherein said carrier detecting circuit further comprises means for outputting non-detection signal if each of said M counts is less than m.

10. A receiver as in claim 8, wherein said carrier detecting circuit further comprises means for allowing those components within and dependent on numbers m and N to switch their dependency from numbers m and N to numbers m' and N'.

11. A receiver as in claim 8, wherein said operating means comprises:
means for adding two correlation signals;
means for evaluating and outputting the absolute value of added signals.

12. A receiver as in claim 8, wherein said operating means comprises:
means for evaluating the absolute value of each of two said correlation signals;
means for outputting larger one of the two absolute values.

13. A receiver as in claim 8, wherein said partitioning means includes means for preventing any one subinterval within one period from overlapping any other subintervals within the same period.

14. A receiver as in claim 8, wherein said partitioning means includes means for causing any one subinterval within one period to partially overlap its adjacent subintervals within the same period.

15. A Code Shift Keying (CSK) communication system receiver which includes two correlators for generating two correlation signals from a received signal, a demodulator for generating a sequence of data bits based on two correlation signals and periodic timing pulses, a carrier detecting circuit for providing signals to and accepting signals from a timing pulse generator and accepting signals from two correlators, and the timing pulse generator for generating the timing pulses partly based on signals from the carrier detecting circuit, wherein the carrier detecting circuit comprises:
a peak position detecting circuit including
operating means for outputting peaks of a signal formed by processing two correlation signals,
means for detecting each position of said peaks, each peak within a single period of time spanned by one bit, and
means for outputting a peak position detection signal; a peak position determining circuit including
partitioning means for assigning, for each of N periods of time, M number of subintervals, each subinterval within one period having corresponding N−1 subintervals in other N−1 periods, all corresponding subintervals forming a single subinterval group, and all subintervals forming M subinterval groups, and
means for determining, for each duration of time spanning one bit of data, which of M subintervals contain a correlation peak based on said peak position detection signal;
counting means for counting the total number of correlation peaks contained within each subinterval group based on outputs from said peak position determining circuit, and for outputting each of M counts resulting from the counting;
an m/N determining circuit for determining if any of said M counts is equal to or greater than a prescribed number m, for deciding that a carrier has been detected if one of the counts is not less than m, and for outputting various signals including a carrier detection signal thereafter.

16. A receiver as in claim 15, said timing pulse generator comprising:
extracting means for accepting as inputs signals from various lines interconnecting internal components of said carrier detecting circuit and for outputting quantities to a pulse generating means; and
pulse generating means for outputting timing pulses synchronized to said peaks, each position of timing pulses depending on the values of outputs from said extracting means and from carrier detecting circuit.

17. A receiver as in claim 15, said timing pulse generator comprising:
extracting means for accepting as inputs, signals from various lines interconnecting internal components of said carrier detecting circuit and for outputting quantities to an arithmetic operating means; and
arithmetic operating means for abstracting from its inputs and operating on,
the number of subinterval groups each of which contains greater than or equal to m peaks,
the number of subinterval groups,
a numeric label of each of subinterval groups,
the starting position of each subinterval group,
the end position of each subinterval group,
a numeric label of each subinterval group which does not contain m peaks,
the number of occurrences of peaks in each subinterval group,
the total number of occurrences of peaks in all subinterval groups, and
the sum of every peak amplitude in each subinterval group, so as to compute and output a weighted mean peak position every N periods; and
means for outputting timing pulses synchronized to said peaks, each position of timing pulses depending on the weighted mean peak position and said outputs from carrier detecting circuit.

18. A receiver as in claim 15, wherein the arithmetic operating means comprises means for computing the weighted mean peak position $P_0$ according to the following equation, $$P_0 = \left[ \sum_{u=0,\, u=/\{v\}}^{j} (LS_u + LE_u) \right]/2r$$

wherein
r denotes the number of subinterval groups each of which contains greater than or equal to m peaks,
j denotes the number of subinterval groups,
u denotes a numeric label of each of subinterval groups,
$LS_u$ denotes the starting position of each subinterval group u,
$LE_u$ denotes the end position of each subinterval group u, and
v denotes a numeric label of each subinterval group which does not contain m peaks.

19. A receiver as in claim 15, wherein the arithmetic operating means comprises means for computing the weighted mean peak position $P_0$ according to the following equation $$P_0 = \left[ \sum_{u=0}^{j} (LSu + LEu)Vu \right] / 2V$$

wherein
- j denotes the number of subinterval groups,
- u denotes a numeric label of each of subinterval groups,
- LSu denotes the starting position of each subinterval group u,
- LEu denotes the end position of each subinterval group u,
- Vu denotes the number of occurrences of peaks in each subinterval group u, and
- V denotes the total number of occurrences of peaks in all subinterval groups.

20. A receiver as in claim 15, wherein the arithmetic operating means comprises means for computing the weighted mean peak position $P_0$ according to the following equation, $$P_0 = \left[ \sum_{u=0, u=/v}^{j} (LSu + LEu)Xu \right] / \left[ 2r \sum_{u=0, u=/v}^{j} Xu \right]$$

wherein
- r denotes the number of subinterval groups each of which contains greater than or equal to m peaks,
- j denotes the number of subinterval groups,
- u denotes a numeric label of each of subinterval groups,
- LSu denotes the starting position of each subinterval group u,
- LEu denotes the end position of each subinterval group u,
- v denotes a numeric label of each subinterval group which does not contain m peaks,
- Vu denotes the number of occurrences of peaks in each subinterval group u,
- V denotes the total number of occurrences of peaks in all subinterval groups, and
- Xu denotes the sum of every peak amplitude in each subinterval group u.

21. A receiver as in claim 15, wherein the arithmetic operating means comprises means for computing the weighted mean peak position $P_0$ according to the following equation, $$P_0 = \left[ \sum_{u=0}^{j} (LSu + LEu)Vu\, Xu \right] / 2V \sum_{u=0}^{j} Xu$$

wherein
- r denotes the number of subinterval groups each of which contains greater than or equal to m peaks,
- j denotes the number of subinterval groups,
- u denotes a numeric label of each of subinterval groups,
- LSu denotes the starting position of each subinterval group u,
- LEu denotes the end position of each subinterval group u,
- v denotse a numeric label of each subinterval group which does not contain m peaks,
- Vu denotes the number of occurrences of peaks in each subinterval group u,
- V denotes the total number of occurrences of peaks in all subinterval groups, and
- Xu denotes the sum of every peak amplitude in each subinterval group u.

22. A Code Shift Keying (CSK) communication system receiver comprising:
- two correlators for generating two correlation signals from a received signal;
- a carrier detecting means for receiving signals from said two correlators and accepting signals from and providing signals to a synchronization control circuit;
- the synchronization control circuit including
  - first monitoring means for periodically monitoring two correlation signals,
  - means for generating timing pulses partly based on outputs from the first monitoring means, and on outputs from said carrier detecting means; and a demodulator including
  - first monitoring means for periodically monitoring two correlation signals,
  - means for generating a sequence of data bits based on outputs from the first monitoring means and based on the periodic timing pulses.

23. A Code Shift Keying (CSK) communication method for transmitting and receiving digital data each of which is a bit having a value of either "1" or "0," the method comprising the steps of:
- transmitting, comprising the steps of:
  - processing each of its input bits,
  - continuously generating two M-series codes, a first M-series code being identical to a second M-series code except in its phase,
  - selecting one of said two M-series codes depending on the value of a particular bit being processed, and
  - outputting as a transmitted signal the selected code in a period of time spanning the duration of the particular bit; and receiving, comprising the steps of:
  - recapturing the transmitted signal as a received signal,
  - obtaining two correlation signals by correlating the received signal with each copy of the two M-series codes,
  - partitioning each correlation signal into a sequence of consecutive periods,
  - comparing during each period the largest peak of one correlation signal with the largest peak of the other correlation signal,
  - deciding during each period whether the received signal spanning the period has value of "1" or "0" depending on the result of comparing the sizes of the peaks, and
- generating a sequence of bits each of which has value of either "1" or "0."

24. A communication method as in claim 23, wherein said receiving step comprises the steps of:
- generating periodic pulses each of whose center is synchronized to each peak of a signal formed by performing an operation on two correlation signals; and
- detecting and storing the location and size of said each peak within a duration of time spanned by one of said periodic pulses.

25. A Code Shift Keying (CSK) communication transmitting method for processing and transmitting digital data each of which is a bit having a value of either "1" or "0," the transmitting method comprising the steps of:

continuously generating a first and a second M-series codes in a period of time spanning the duration of a particular bit, the first M-series code being identical to the second M-series code in its sequence of 1's and 0's but different in its phase;

selecting one of said two M-series codes depending on the value of said particular bit;

outputting, as transmitted signal, the selected code in a period of time spanning the duration of the particular bit.

26. A transmitting method as in claim 25, wherein the step of generating said M-series code comprises the steps of:

generating said first M-series code;

generating said second M-series code identical to the first code; and setting the phase of the second M-series code so that the phase of the second code is different from that of the first M-series code.

27. A transmitting method as in claim 25, wherein the step of generating said M-series code comprises:

generating said first M-series code; and generating said second M-series code by delaying the first M-series code; and producing the delayed first M-series code as said second M-series code.

28. A Code Shift Keying (CSK) communication receiving method for capturing a signal and processing the captured signal which is capable of including series of a first and a second M-series codes which is identical to the first code except in its phase, the receiving method comprising the steps of:

generating a first correlation signal by correlating a local of the first code and the captured signal;

generating a second correlation signal by correlating a local replica of the second code and the captured signal; and demodulating, including the steps of:

periodically monitoring the first and the second correlation signals, comparing during each monitoring period the largest peak of the first correlation signal with the largest peak of the second correlation signal, deciding during each monitoring period whether the captured signal spanning the monitoring period has the value of "1" or "0" depending on the result of comparing sizes of said largest peaks, and generating sequence of bits each of which has value of either "1" or "0."

29. A receiving method as in claim 28, wherein said demodulating step comprises the steps of:

generating periodic pulses each of whose center is synchronized to a main peak of a signal formed by performing an operation on two correlation signals during a period of time spanning one of said bits; and detecting one of said largest peaks within a duration of time spanned by one of the periodic pulses.

30. A Code Shift Keying (CSK) communication receiving method comprising steps of generating two correlation signals from a received signal, demodulating a sequence of data bits based on two correlation signals and periodic timing pulses, producing synchronization signals based on timing pulses and two correlation signals, and generating the timing pulses partly based on synchronization signals, wherein the step of producing synchronization signals comprises the steps of:

(1) peak position detecting, including the steps of:
processing two correlation signals,
generating peaks of a signal resulting from the processing,
detecting each position of said peaks, each peak within a single period of time spanned by one bit, and outputting a peak position detection signal;

(2) storing detected peak positions over a duration of time spanned by N data bits;

(3) assigning, for each of N periods of time, M number of subintervals, each subinterval within one period having corresponding N−1 subintervals in other N−1 periods, all corresponding subintervals forming a single subinterval group, and all subintervals forming M subinterval groups;

(4) determining, for each duration of time spanning one period, which of M subintervals contain one of stored detected peaks;

(5) counting, for each subinterval group, the total number of correlation peaks contained within each subinterval group based on the intermediate and final results of step (4);

(6) generating each of M counts resulting from the counting (5);

(7) determining if any of M counts is equal to or greater than a prescribed number m, deciding that a carrier has been detected if one of the counts is not less than m, and thereafter producing various synchronization signals.

31. A receiving method as in claim 30, wherein said carrier detecting further comprises allowing steps (2) through (7) which depends m and N to switch their dependency from numbers m and N to numbers m' and N'.

32. A receiving method as in claim 30, wherein the processing of two correlation signals in (1) comprises the steps of:

adding said two correlation signals;

evaluating and producing the absolute value of added signals.

33. A receiving method as in claim 30, wherein the processing of two correlation signals in (1) comprises:

evaluating the absolute value of each of two said correlation signals;

producing larger one of the two absolute values.

34. A receiving method as in claim 30, wherein step (3) includes a step of preventing any one subinterval within one period from overlapping any other subintervals within the same period.

35. A receiving method as in claim 30, wherein step (3) includes a step of causing any one subinterval within one period to partially overlap its adjacent subintervals within the same period.

36. A Code Shift Keying (CSK) communication receiving method comprising steps of generating two correlation signals from a received signal, demodulating a sequence of data bits based on two correlation signals and periodic timing pulses, producing synchronization signals based on timing pulses and two correlation signals, and generating the timing pulses partly based on synchronization signals, wherein the producing synchronization signals comprises the steps of:

(1) peak position detecting including the steps of:
processing two correlation signals,
generating peaks of a signal resulting from the processing, detecting each position of said peaks, each peak within a single period of time spanned by one bit, and outputting a peak position detection signal;

(2) peak position determining, comprising the steps of: assigning, for each of N periods of time, M number of subintervals, each subinterval within one period having corresponding N−1 subintervals in other N−1 periods, all corresponding subintervals forming a single subinterval group, and all subintervals forming M subinterval groups, and determining, for each duration of time spanning one period, which of M subintervals contain one of stored detected peaks;

(3) counting, for each subinterval group, the total number of correlation peaks contained within each subinterval group based on the intermediate and final results of step (2);

(4) generating each of M counts resulting from the counting in step (3); and (5) determining if any of M counts from step (4) is equal to or greater than a prescribed number m, deciding that a carrier has been detected if one of the counts is not less than m, and thereafter producing various synchronization signals.

37. A receiving method as in claim 36, wherein the generating of timing pulses comprises a step of synchronizing said timing pulses to said peaks depending on a number of said synchronization signals.

38. A receiving method as in claim 36, wherein the generating of timing pulses comprises:

(1) extracting information from said synchronization signals;

(2) abstracting from extracted signals
the number of subinterval groups each of which contains greater than or equal to m peaks,
the number of subinterval groups,
a numeric label of each of subinterval groups,
the starting position of each subinterval group,
the end position of each subinterval group,
a numeric label of each subinterval group which does not contain m peaks,
the number of occurrences of peaks in each subinterval group,
the total number of occurrences of peaks in all subinterval groups, and
the sum of every peak amplitude in each subinterval group, (3) computing, using the result of (2), a weighted mean peak position every N periods; and (4) generating timing pulses synchronized to said peaks, each position of timing pulses depending on the weighted mean peak position and said synchronization signals.

39. A receiving method as in claim 38, wherein computing the weighted mean peak position $P_0$ comprises carrying out steps of an algorithm according to the following equation, $$P_0 = \left[ \sum_{u=0, u=/\{v\}}^{j} (LSu + LEu) \right] / 2r$$

wherein
r denotes the number of subinterval groups each of which contains greater than or equal to m peaks,
j denotes the number of subinterval groups, u denotes a numeric label of each of subinterval groups,
LSu denotes the starting position of each subinterval group u,
LEu denotes the end position of each subinterval group u, and
v denotse a numeric label of each subinterval group which does not contain m peaks.

40. A receiving method as in claim 38, wherein computing the weighted mean peak position $P_0$ comprises carrying out steps of an algorithm according to the following equation, $$P_0 = \left[ \sum_{u=0}^{j} (LSu + LEu)Vu \right] / 2V$$

wherein
j denotes the number of subinterval groups,
u denotes a numeric label of each of subinterval groups,
LSu denotes the starting position of each subinterval group u,
LEu denotes the end position of each subinterval group u,
Vu denotes the number of occurrences of peaks in each subinterval group u, and
V denotes the total number of occurrences of peaks in all subinterval groups.

41. A receiving method as in claim 38, wherein computing the weighted mean peak position $P_0$ comprises carrying out steps of an algorithm according to the following equation, $$P_0 = \left[ \sum_{u=0, u=/v}^{j} (LSu + LEu)Xu \right] / \left[ 2r \sum_{u=0, u=/v}^{j} Xu \right]$$

wherein
r denotes the number of subinterval groups each of which contains greater than or equal to m peaks,
j denotes the number of subinterval groups,
u denotes a numeric label of each of subinterval groups,
LSu denotes the starting position of each subinterval group u,
LEu denotes the end position of each subinterval group u,
v denotse a numeric label of each subinterval group which does not contain m peaks,
Vu denotes the number of occurrences of peaks in each subinterval group u,
V denotes the total number of occurrences of peaks in all subinterval.groups, and
Xu denotes the sum of every peak amplitude in each subinterval group u.

42. A receiving method as in claim 38, wherein computing the weighted mean peak position $P_0$ comprises carrying out steps of an algorithm according to the following equation, $$P_0 = \left[ \sum_{u=0}^{j} (LSu + LEu)Vu\, Xu \right] / 2V \sum_{u=0}^{j} Xu$$

wherein r denotes the number of subinterval groups each of which contains greater than or equal to m peaks, j denotes the number of subinterval groups, u denotes a numeric label of each of subinterval groups, LSu denotes the starting position of each subinterval group u, LEu denotes the end position of each subinterval group u, v denotse a numeric label of each subinterval group which does not contain m peaks, Vu denotes the number of occurrences of peaks in each subinterval group u, V denotes the total number of occurrences of peaks in all subinterval groups, and Xu denotes the sum of every peak amplitude in each subinterval group u.

43. A Code Shift Keying (CSK) communication receiving method comprising the steps of:

generating two correlation signals from a received signal;

processing two correlation signals and timing signals to produce synchronization signals;

pulse generating, comprising the steps of:
(1) periodically monitoring two correlation signals,
(2) generating timing pulses partly based on the result of (1), and on synchronization signals; and demodulating, comprising the steps of:
(3) periodically monitoring two correlation signals independently from (1),
(4) generating a sequence of data bits based on the result of (3) and on the periodic timing pulses.

* * * * *